(12) United States Patent
Ouchi et al.

(10) Patent No.: US 12,069,744 B2
(45) Date of Patent: Aug. 20, 2024

(54) BASE STATION APPARATUS, TERMINAL APPARATUS, AND METHOD FOR A RANDOM ACCESS PROCEDURE IN WIRELESS COMMUNICATION

(71) Applicants: SHARP KABUSHIKI KAISHA, Sakai (JP); FG Innovation Company Limited, Tuen Mun (HK)

(72) Inventors: Wataru Ouchi, Sakai (JP); Tomoki Yoshimura, Sakai (JP); Taewoo Lee, Sakai (JP); Daiichiro Nakashima, Sakai (JP); Shoichi Suzuki, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 312 days.

(21) Appl. No.: 17/598,462

(22) PCT Filed: Mar. 2, 2020

(86) PCT No.: PCT/JP2020/008629
§ 371 (c)(1),
(2) Date: Sep. 27, 2021

(87) PCT Pub. No.: WO2020/195571
PCT Pub. Date: Oct. 1, 2020

(65) Prior Publication Data
US 2022/0183079 A1    Jun. 9, 2022

(30) Foreign Application Priority Data
Mar. 27, 2019    (JP) ................................ 2019-060241

(51) Int. Cl.
*H04W 74/0833* (2024.01)
*H04W 72/23* (2023.01)
(Continued)

(52) U.S. Cl.
CPC ....... *H04W 74/0841* (2013.01); *H04W 72/23* (2023.01); *H04W 74/0866* (2013.01); *H04W 80/02* (2013.01)

(58) Field of Classification Search
CPC ............. H04W 74/0841; H04W 72/23; H04W 74/0866; H04W 80/02
See application file for complete search history.

(56) References Cited

U.S. PATENT DOCUMENTS

2018/0241511 A1    8/2018  Harada et al.
2019/0037608 A1*   1/2019  Harada ............. H04W 74/0833
(Continued)

FOREIGN PATENT DOCUMENTS

WO    2017/026433 A1    2/2017
WO    WO-2017026433 A1 *  2/2017  ............... H04L 1/16

OTHER PUBLICATIONS

3GPP TSG RAN WG1 #96 R1-1902962 Athens, Greece, Feb. 25-Mar. 1, 2019 Source: Lenovo, Motorola Mobility Title: Extensions for Channel Access Procedures (Year: 2019).*
(Continued)

*Primary Examiner* — Chi H Pham
*Assistant Examiner* — Weibin Huang
(74) *Attorney, Agent, or Firm* — ScienBiziP, P.C.

(57) ABSTRACT

To perform communication efficiently. Provided are a receiver configured to receive a random access preamble and a transmitter configured to transmit one or multiple medium access control random access responses (MAC RARs) corresponding to the random access preamble. The transmitter sets, in a case that a MAC RAR of the one or multiple MAC RARs is transmitted in a new radio access technology (NR) cell, a timing advance command (TAC) field included in the MAC RAR to have a first size and an uplink (UL) grant to have a second size, and sets. in a case that a MAC RAR of (Continued)

the one or multiple MAC RARs is transmitted in an NR-unlicensed (NR-U) cell, a size of the TAC field included in the MAC RAR to be smaller than the first size and a size of the UL grant to be greater than the second size.

5 Claims, 23 Drawing Sheets

(51) Int. Cl.
*H04W 74/08* (2009.01)
*H04W 80/02* (2009.01)

(56) References Cited

U.S. PATENT DOCUMENTS

| | | | |
|---|---|---|---|
| 2020/0146069 A1* | 5/2020 | Chen | H04W 52/362 |
| 2020/0221505 A1* | 7/2020 | Agiwal | H04W 74/0833 |
| 2021/0195676 A1* | 6/2021 | Wang | H04B 7/0695 |

OTHER PUBLICATIONS

WO_2017026433_A1_Harada (English Translation) (Year: 2017).*
NTT Docomo, New SID Proposal: Study on New Radio Access Technology, 3GPP TSG RAN Meeting #71, RP-160671, Goteborg, Sweden, Mar. 7-10, 2016.
Samsung, Summary on CA aspects, 3GPP TSG RAN WG1#93, R1-1807617, Agenda item 7.1.3.4.2, Busan, Korea, May 21-25, 2018.
3rd Generation Partnership Project, Technical Specification Group Radio Access Network, Study on NR-based access to unlicensed spectrum (Release 16), 3GPP TR 38.889 V16.0.0 (Dec. 2018).
Lenovo, Motorola Mobility, "Extensions for Channel Access Procedures", R1-1902962, 3GPP TSG RAN WG1 #96, Athens, Greece, Feb. 25-Mar. 1, 2019.

* cited by examiner

Figure A: Number of OFDM symbols per slot, slots per frame, and slots per subframe for normal cyclic prefix.

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 2

| PUCCH format | Length in OFDM symbols $N^{PUCCH}_{symb}$ |
|---|---|
| 0 | 1 - 2 |
| 1 | 4 - 14 |
| 2 | 1 - 2 |
| 3 | 4 - 14 |
| 4 | 4 - 14 |

FIG. 4

| Channel Access Priority Class ($p$) | $m_p$ | $CW_{min,p}$ | $CW_{max,p}$ | $T_{mcot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |
| ... | ... | ... | ... | ... | ... |
| $p$ | X | CW#0 | CW#W-1 | Y ms | {CW#0, CW#1, ..., CW#5, CW#6, ..., CW#W-1} |

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command; for reporting on PUSCH, UE receives triggering on DCI | Triggered by DCI; additionally, activation command |
| Semi-Persistent CSI-RS | Not supported | For reporting on PUCCH, the UE receives an activation command; for reporting on PUSCH, UE receives triggering on DCI | Triggered by DCI; additionally, activation command |
| Aperiodic CSI-RS | Not supported | Not supported | Triggered by DCI; additionally, activation command |

FIG. 11

| Bandwidth part [PRBs] | Subband size [PRBs] |
|---|---|
| < 24 | N/A |
| 24 - 72 | 4, 8 |
| 73 - 144 | 8, 16 |
| 145 - 275 | 16, 32 |

FIG. 12

Priority 0:
Part 2 wideband CSI for CSI reports 1 to $N_{Rep}$

Priority 1:
Part 2 subband CSI of even subbands for CSI report 1

Priority 2:
Part 2 subband CSI of odd subbands for CSI report 1

Priority 3:
Part 2 subband CSI of even subbands for CSI report 2

Priority 4:
Part 2 subband CSI of odd subbands for CSI report 2

⋮

Priority $2N_{Rep}-1$:
Part 2 subband CSI of even subbands for CSI report $N_{Rep}$ Priority $2N_{Rep}$:
Part 2 subband CSI of odd subbands for CSI report $N_{Rep}$

FIG. 13

(a) MAC RAR for NR-U

| RAR grant field | Number of bits |
|---|---|
| ~~Frequency hopping flag~~ | ~~1~~ |
| PUSCH frequency resource allocation | ~14 -> ~10 |
| PUSCH time resource allocation | 4 |
| MCS | 4 |
| TPC command for PUSCH | 3 |
| ~~(CSI request)~~ | ~~(1)~~ |
| PUSCH starting position | 2 |
| Channel access type | 1 |

(b) RAR grant fields for NR-U

| Value | PUSCH starting position |
|---|---|
| 00 | current symbol (e.g. symbol 0) |
| 01 | 25 us in current symbol |
| 10 | (25 us + TA) in current symbol |
| 11 | next symbol (e.g. symbol 1) |
(a) 2 bits-PUSCH starting position field
| Value | PUSCH starting position |
|---|---|
| 0 | current symbol (e.g. symbol 0) |
| 1 | 25 us in current symbol |
(b) 1 bit-PUSCH starting position field
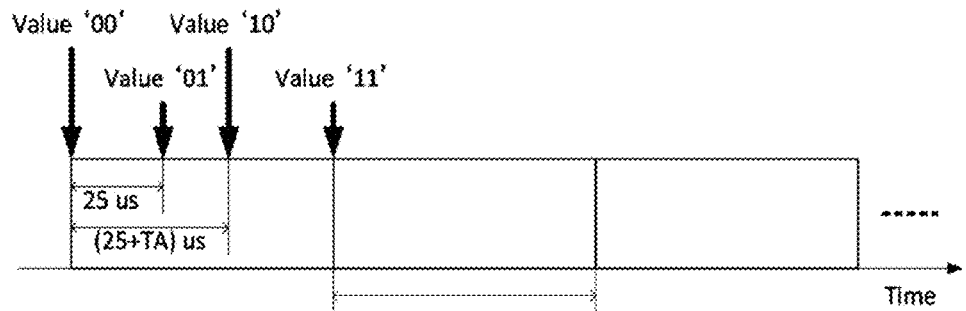
(c) SCS = 15 kHz
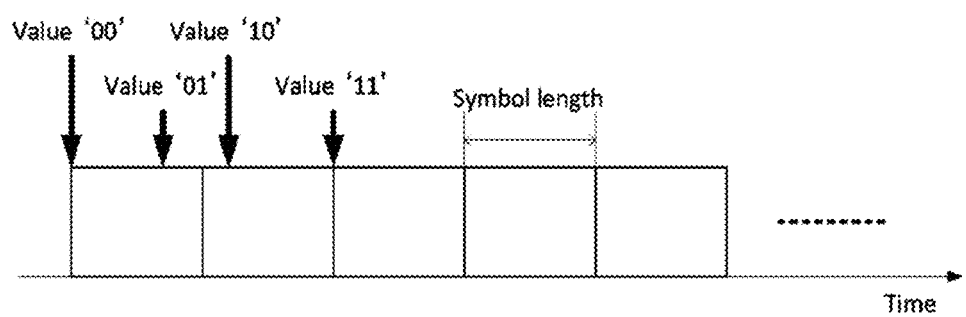
(d) SCS = 30 kHz
FIG. 22

This PUSCH frequency resource allocation type may be only applicable for a NR-U. The resource allocation information for PUSCH frequency resource allocation indicates to a scheduled UE a set of allocated resource blocks, $RB_{START} + l + i*N$ where, $N = FLOOR(N^{UL}_{RB}/10)$, $i = 0, 1, \cdots, 9$, $N^{UL}_{RB}$ is the maximum transmission bandwidth.

For $N^{UL}_{RB} = 100 \sim 106$ (i.e. 20MHz BW), a PUSCH frequency resource allocation field in the scheduling grant consists of a resource indication value (RIV).

For $N^{UL}_{RB} = 100 \sim 106$ (i.e. 20MHz BW) and $0 <= RIV < N(N+1)/2$, $l = 0, 1, \cdots, L - 1$ and the RIV corresponds to the starting resource block ($RB_{START}$) and the value of L (L >= 1).

The RIV is defined by,
if (L - 1) <= FLOOR (N/2) then
  $RIV = N(L - 1) + RB_{START}$
else
  $RIV = N(N - L + 1) + (N - 1 - RB_{START})$ For $N^{UL}_{RB} = 100$ and $RIV >= N(N+1)/2$, the RIV corresponds to starting resource block ($RB_{START}$) and $l$ according to the following table.

| RIV - N(N + 1)/2 | $RB_{START}$ | $l$ |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

For $N^{UL}_{RB} = 50 \sim 52$ (i.e. 10MHz BW), the PUSCH frequency resource allocation field indicates a bitmap of the allocated values of $l$ where $l = 0, 1, 2, 3, 4$. The order of set of resource blocks to bitmap bit mapping is in such way that $l = 0$ to $l = 4$ are mapped to MSB to LSB of the bitmap respectively. The set of resource blocks is allocated to the UE if the corresponding bit value in the bitmap is 1, and the set of resource blocks are not allocated otherwise.

FIG. 23

BASE STATION APPARATUS, TERMINAL APPARATUS, AND METHOD FOR A RANDOM ACCESS PROCEDURE IN WIRELESS COMMUNICATION

TECHNICAL FIELD

The present invention relates to a base station apparatus, a terminal apparatus, and a method. This application claims priority based on Japanese Patent Application No. 2019-60241 filed on Mar. 27, 2019, the contents of which are incorporated herein by reference.

BACKGROUND ART

The 3rd Generation Partnership Project (3GPP) has studied a radio access method and a radio network for cellular mobile communications (hereinafter referred to as "Long Term Evolution (LTE)" or "Evolved Universal Terrestrial Radio Access (EUTRA)"). In LTE, a base station apparatus may also be referred to as an evolved NodeB (eNodeB), and a terminal apparatus may also be referred to as user equipment (UE). LTE is a cellular communication system in which multiple areas are deployed in a cell structure, each of the multiple areas being covered by a base station apparatus. A single base station apparatus may manage one or multiple serving cells.

The 3GPP has studied a next generation wireless communication standard (New Radio or NR) to make a proposal for International Mobile Telecommunication (IMT)-2020, a standard for a next-generation mobile communication system, standardized by the International Telecommunication Union (ITU) (NPL 1). NR is required to satisfy requirements assuming three scenarios including enhanced Mobile BroadBand (eMBB), massive Machine Type Communication (mMTC), and Ultra Reliable and Low Latency Communication (URLLC) in a single technology framework.

Further, NR-Unlicensed (NR-U) that is a radio communication method and/or a radio communication system to apply an NR radio access technology (NR-RAT) to an unlicensed frequency band (unlicensed band or unlicensed spectrum) has been studied (NPL 2).

CITATION LIST

Non Patent Literature

NPL 1: "New SID proposal: Study on New Radio Access Technology", RP-160671, NTT Docomo Inc., 3GPP TSG RAN Meeting #71, Goteborg, Sweden, 7-10 Mar. 2016.
NPL 2: "TR38.889 v0.0.2 Study on NR-based Access to Unlicensed Spectrum", R1-1807617, Qualcomm Incorporated, 3GPP TSG RAN WG1 Meeting #93, Busan, Korea, May 21 to 25, 2018.

SUMMARY OF INVENTION

Technical Problem

An aspect of the present invention provides a base station apparatus capable of efficiently performing communication, and a method used by the base station apparatus.

Solution to Problem (1) A first aspect of the present invention is a base station apparatus, which is a base station apparatus including a receiver configured to receive a random access preamble and a transmitter configured to transmit one or multiple medium access control random access responses (MAC RARs) corresponding to the random access preamble, in which the transmitter sets, in a case that a MAC RAR of the one or multiple MAC RARs is transmitted in a new radio access technology (NR) cell, a timing advance command (TAC) field included in the MAC RAR to have a first size and an uplink (UL) grant to have a second size, and sets, in a case that a MAC RAR of the one or multiple MAC RARs is transmitted in an NR-unlicensed (NR-U) cell, a size of the TAC field included in the MAC RAR to be smaller than the first size and a size of the UL grant to be greater than the second size.

(2) A second aspect of the present invention is a method used by a base station apparatus, the method including the steps of receiving a random access preamble, transmitting one or multiple medium access control random access responses (MAC RARs) corresponding to the random access preamble, setting, in a case that a MAC RAR of the one or multiple MAC RARs is transmitted in a new radio access technology (NR) cell, a timing advance command (TAC) field included in the MAC RAR to have a first size and an uplink (UL) grant to have a second size, and setting, in a case that a MAC RAR of the one or multiple MAC RARs is transmitted in an NR-unlicensed (NR-U) cell, a size of the TAC field included in the MAC RAR to be smaller than the first size and a size of the UL grant to be greater than the second size.

(3) A third aspect of the present invention is a terminal apparatus including a transmitter configured to transmit a random access preamble, and a receiver configured to receive one or multiple medium access control random access responses (MAC RARs) corresponding to the random access preamble, in which the receiver receives a MAC RAR of the one or multiple MAC RARs with a first configuration in a new radio access technology (NR) cell and receives a MAC RAR of the one or multiple MAC RARs with a second configuration in an NR-unlicensed (NR-U) cell, and a size of the MAC RAR with the first configuration is identical to a size of the MAC RAR with the second configuration.

Advantageous Effects of Invention

According to one aspect of the present invention, the terminal apparatus can perform communication efficiently. In addition, the base station apparatus can perform communication efficiently.

BRIEF DESCRIPTION OF DRAWINGS

FIG. 2 is an example showing a relationship between $N^{slot}_{symb}$, an SCS configuration μ, and a CP configuration according to an aspect of the present embodiment.

FIG. 4 is a diagram illustrating an example of a relationship between PUCCH formats and a PUCCH format length $N^{PUCCH}_{symb}$ according to an aspect of the present embodiment.

FIG. 11 is a diagram showing an example of triggering/activation of CSI report for a possible CSI-RS configuration according to an aspect of the present embodiment.

FIG. 12 is a diagram showing an example of configurable subband sizes according to an aspect of the present embodiment.

FIG. 13 is a diagram showing an example of priority report levels for part 2CSI according to an aspect of the present embodiment.

FIG. 22 is a diagram showing an example of fields indicating transmission starting positions on the PUSCH (PUSCH starting position fields or PSP fields) in a time domain (time domain starting positions or starting positions in slots) and starting positions on the PUSCH corresponding to each SCS according to the present embodiment.

FIG. 23 is a diagram showing an example of a PUSCH frequency resource allocation type for NR-U according to the present embodiment.

DESCRIPTION OF EMBODIMENTS

Embodiments of the present invention will be described below.

Figure 1:
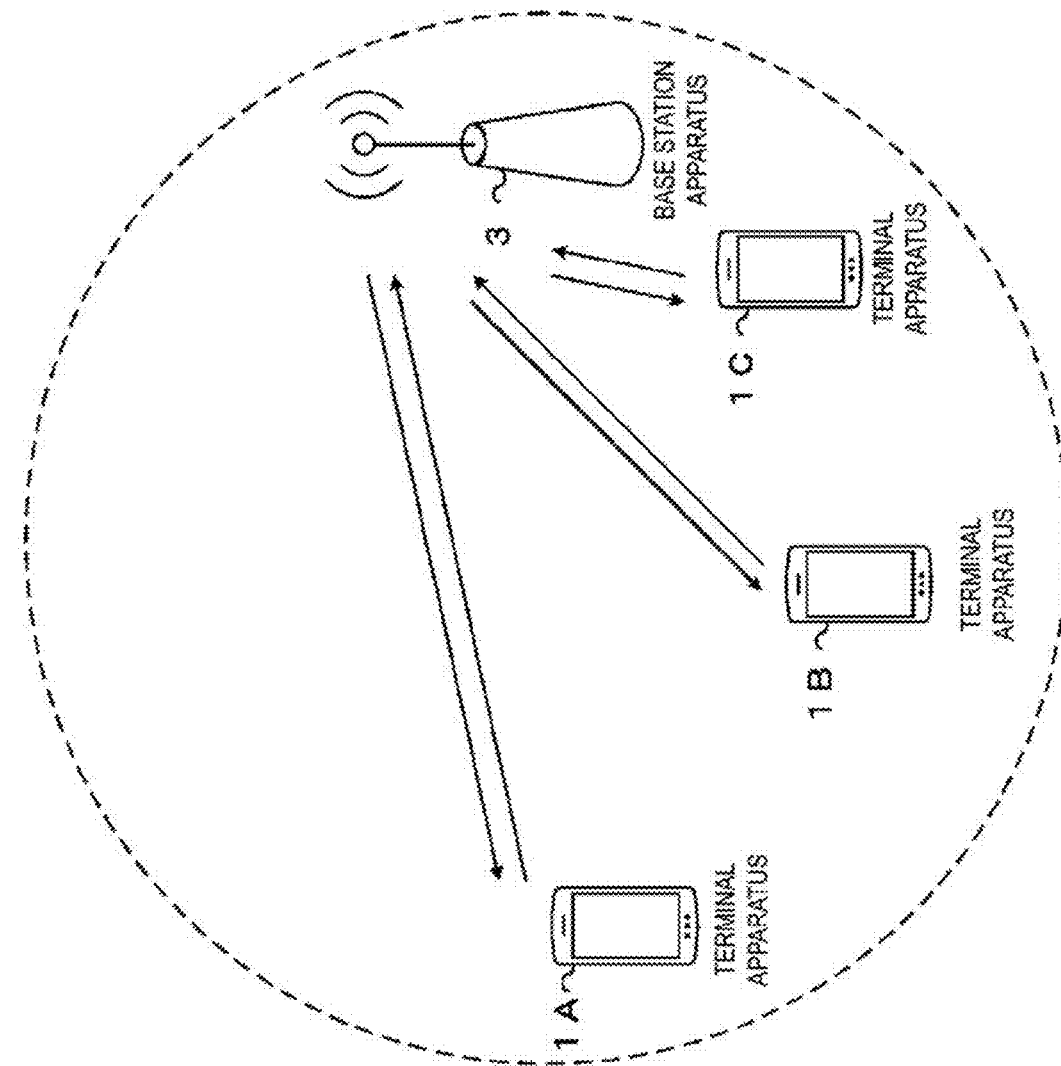
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Each of the terminal apparatuses 1A to 1C may also be referred to as a terminal apparatus 1. Further, the base station apparatus 3 may include some or all of a communication apparatus, a NodeB (NB), an eNB, a gNB, a network apparatus (core network or gateway), and an access point. The terminal apparatus 1 may also be referred to as user equipment (UE). Further, the eNB is a node that provides an EUTRA user plane and a control plane protocol termination to one or multiple terminal apparatuses 1, and particularly, an eNB connected to a fifth generation core network (5GC) via a next generation (NG) interface is referred to as an "ng-eNB." In addition, the gNB is a node that provides an NR user plane and control plane protocol termination to one or multiple terminal apparatuses 1, and is connected to the 5GC via the NG interface.

The base station apparatus 3 may constitute one or both of a master cell group (MCG) and a secondary cell group (SCG). The MCG is a group of serving cells including at least a primary cell (PCell). Furthermore, the SCG is a group of serving cells including at least a primary secondary cell (PSCell). The PCell may be a serving cell provided at the initial connection. The MCG may include one or multiple secondary cells (SCells). The SCG may include one or multiple SCells. The PCell and the PSCell may be referred to as special cells (SpCell). One SpCell and one or multiple SCells may be used to constitute one CG, and communicating may be referred to as carrier aggregation.

The MCG may include one or multiple serving cells on the EUTRA. Furthermore, the SCG may include one or multiple serving cells on the NR. Furthermore, the MCG may include one or multiple serving cells on the NR. Furthermore, the SCG may include one or multiple serving cells on the EUTRA. Furthermore, the MCG and the SCG may include one or multiple serving cells of either the EUTRA or the NR. Here, "being on the EUTRA" may include the meaning that a EUTRA radio access technology (EUTRA RAT) has been applied. Furthermore, "being on the NR" may include the meaning that an NR RAT has been applied.

The MCG may include one or multiple serving cells on the EUTRA. Furthermore, the SCG may include one or multiple serving cells on NR-U. Furthermore, the MCG may include one or multiple serving cells on the NR. Furthermore, the SCG may include one or multiple serving cells on NR-U. Furthermore, the MCG may include one or multiple serving cells on any of the EUTRA, NR, or NR-U. Furthermore, the SCG may include one or multiple serving cells on any of the EUTRA, NR, or NR-U. The NR-U is intended to perform NR-based communication/access/services in frequency bands for which frequency licenses are not required (operating bands). In the frequency bands in which NR-U communication is performed, communication of terminal apparatuses and/or access points (and/or base station apparatuses) providing a wireless local area network (wireless LAN or radio LAN) service (communication and/or scheme), a wireless access systems (WAS) service, an IEEE 802.11 service, a Wi-Fi service, a fixed wireless access (FWA) service, an intelligent transport systems (ITS) service, and a licensed assisted access (LAA) service may be performed. On the other hand, NR is intended for NR-based communication/access/services in frequency bands for which frequency licenses are required. In addition, LTE is intended for LTE-based communication/access/services in frequency bands for which frequency licenses are required. In addition, LAA is intended for LTE-based communication/access/services in frequency bands for which frequency licenses are not required.

The operating bands (carrier frequency and frequency bandwidth) applied to each of the EUTRA, NR, and NR-U may be defined (stipulated) separately.

In addition, the MCG may be constituted by a first base station apparatus. In addition, the SCG may be constituted by a second base station apparatus. In other words, the PCell may be constituted by the first base station apparatus. The PSCell may be constituted by the second base station apparatus. The first base station apparatus and the second base station apparatus may each be the same as the base station apparatus 3.

A frame structure will be described below.

In the radio communication system according to an aspect of the present embodiment, at least orthogonal frequency division multiplexing (OFDM) is used. An OFDM symbol is a unit of the time domain of OFDM. An OFDM symbol includes at least one or multiple subcarriers (subcarrier). An OFDM symbol is converted into a time-continuous signal in generation of a baseband signal. In downlink, cyclic prefix-orthogonal frequency division multiplexing (CP-OFDM) is at least used. In uplink, any of CP-OFDM or discrete Fourier transform-spread-orthogonal frequency division multiplexing (DFT-s-OFDM) is used. DFT-s-OFDM may be given by applying transform precoding to CP-OFDM.

A subcarrier spacing (SCS) may be given based on subcarrier spacing $\Delta f = 2\mu \ast 15$ kHz. For example, SCS configuration $\mu$ may be set to any of 0, 1, 2, 3, 4, and/or 5. For a certain bandwidth part (BWP), the SCS configuration $\mu$ may be given by a higher layer parameter. In other words, a value of $\mu$ may be configured for each BWP (each downlink BWP or uplink BWP) regardless of downlink and/or uplink.

In the radio communication system according to an aspect of the present embodiment, a time unit $T_c$ is used to represent a length of the time domain. The time unit $T_c$ may be given using $T_c = 1/(\Delta f_{max} \ast N_f)$. $\Delta f_{max}$ may be a maximum value of an SCS supported by the radio communication system according to an aspect of the present embodiment. $\Delta f_{max}$ may satisfy $\Delta f_{max} = 480$ kHz. $N_f$ may satisfy $N_f = 4096$. A constant $\kappa$ satisfies $\kappa = \Delta f_{max} \ast N_f/(\Delta f_{ref} N_{f,\,ref}) = 64$. $\Delta f_{ref}$ may be 15 kHz. $N_{f,\,ref}$ may be 2048.

The constant $\kappa$ may be a value indicating a relationship between a reference SCS and $T_c$. The constant $\kappa$ may be used for a length of a subframe. The number of slots included in a subframe may be given at least based on the constant $\kappa$. $\Delta f_{ref}$ is the reference SCS, and $N_{f,\,ref}$ is a value corresponding to the reference SCS.

Signal downlink transmission and/or signal uplink transmission are configured with frames each having a length of 10 ms. A frame includes 10 subframes. A length of a subframe is 1 ms. The length of a frame may be given regardless of an SCS $\Delta f$. That is, a configuration of a frame may be given regardless of a value of $\mu$. The length of a subframe may be given regardless of an SCS $\Delta f$. That is, a configuration of a subframe may be given regardless of $\mu$.

The number and indices of slots included in one subframe may be given for a certain SCS configuration $\mu$. For example, a slot number $n^\mu_s$ may be given in ascending order in the range from 0 to $N^{subframe,\mu}_{slot} - 1$ in a subframe. The number and indices of slots included in one frame may be given for an SCS configuration $\mu$. In addition, a slot number $n^\mu_{s,f}$ may be given in ascending order in the range from 0 to $N^{frame,\mu}_{slot} - 1$ in a frame. $N^{slot}_{symb}$ consecutive OFDM symbols may be included in one slot. $N^{slot}_{symb}$ may be given at least based on part or all of a cyclic prefix (CP) configuration. The CP configuration may be given at least based on a higher layer parameter. The CP configuration may be given at least based on dedicated RRC signaling. The slot number may also be referred to as a slot index.

FIG. 2 is an example showing a relationship between $N^{slot}_{symb}$, an SCS configuration $\mu$, and a CP configuration according to an aspect of the present embodiment. In FIG. 2A, in a case in which the SCS configuration $\mu$ is 2 and the CP configuration is a normal CP (NCP), for example, $N^{slot}_{symb}$ is 14, $N^{frame,\mu}_{slot}$ is 40, and $N^{subframe,\mu}_{slot}$ is 4. In addition, in FIG. 2B, in a case in which the SCS configuration $\mu$ is 2 and the CP configuration is an extended CP (ECP), $N^{slot}_{symb}$ is 12, $N^{frame,\mu}_{slot}$ is 40, and $N^{subframe,\mu}_{slot}$ is 4.

Physical resources according to the present embodiment will be described below.

An antenna port is defined such that a channel over which symbols on one antenna port are conveyed can be inferred from a channel over which other symbols on the same antenna port are conveyed. In a case in which large scale properties of a channel over which a symbol on one antenna port is conveyed can be inferred from a channel on which the symbol on another antenna port is conveyed, the two antenna ports may be said to be quasi co-located (QCL). The large scale properties may include at least long term performance of the channel. The large scale properties may include at least some or all of delay spread, Doppler spread, Doppler shift, average gain, average delay, and spatial Rx parameters. A first antenna port and a second antenna port being QCL with respect to beam parameters may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case in which large scale properties of a channel over which a symbol on one antenna port is conveyed can be inferred from a channel over which a symbol on another antenna port is conveyed, the terminal apparatus 1 may assume the two antenna ports to be QCL. Two antenna ports being QCL may mean that the two antenna ports are assumed to be QCL.

For a set of the SCS configuration $\mu$ and a carrier, a resource grid defined with $N^{size,\mu}_{grid,x} N^{RB}_{sc}$ subcarriers and $N^{subframe,\mu}_{symb}$ OFDM symbols is given. $N^{size,\mu}_{grid,\,x}$ may indicate the number of resource blocks given for the SCS configuration $\mu$ for a carrier x. $N^{size,\mu}_{grid,\,x}$ may indicate the bandwidth of the carrier. $N^{size,\mu}_{grid,\,x}$ may correspond to the value of the higher layer parameter CarrierBandwidth. The carrier x may indicate either a downlink carrier or an uplink carrier. In other words, x may be either "DL" or "UL." $N^{RB}_{sc}$ may indicate the number of subcarriers included in one resource block. $N^{RB}_{sc}$ may be 12. At least one resource grid may be given for each antenna port p and/or for each SCS configuration $\mu$ and/or for each transmission direction configuration. The transmission direction includes at least downlink (DL) and uplink (UL). Hereinafter, a set of parameters including at least some or all of the antenna port p, the SCS configuration $\mu$, and the transmission direction configuration may also be referred to as a first radio parameter set. In other words, one resource grid may be given for each first radio parameter set. Further, the radio parameter set may be one or multiple sets including one or multiple radio parameters (physical layer parameters or higher layer parameters).

A carrier included in a serving cell in downlink is referred to as a downlink carrier (or a downlink component carrier).

A carrier included in a serving cell in uplink is referred to as an uplink carrier (or an uplink component carrier). A downlink component carrier and an uplink component carrier may be collectively referred to as a component carrier (or a carrier).

The type of the serving cell may be any of a PCell, a PSCell, and an SCell. The PCell may be a serving cell that is identified at least based on a cell ID (a physical layer cell ID or a physical cell ID) acquired from a synchronization signal/physical broadcast channel block (SSB) in initial connection. An SCell may be a serving cell used in carrier aggregation. The SCell may be a serving cell given at least based on dedicated RRC signaling.

Each element in the resource grid given for each first radio parameter set may be referred to as a resource element (RE). The resource element is identified by an index $k_{sc}$ of the frequency domain and an index $l_{sym}$ of the time domain. The resource element is identified by the index $k_{sc}$ of the frequency domain and the index $l_{sym}$ of the time domain for a certain first radio parameter set. The resource element identified by the index $k_{sc}$ of the frequency domain and the index $l_{sym}$ of the time domain may also be referred to as a resource element ($k_{sc}$, $l_{sym}$). The index $k_{sc}$ of the frequency domain indicates any value from 0 to $N^{\mu}_{RB} N^{RB}_{sc} - 1$. $N^{\mu}_{RB}$ may be the number of resource blocks given for the SCS configuration μ. $N^{\mu}_{RB}$ may be $N^{size, \mu}_{grid, x}$. $N^{RB}_{sc}$ is the number of subcarriers included in a resource block, satisfying $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$. One or multiple resource elements may correspond to physical resources and complex values (complex-value modulation symbols). One or multiple information bits (control information, transport blocks, and information bits for higher layer parameters) may be mapped to each of the one or multiple resource elements corresponding to the physical resources and/or the complex values.

Figure 3:
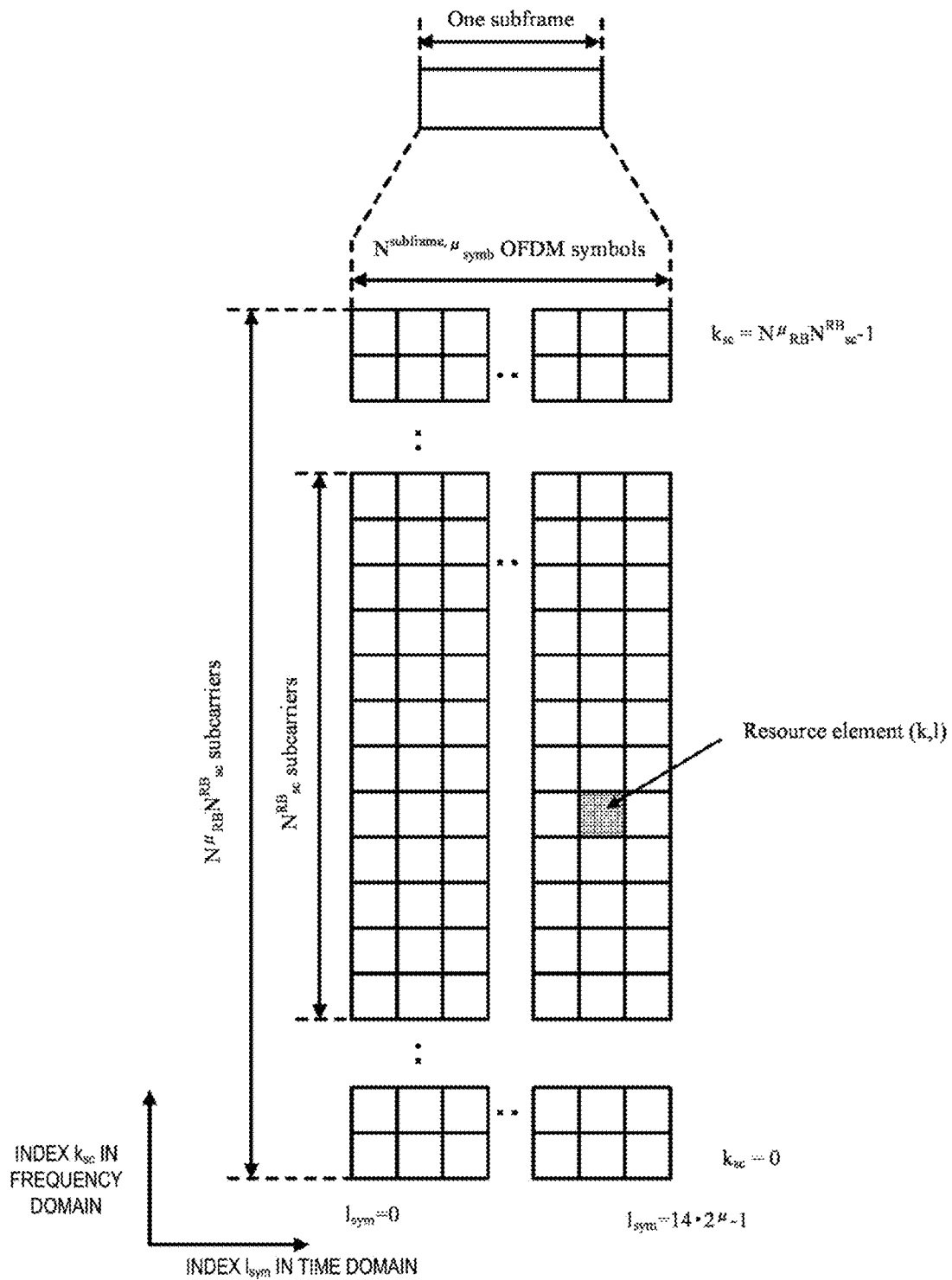
FIG. 3 is a schematic diagram illustrating an example of a resource grid of a subframe according to an aspect of the present embodiment.

FIG. 3 is a schematic diagram illustrating an example of a resource grid of a subframe according to an aspect of the present embodiment. In the resource grid of FIG. 3, the horizontal axis is the index $l_{sym}$ of the time domain, and the vertical axis is the index $k_{sc}$ of the frequency domain. In one subframe, the frequency domain of the resource grid includes $N^{\mu}_{RB} N^{RB}_{sc}$ subcarriers. In one subframe, the time domain of the resource grid may include 14·2μ OFDM symbols. One resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive an indication to perform transmission/reception by using only a subset of the resource grid. The subset of the resource grid is also referred to as a BWP, and the BWP may be given at least based on a higher layer parameter and/or part or all of DCI. A BWP may also be referred to as a carrier bandwidth part (CBP). The terminal apparatus 1 may not receive an indication to perform transmission/reception by using all sets of resource grids. The terminal apparatus 1 may receive an indication to perform transmission/reception by using some frequency resources within the resource grid. One BWP may include multiple resource blocks in the frequency domain. One BWP may include continuous multiple resource blocks in the frequency domain. A BWP configured for a downlink carrier may also be referred to as a downlink BWP. A BWP configured for an uplink carrier may also be referred to as an uplink BWP. A BWP may be a subset of the band of a carrier (a subset of the frequency domain in the carrier).

One or multiple downlink BWPs may be configured for each serving cell. One or multiple uplink BWPs may be configured for each serving cell.

One downlink BWP among the one or multiple downlink BWPs configured for the serving cell may be configured as an active downlink BWP. A downlink BWP switch is used to deactivate one active downlink BWP and to activate an inactive downlink BWP other than the one active downlink BWP. The switching of the downlink BWP may be controlled by a BWP field included in downlink control information. The switching of the downlink BWP may be controlled based on a higher layer parameter.

A DL-SCH may be received in the active downlink BWP. A PDCCH may be monitored in the active downlink BWP. A PDSCH may be received in the active downlink BWP.

The DL-SCH is not received in the inactive downlink BWP. The PDCCH is not monitored in the inactive downlink BWP. CSI for the inactive downlink BWP is not reported.

Two or more downlink BWPs among the one or multiple downlink BWPs configured for the serving cell may not be configured as active downlink BWPs.

One uplink BWP among one or multiple uplink BWPs configured for a serving cell may be configured as an active uplink BWP. An uplink BWP switch is used to deactivate one active uplink BWP and to activate an inactive uplink BWP other than the one active uplink BWP. The switching of the uplink BWP may be controlled by a BWP field included in downlink control information. The switching of the uplink BWP may be controlled based on a higher layer parameter.

A UL-SCH may be transmitted in the active uplink BWP. A PUCCH may be transmitted in the active uplink BWP. A PRACH may be transmitted in the active uplink BWP. An SRS may be transmitted in the active uplink BWP.

A UL-SCH is not transmitted in the inactive uplink BWP. A PUCCH is not transmitted in the inactive uplink BWP. A PRACH is not transmitted in the inactive uplink BWP. An SRS is not transmitted in the inactive uplink BWP.

Two or more uplink BWPs among one or multiple uplink BWPs configured for one serving cell may not be configured as an active uplink BWP. In other words, at least only one active uplink BWP may be used for the serving cell including the uplink BWP.

A higher layer parameter is a parameter included in higher layer signaling. The higher layer signaling may be a radio resource control (RRC) signaling or a medium access control (MAC) control element (CE). Here, the higher layer signaling may be RRC layer signaling or MAC layer signaling. Further, the higher layer parameter given by the RRC layer signaling may be notified to the terminal apparatus 1 from the base station apparatus 3 and configured.

The higher layer signaling may be common RRC signaling. The common RRC signaling may include at least some or all of the following features C1 to C3:
feature C1) being mapped to a BCCH logical channel or a CCCH logical channel;
feature C2) at least including a ReconfigurationWithSync information element; and
feature C3) being mapped to a PBCH.

The ReconfigurationWithSync information element may include information indicating a configuration commonly used in a serving cell. The configuration commonly used in a serving cell may include at least the configuration of a PRACH. The configuration of a PRACH may indicate at least one or multiple random access preamble indices. The configuration of a PRACH may indicate at least time/frequency resources of the PRACH.

The common RRC signaling may include at least a common RRC parameter. The common RRC parameter may be a cell-specific parameter commonly used in the serving cell.

The higher layer signaling may be dedicated RRC signaling. The dedicated RRC signaling may include at least some or all of the following features D1) and D2:
feature D1) being mapped to a DCCH logical channel; and
feature D2) including no ReconfigurationWithSync information elements.

For example, a master information block (MIB) and a system information block (SIB) may be included in the common RRC signaling. In addition, a higher layer message that is mapped to a DCCH logical channel and includes at least a ReconfigurationWithSync information element may be included in the common RRC signaling. In addition, a higher layer message that is mapped to a DCCH logical channel and does not include a ReconfigurationWithSync information element may be included in the dedicated RRC signaling. Further, the MIB and the SIB may be collectively referred to as system information.

Further, the higher layer parameter including one or multiple higher layer parameters may be referred to as an information element (IE). Moreover, the higher layer parameter and/or IE including one or multiple higher layer parameters and/or one or multiple IEs may be referred to as a message (a higher layer message or an RRC message), an information block (IB), and system information.

An SIB may indicate at least the time index of an SSB. The SIB may include at least information of PRACH resources. The SIB may include at least information of a configuration of initial connection.

The ReconfigurationWithSync information element may include at least information of the PRACH resources. The ReconfigurationWithSync information element may include at least information of the configuration of initial connection.

The dedicated RRC signaling may include at least a dedicated RRC parameter. The dedicated RRC parameter may be a UE-specific parameter dedicated to the terminal apparatus 1. The dedicated RRC signaling may include at least a common RRC parameter.

The common RRC parameter and the dedicated RRC parameter may also be referred to as higher layer parameters.

A physical channel and a physical signal according to various aspects of the present embodiment will be described below.

An uplink physical channel may correspond to a set of resource elements that carries information generated in a higher layer. The uplink physical channel is a physical channel used in an uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit uplink control information (UCI). The uplink control information includes part or all of hybrid automatic repeat request acknowledgment (HARQ-ACK) information corresponding to channel state information (CSI), a scheduling request (SR), and a transport block (TB). Further, a TB may be referred to as a medium access control protocol data unit (MAC PDU), a downlink-shared channel (DL-SCH), or a physical downlink shared channel (PDSCH).

The PUCCH may be multiplexed with one or multiple types of uplink control information. The multiplexed PUCCH may be transmitted. In other words, the PUCCH may be multiplexed with multiple HARQ-ACKs, multiple pieces of CSI, multiple SRs, a HARQ-ACK and CSI, a HARQ-ACK and SR, or other types of UCI.

HARQ-ACK information may include at least a HARQ-ACK bit corresponding to a TB. The HARQ-ACK bit may indicate an acknowledgement (ACK) or a negative-acknowledgement (NACK) corresponding to a TB. An ACK may be a value indicating that decoding of the TB has been successfully completed. An NACK may be a value indicating that decoding of the TB has not been successfully completed. The HARQ-ACK information may include at least one HARQ-ACK codebook including one or multiple HARQ-ACK bits. The fact that HARQ-ACK bits correspond to one or multiple TBs may mean that HARQ-ACK bits correspond to the PDSCH including one or multiple TBs.

A HARQ-ACK bit may indicate an ACK or an NACK corresponding to one code block group (CBG) included in a TB. A HARQ-ACK may also be referred to as HARQ feedback, HARQ information, or HARQ control information.

An SR may be at least used to request PUSCH resources for initial transmission. In addition, the SR may be used to request UL-SCH resources for the new transmission. An SR bit may be used to indicate either a positive SR or a negative SR. An SR bit indicating a positive SR may also be referred to as "a positive SR being transmitted". A positive SR may indicate that the terminal apparatus 1 has requested PUSCH resources for initial transmission. A positive SR may indicate that the SR is triggered by a higher layer. A positive SR may be transmitted in a case that it is indicated to transmit an SR by the higher layer. An SR bit indicating a negative SR may also be referred to as "a negative SR being transmitted". A negative SR may indicate that the terminal apparatus 1 does not request PUSCH resources for initial transmission. A negative SR may indicate that the SR is not triggered by the higher layer. A negative SR may be transmitted in a case that it is indicated to transmit an SR by the higher layer.

An SR bit may be used to indicate either a positive SR or a negative SR for any of one or multiple SR configurations. Each of the one or multiple SR configurations may correspond to one or multiple logical channels. A positive SR for a given SR configuration may be a positive SR for any or all of the one or multiple logical channels corresponding to the given SR configuration. A negative SR may not correspond to a particular SR configuration. Indicating a negative SR may be indicating a negative SR for all SR configurations.

The SR configuration may be a scheduling request ID (SR-ID). An SR-ID may be given at least based on a higher layer parameter.

A CSI may include at least some or all of a channel quality indicator (CQI), a precoder matrix indicator (PMI), and a rank indicator (RI). A CQI is an indicator relating to channel quality (e.g., propagation strength), and a PMI is an indicator of a precoder. An RI is an indicator indicating a transmission rank (or the number of transmission layers).

A CSI may be given at least based on receiving a physical signal (e.g., CSI-RS) at least used for channel measurement. A CSI may include a value selected by the terminal apparatus 1. A CSI may be selected by the terminal apparatus 1 at least based on receiving a physical signal at least used for channel measurement. The channel measurement may include interference measurement. Further, a CSI-RS may be set based on a CSI-RS configuration or may be set based on an SSB configuration.

A CSI report is a report of a CSI. A CSI report may include a CSI part 1 and/or a CSI part 2. The CSI part 1 may be include at least some or all of wideband channel quality information (wideband CQI), a wideband precoder matrix indicator (PMI), and an RI. The number of bits of the CSI part 1 multiplexed with the PUCCH may be a prescribed value regardless of a value of an RI of a CSI report. The number of bits of the CSI part 2 multiplexed with the PUCCH may be given based on a value of an RI of a CSI report. A rank indicator of a CSI report may be a value of the rank indicator used for the calculation of the CSI report. An RI of CSI information may be a value indicated by an RI field included in the CSI report.

A set of RIs allowed in the CSI report may include some or all of 1 to 8. In addition, the set of RIs allowed in the CSI report may be given at least based on a higher layer parameter RankRestriction. In a case in which the set of RIs allowed in the CSI report includes only one value, the RI of the CSI report may be the one value.

A priority may be configured for the CSI report. The priority of the CSI report may be given at least based on some or all of a configuration relating to behaviors (processing) of the time domain of the CSI report, the type of content of the CSI report, the index of the CSI report, and/or the index of the serving cell for which measurement of the CSI report is configured.

The configuration relating to the behaviors (processing) of the time domain of the CSI report may be a configuration indicating whether the CSI report is aperiodically made, or the CSI report is semi-persistently or semi-statically made.

The type of content of the CSI report may indicate whether the CSI report includes reference signals received power (RSRP) of Layer 1.

The index of the CSI report may be given using a higher layer parameter.

A PUCCH supports one or multiple PUCCH formats (PUCCH format 0 to PUCCH format 4). A PUCCH format may be transmitted on a PUCCH. Transmission of a PUCCH format may be transmission of a PUCCH.

FIG. 4 is a diagram illustrating an example of a relationship between PUCCH formats and a PUCCH format length $N^{PUCCH}_{symb}$ according to an aspect of the present embodiment. The length $N^{PUCCH}_{symb}$ of a PUCCH format 0 is one or two OFDM symbols. The length $N^{PUCCH}_{symb}$ of a PUCCH format 1 is any of 4 to 14 OFDM symbols. The length $N^{PUCCH}_{symb}$ of a PUCCH format 2 is one or two OFDM symbols. The length $N^{PUCCH}_{symb}$ of a PUCCH format 3 is any of 4 to 14 OFDM symbols. The length $N^{PUCCH}_{symb}$ of a PUCCH format 4 is any of 4 to 14 OFDM symbols.

A PUSCH is at least used to transmit TBs (MAC PDU or UL-SCH). A PUSCH may be used to transmit at least some or all of TBs, HARQ-ACK information, CSIs, and SRs. A PUSCH is at least used to transmit an RAR (Msg2) and/or a random access message 3 (message 3 (Msg3)) corresponding to an RAR grant in the random access procedure. Further, a TB may correspond to uplink and downlink. In other words, a PUSCH may be used to transmit a TB in uplink. The PDSCH may be used to transmit a TB in downlink.

The PRACH is at least used to transmit a random access preamble (random access message 1 or message 1 (Msg1)). The PRACH may be at least used to indicate some or all of an initial connection establishment procedure, a handover procedure, a connection re-establishment procedure, an initial access procedure, synchronization with transmission of the PUSCH (timing adjustment), and a PUSCH resource request. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and a cyclic shift. The physical root sequence index u and the cyclic shift may be given at least based on information included in system information. The physical root sequence index u may be an index for identifying the sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but be used by a physical layer.

UpLink Demodulation Reference Signal (UL DMRS)
Sounding Reference Signal (SRS)
UpLink Phase Tracking Reference Signal (UL PTRS)

The UL DMRS relates to transmission of a PUSCH and/or a PUCCH. The UL DMRS is multiplexed with the PUSCH or the PUCCH. The base station apparatus 3 may use the UL DMRS in order to correct a propagation path of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for the PUSCH. The UL DMRS associated with the PUCCH is also referred to as a UL DMRS for the PUCCH.

An SRS may not be associated with transmission of the PUSCH or the PUCCH. The base station apparatus 3 may use the SRS for measuring a channel state. The SRS may be transmitted at the end of a subframe in an uplink slot or in a predetermined number of OFDM symbols from the end.

A UL PTRS may be a reference signal that is at least used for phase tracking. A UL PTRS may be associated with a UL DMRS group including at least an antenna port used for one or multiple UL DMRSs. The association of the UL PTRS with the UL DMRS group may mean that an antenna port for the UL PTRS and some or all of antenna ports included in the UL DMRS group are at least QCL. The UL DMRS group may be identified at least based on the antenna port of the lowest index for the UL DMRS included in the UL DMRS group. The UL PTRS may be mapped to the antenna port with the lowest index among one or multiple antenna ports to which one codeword is mapped. The UL PTRS may be mapped to a first layer in a case that one codeword is at least mapped to the first layer and a second layer. The UL PTRS may not be mapped to the second layer. The index of the antenna port to which the UL PTRS is mapped may be given at least based on the downlink control information.

In FIG. 1, the following downlink physical channels are used for downlink radio communication from the base station apparatus 3 to the terminal apparatus 1. The downlink physical channels are used in the physical layer for transmission of information output from a higher layer.

Physical Broadcast Channel (PBCH)
Physical Downlink Control Channel (PDCCH)
Physical Downlink Shared Channel (PDSCH)

The PBCH is used at least to transmit an MIB and/or a PBCH payload. The PBCH payload may include at least information indicating an index related to an SSB transmission timing (SSB occasion). The PBCH payload may include information relating to an SSB identifier (index). The PBCH may be transmitted at prescribed transmission intervals. The PBCH may be transmitted at an interval of 80 milliseconds (ms). The PBCH may be transmitted at an interval of 160 ms. The content of information included in the PBCH may be updated every 80 ms. Part or all of information included in the PBCH may be updated every 160 ms. The PBCH may include 288 subcarriers. The PBCH may include 2, 3, or 4 OFDM symbols. The MIB may include information on an SSB identifier (index). The MIB may include information indicating at least some of numbers of a slot, a subframe and/or a radio frame in which a PBCH is transmitted.

The PDCCH is at least used for transmitting downlink control information (DCI). The PDCCH may be transmitted at least including the DCI. The PDCCH may be transmitted including the DCI. The DCI may also be referred to as a DCI format. The DCI may indicate at least any of a downlink grant or an uplink grant. The DCI format used for scheduling of the PDSCH may also be referred to as a downlink DCI format and/or a downlink grant. The DCI format used for scheduling of the PUSCH may also be referred to as an uplink DCI format and/or an uplink grant. The downlink grant may also be referred to as downlink assignment or downlink allocation. The uplink DCI format includes at least one or both of a DCI format 0_0 and a DCI format 0_1.

The DCI format 0_0 may include at least some or all of 1A to 1J.

1A) DCI format identification field (Identifier for DCI formats field)
1B) Frequency domain resource assignment field
1C) Time domain resource assignment field
1D) Frequency hopping flag field
1E) Modulation and coding scheme (MCS) field
1F) First CSI request field
1G) New data indicator (NDI) field
1H) Redundancy version (RV) field
1I) HARQ processing ID (HPID) field (HARQ process number field)
1J) Transmission power control (TPC) command for scheduled PUSCH field 1A may be used at least to indicate whether the DCI format including 1A corresponds to one or multiple DCI formats. The one or multiple DCI formats may be given at least based on some or all of the DCI format 1_0, the DCI format 1_1, the DCI format 0_0, and/or the DCI format 0_1.

1B may be used at least to indicate the allocation of the frequency resources for the PUSCH scheduled in the DCI format including 1B.

1C may be used at least to indicate the allocation of the time resources for the PUSCH scheduled in the DCI format including 1C.

1D may be used at least to indicate whether frequency hopping is applied to the PUSCH scheduled in the DCI format including 1D.

1E may be used at least to indicate some or all of the modulation scheme and/or a target coding rate for the PUSCH scheduled in the DCI format including 1E. The target coding rate may be a target coding rate for a TB of the PUSCH. A size of the TB (TBS) may be given at least based on the target coding rate.

1F is at least used to indicate a CSI report. The size of 1F may be a predetermined value. The size of 1F may be 0, 1, 2, or 3. The size of 1F may be determined according to the number of CSI configurations configured for the terminal apparatus 1.

1G is used to indicate whether the transmission of the PUSCH corresponding to 1I is new transmission or retransmission scheduled in the DCI format, based on whether the value of 1G is toggled. In a case that the value of 1G has been toggled, the PUSCH corresponding to 1I is for new transmission, otherwise the PUSCH corresponding to 1I is for retransmission. 1G may be a DCI indicating whether the base station apparatus 3 requests retransmission of the PUSCH corresponding to 1I.

1H is used to indicate a starting position of a bit sequence of a PUSCH scheduled in the DCI format.

1I is used to indicate a HARQ process number (HPID) to which the PUSCH scheduled in the DCI format corresponds.

1J is used to adjust a transmission power of the PUSCH scheduled in the DCI format.

DCI format 0_1 includes at least some or all of 2A to 2K.
2A) DCI format identification field
2B) Frequency domain resource assignment field
2C) Time domain resource assignment field
2D) Frequency hopping flag field
2E) MCS field
2F) Second CSI request field
2G) BWP field
2H) NDI field
2I) RV field
2J) HPID field
2K) TPC command field for PUSCH The BWP field may be used to indicate an uplink BWP to which the PUSCH scheduled in the DCI format 0_1 is mapped.

A second CSI request field is at least used to indicate a CSI report. The size of the second CSI request field may be given at least based on the higher layer parameter ReportTriggerSize.

Because the fields with the same name as those of 1A to 1J described above include the same content, description thereof will be omitted.

The downlink DCI format includes at least one or both of a DCI format 1_0 and a DCI format 1_1.

The DCI format 1_0 may include at least some or all of 3A to 3L.

3A) DCI format identification field (Identifier for DCI formats field)
3B) Frequency domain resource assignment field
3C) Time domain resource assignment field
3D) Frequency hopping flag field
3E) Modulation and coding scheme (MCS) field
3F) First CSI request field
3G) PDSCH to HARQ feedback timing indicator field
3H) PUCCH resource indicator field
3I) NDI field 3J) RV field
3K) HPID field
3L) TPC command for scheduled PUCCH field 3B to 3E may be used for the PDSCH scheduled in the DCI format.

3G may be a field indicating a timing K1. In a case that the index of the slot including the last OFDM symbol of the PDSCH is a slot n, the index of the slot including the PUCCH or the PUSCH including at least the HARQ-ACK corresponding to the TB included in the PDSCH may be n+K1. In a case that the index of the slot including the last OFDM symbol of the PDSCH is a slot n, the index of the slot including the first OFDM symbol of the PUCCH or the first OFDM symbol of the PUSCH including at least the HARQ-ACK corresponding to the TB included in the PDSCH may ben+K1.

3H may be a field indicating the index of one or multiple PUCCH resources included in a PUCCH resource set.

3I is used to indicate whether the transmission of the PDSCH corresponding to 3K is new transmission or retransmission scheduled in the DCI format, based on whether the value of 3I is toggled. In a case that the value of 3K has been toggled, the PDSCH corresponding to 3K is new transmission, otherwise the PDSCH corresponding to the 3K is retransmission.

3J may be used to indicate the starting position of the PDSCH bit sequence scheduled in the DCI format.

3K is used to indicate a HARQ process number to which the PDSCH scheduled in the DCI format corresponds.

3L is used to adjust a transmission power of the PUCCH corresponding to the PDSCH scheduled in the DCI format.

The DCI format 1_1 may include at least some or all of 4A to 4N.
 4A) DCI format identification field
 4B) Frequency domain resource assignment field
 4C) Time domain resource assignment field
 4D) Frequency hopping flag field
 4E) MCS field
 4F) First CSI request field
 4G) PDSCH to HARQ feedback timing indicator field
 4H) PUCCH resource indicator field
 4J) BWP field
 4K) NDI field
 4L) RV field
 4M) HPID field
 4N) TPC command field for PUCCH 3A and 4A are used to identify the DCI format, in the same manner as in 1A and 2A.

4B to 4E may be used for the PDSCH scheduled in the DCI format.

4J may be used to indicate the downlink BWP to which the PDSCH scheduled in the DCI format 1_1 is mapped.

Because the fields with the same name as those of 3A to 3L described above include the same content, description thereof will be omitted.

Each DCI format may include a padding bit to match a given bit size (payload size).

A DCI format 2 may include parameters used for transmission power control of the PUSCH or PUCCH.

In various aspects of the present embodiment, the number of resource blocks (RBs) indicates the number of resource blocks in the frequency domain unless otherwise specified. In addition, indexes of resource blocks are given to the resource blocks in ascending order from a resource block mapped to a lowest high frequency domain to a resource block mapped to a highest frequency domain. In addition, a resource block is a generic term of common resource block and physical resource block.

One physical channel may be mapped to one serving cell. One physical channel may be mapped to one CBP configured for one carrier included in one serving cell.

The terminal apparatus 1 is given one or multiple control resource sets (CORESETs). The terminal apparatus 1 monitors the PDCCH in one or multiple CORESETs.

The CORESETs may indicate a time-frequency domain to which one or multiple PDCCHs can be mapped. The CORESETs may be a domain in which the terminal apparatus 1 monitors the PDCCHs. The CORESETs may include continuous resources (localized resources). The CORESETs may include non-continuous resources (distributed resources).

The unit of mapping of CORESETs in the frequency domain may be resource blocks (RBs). For example, the unit of mapping of CORESETs in the frequency domain may be six resource blocks. In other words, the mapping of the CORESETs in the frequency domain may be performed in 6 RBs×n (n is 1, 2, . . . ). The unit of mapping of the CORESETs in the time domain may be OFDM symbols. For example, the unit of mapping of the CORESETs in the time domain may be one OFDM symbol.

The frequency domain of the CORESETs may be given at least based on higher layer signaling and/or DCI.

The time domain of the CORESETs may be given at least based on higher layer signaling and/or DCI.

A certain CORESET may be a common CORESET. The common CORESET may be a CORESET configured commonly for multiple terminal apparatuses 1. The common CORESET may be given at least based on some or all of an MIB, an SIB, common RRC signaling, and the cell ID. For example, time resources and/or frequency resources of the CORESET configured to monitor the PDCCH to be used for scheduling of the SIB may be given at least based on the MIB.

A certain CORESET may be a dedicated CORESET. The dedicated CORESET may be a CORESET configured to be used exclusively for the terminal apparatuses 1. The dedicated CORESET may be provided at least based on the dedicated RRC signaling.

A set of candidates for the PDCCH monitored by the terminal apparatus 1 may be defined from the perspective of a search space. In other words, a set of PDCCH candidates monitored by the terminal apparatus 1 may be provided by a search space.

A search space may include one or multiple PDCCH candidates of one or multiple aggregation levels. An aggregation level of the PDCCH candidates may indicate the number of CCEs constituting the PDCCH.

The terminal apparatus 1 may monitor at least one or multiple search spaces in slots in which discontinuous reception (DRX) is not configured. DRX may be given at least based on a higher layer parameter. The terminal apparatus 1 may monitor at least one or multiple search space sets in a slot in which DRX is not configured.

A search space set may include at least one or multiple search spaces. The type of a search space set may be any of a type-0 PDCCH common search space, a type-0a PDCCH common search space, a type-1 PDCCH common search space, a type-2 PDCCH common search space, a type-3 PDCCH common search space, and/or a UE-specific PDCCH search space.

The type-0 PDCCH common search space, the type-0a PDCCH common search space, the type-1 PDCCH common search space, the type-2 PDCCH common search space, and the type-3 PDCCH common search space may also be referred to as a common search space (CSS). The UE-specific PDCCH search space may also be referred to as UE-specific search space (USS).

Each search space set may be associated with one control resource set. Each search space set may include at least one control resource set. An index of a control resource set associated with each search space set may be given to each search space set.

The type-0 PDCCH common search space may be used at least for a DCI format with a cyclic redundancy check (CRC) sequence scrambled with a system information-radio network temporary identifier (SI-RNTI). The configuration of the type-0 PDCCH common search space may be given at least based on four bits of the least significant bits (LSB) of the higher layer parameter PDCCH-ConfigSIBL The higher layer parameter PDCCH-ConfigSIB1 may be included in the MIB. The configuration of the type-0 PDCCH common search space may be given at least based on a higher layer parameter SearchSpaceZero. The interpretation of the bits of the higher layer parameter SearchSpaceZero may be similar to interpretation of four bits of the higher layer parameter PDCCH-ConfigSIBL The configuration of the type-0 PDCCH common search space may be given at least based on a higher layer parameter SearchSpaceSIB1. The higher layer parameter SearchSpaceSIB1 may be included in a higher layer parameter PDCCH-ConfigCommon. The PDCCH detected in the type-0 PDCCH common search space may be at least used for scheduling of the PDSCH to be transmitted including an SIB1. The SIB1 is a type of an SIB. The SIB1 may include scheduling information for the SIB other than the SIB 1. The terminal apparatus 1 may receive the higher layer parameter PDCCH-ConfigCommon in EUTRA. The terminal apparatus 1 may receive the higher layer parameter PDCCH-ConfigCommon in an MCG.

The type-0a PDCCH common search space may be used at least for a DCI format with a cyclic redundancy check (CRC) sequence scrambled with a system information-radio network temporary identifier (SI-RNTI). The configuration of the type-0a PDCCH common search space may be given at least based on a higher layer parameter SearchSpaceOtherSystemInformation. The higher layer parameter SearchSpaceOtherSystemInformation may be included in the SIB1. The higher layer parameter SearchSpaceOtherSystemInformation may be included in the higher layer parameter PDCCH-ConfigCommon. The PDCCH detected in the type-0 PDCCH common search space may be at least used for scheduling of the PDSCH to be transmitted including the SIB other than the SIB1.

The type-1 PDCCH common search space may be used at least for a DCI format with a CRC sequence scrambled with a random access-radio network temporary identifier (RA-RNTI) and/or a CRC sequence scrambled with a temporary common-radio network temporary identifier (TC-RNTI). The RA-RNTI may be given at least based on time/frequency resources of the random access preamble transmitted by the terminal apparatus 1. The TC-RNTI may be given by a PDSCH (also referred to as a random access message 2, message 2 (Msg2), or a random access response (RAR)) scheduled in the DCI format with the CRC sequence scrambled with the RA-RNTI. The type-1 PDCCH common search space may be given at least based on a higher layer parameter ra-SearchSpace. The higher layer parameter ra-SearchSpace may be included in the SIB1. The higher layer parameter ra-SearchSpace may be included in the higher layer parameter PDCCH-ConfigCommon.

The type-2 PDCCH common search space may be used at least for a DCI format with a CRC sequence scrambled by a paging-radio network temporary identifier (P-RNTI). The P-RNTI may be used at least for transmission of the DCI format including information reporting a change in the SIB. The type-2 PDCCH common search space may be given at least based on a higher layer parameter PagingSearchSpace. The higher layer parameter PagingSearchSpace may be included in the SIB1. The higher layer parameter PagingSearchSpace may be included in the higher layer parameter PDCCH-ConfigCommon.

The type-3 PDCCH common search space may be used at least for a DCI format with a CRC sequence scrambled with a cell-radio network temporary identifier (C-RNTI). The C-RNTI may be given at least based on a PDSCH (which may also be referred to as a random access message 4, a message 4 (Msg4), or a contention resolution) scheduled in a DCI format with a CRC sequence scrambled with the TC-RNTI. The type-3 PDCCH common search space may be a search space set given in a case that a higher layer parameter SearchSpaceType is set to common.

The UE-specific PDCCH search space may be at least used for the DCI format with the CRC sequence scrambled with the C-RNTI.

In a case that the C-RNTI is given to the terminal apparatus 1, the type-0 PDCCH common search space, the type-0a PDCCH common search space, the type-1 PDCCH common search space, and/or the type-2 PDCCH common search space may be at least used for the DCI format with the CRC sequence scrambled with the C-RNTI.

In a case that the C-RNTI is given to the terminal apparatus 1, a search space set given at least based on any of the higher layer parameter PDCCH-ConfigSIB1, the higher layer parameter SearchSpaceZero, the higher layer parameter SearchSpaceSIB1, the higher layer parameter SearchSpaceOtherSystemInformation, the higher layer parameter ra-SearchSpace, and the higher layer parameter PagingSearchSpace may be at least used for the DCI format with the CRC sequence scrambled with the C-RNTI.

The common CORESET may include at least one or both of a CSS and a USS. The dedicated CORESET may include at least one or both of a CSS and a USS.

Physical resources of a search space are constituted by control channel elements (CCEs). A CCE is constituted by six resource element groups (REGs). An REG may be constituted by one OFDM symbol of one physical resource block (PRB). In other words, an REG may include 12 resource elements (REs). A PRB may also be referred to simply as a resource block (RB).

A PDSCH is at least used to transmit TBs. Moreover, the PDSCH may be at least used to transmit the random access message 2 (RAR or Msg2). Moreover, the PDSCH may be at least used to transmit system information including parameters used for initial access.

In FIG. 1, the following downlink physical signals are used in downlink radio communication. Although the downlink physical signals may not be used for transmitting information output from a higher layer, they are used by the physical layer.

Synchronization signal
Downlink demodulation reference signal (DL DMRS)
Channel state information-reference signal (CSI-RS)
Downlink phrase tracking reference signal (DL PTRS)
Tracking reference signal (TRS)

The synchronization signal is used by the terminal apparatus 1 to establish synchronization in the frequency domain and/or the time domain in downlink. Further, the synchronization signal includes a primary synchronization signal (PSS) and a secondary synchronization signal (SSS).

An SSB (SS/PBCH block) includes at least some or all of a PSS, an SSS, and a PBCH. Respective antenna ports of some or all of the PSS, SSS, and PBCH included in the SS block may be the same. Some or all of the PSS, SSS, and PBCH included in the SSB may be mapped to continuous OFDM symbols. Respective CP configurations of some or all of the PSS, SSS, and PBCH included in the SSB may be the same. The same value may be applied to an SCS configuration μ for each of some or all of the PSS, SSS, and PBCH included in the SSB.

The DL DMRS is associated with transmission of the PBCH, PDCCH and/or PDSCH. The DL DMRS is multiplexed with the PBCH, PDCCH and/or PDSCH. The terminal apparatus 1 may use the DL DMRS corresponding to the PBCH, PDCCH, or PDSCH in order to correct propagation paths of the PBCH, PDCCH or PDSCH. Hereinafter, transmission of both of a PBCH and a DL DMRS associated with the PBCH may be referred to as transmission of a PBCH. In addition, transmission of both of a PDCCH and a DL DMRS associated with the PDCCH may be simply referred to as transmission of a PDCCH. In addition, transmission of both of a PDSCH and a DL DMRS associated with the PDSCH may be simply referred to as transmission of a PDSCH. A DL DMRS associated with a PBCH may also be referred to as a DL DMRS for a PBCH. A DL DMRS associated with a PDSCH may also be referred to as a DL DMRS for a PDSCH. A DL DMRS associated with a PDCCH may also be referred to as a DL DMRS associated with a PDCCH.

A DL DMRS may be a reference signal individually configured for the terminal apparatus 1. A sequence of a DL DMRS may be given at least based on a parameter individually configured for the terminal apparatus 1. A sequence of a DL DMRS may be given at least based on a UE-specific value (e.g., C-RNTI, or the like). A DL DMRS may be individually transmitted for a PDCCH and/or a PDSCH.

A CSI-RS may be a signal at least used to calculate CSI. In addition, a CSI-RS may be used to measure a reference signal received power (RSRP) and reference signal received quality (RSRQ). A pattern of a CSI-RS assumed by the terminal apparatus 1 may be given using at least a higher layer parameter.

A PTRS may be a signal at least used to compensate for phase noise. A pattern of a PTRS assumed by the terminal apparatus 1 may be given at least based on a higher layer parameter and/or DCI.

A DL PTRS may be associated with a DL DMRS group at least including an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of the DL DMRS included in the DL DMRS group.

A TRS may be a signal at least used for synchronization in a time and/or a frequency. A pattern of the TRS assumed by the terminal apparatus may be given at least based on a higher layer parameter and/or DCI.

A downlink physical channel and a downlink physical signal may be referred to as a downlink signal. An uplink physical channel and an uplink physical signal may be referred to as an uplink signal. A downlink signal and an uplink signal may be collectively referred to as a physical signal or a signal. A downlink physical channel and an uplink physical channel may be collectively referred to as a physical channel. In downlink, a physical signal may include some or all of an SSB, a PDCCH (CORESET), a PDSCH, a DL DMRS, a CSI-RS, a DL PTRS, and a TRS. Moreover, in uplink, a physical signal may include some or all of a PRACH, a PUCCH, a PUSCH, a UL DMRS, a UL PTRS, and an SRS. The physical signal may be a signal other than the signals described above. That is, the physical signal may include one or multiple types of physical channels and/or physical signals, or may include one or multiple physical channels and/or physical signals.

A broadcast channel (BCH), an uplink-shared channel (UL-SCH), and a downlink-shared channel (DL-SCH) are transport channels. A channel used in a medium access control (MAC) layer may be referred to as a transport channel. The unit of transport channels used in the MAC layer may also be referred to as a TB or a MAC PDU. HARQ is controlled for each TB in the MAC layer. A TB is the unit of data that the MAC layer delivers to the physical layer. In the physical layer, a TB is mapped to a codeword and modulated for each codeword.

The base station apparatus 3 and the terminal apparatus 1 exchange (transmit and/or receive) higher layer signals in a higher layer. For example, the base station apparatus 3 and the terminal apparatuses 1 may transmit and/or receive RRC signaling (an RRC message, RRC information, an RRC parameter, an RRC information element) in the radio resource control (RRC) layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell may also be referred to as common RRC signaling. The RRC signaling transmitted from the base station apparatus 3 via the PDSCH may be signaling dedicated to a certain terminal apparatus 1 (also referred to as dedicated signaling or UE specific signaling). The signaling dedicated to the terminal apparatus 1 may also be referred to as dedicated RRC signaling. A higher layer parameter specific to the serving cell may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A broadcast control channel (BCCH), a common control channel (CCCH), and a dedicated control channel (DCCH) are logical channels. For example, the BCCH is a higher layer channel used to transmit an MIB. Furthermore, the common control channel (CCCH) is a higher layer channel used to transmit information common to the multiple terminal apparatuses 1. Here, the CCCH may be used for a terminal apparatus 1 that is not in an RRC connected state, for example. Furthermore, the dedicated control channel (DCCH) is a higher layer channel at least used to transmit control information dedicated to the terminal apparatus 1

(dedicated control information). Here, the DCCH may be used for a terminal apparatus 1 that is in an RRC connected state, for example.

The BCCH in a logical channel may be mapped to a BCH, a DL-SCH, or a UL-SCH in a transport channel. The CCCH in a logical channel may be mapped to a DL-SCH or a UL-SCH in the transport channel. The DCCH in a logical channel may be mapped to a DL-SCH or a UL-SCH in the transport channel The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

A configuration example of the terminal apparatus 1 according to an aspect of the present embodiment will be described below.

Figure 5:
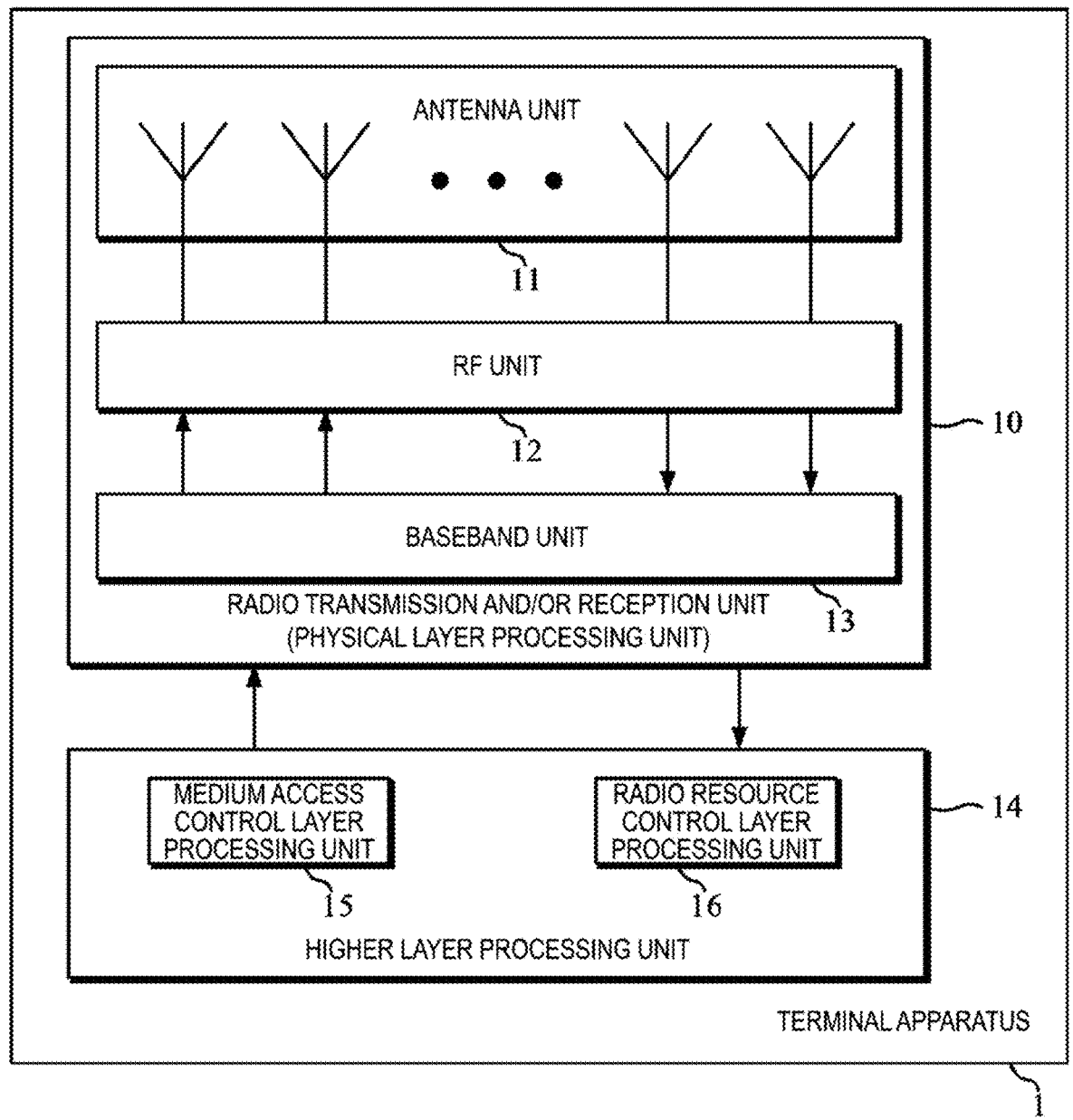
FIG. 5 is a schematic block diagram illustrating a configuration of a terminal apparatus 1 according to an aspect of the present embodiment.

FIG. 5 is a schematic block diagram illustrating a configuration of a terminal apparatus 1 according to an aspect of the present embodiment. The terminal apparatus 1 includes a radio transmission and/or reception unit 10 and a higher layer processing unit 14 as illustrated. The radio transmission and/or reception unit 10 at least includes some or all of an antenna unit 11, a radio frequency (RF) unit 12, and a baseband unit 13. The higher layer processing unit 14 at least includes some or all of a medium access control layer processing unit 15 and a radio resource control layer processing unit 16. The radio transmission and/or reception unit 10 may also be referred to as a transmitter, a receiver, a physical layer processing unit, and/or a lower layer processing unit.

The higher layer processing unit 14 outputs uplink data (TB or UL-SCH) generated through a user operation or the like to the radio transmission and/or reception unit 10. The higher layer processing unit 14 performs processing of a medium access control (MAC) layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. In other words, the radio resource control layer processing unit 16 sets various types of configuration information/parameters based on the information for indicating various types of configuration information/parameters received from the base station apparatus 3. The parameters may be higher layer parameters and/or information elements.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The processing may be referred to as reception processing. The radio transmission and/or reception unit 10 generates a physical signal (uplink signal) by performing modulation and coding of data, and generating a baseband signal (conversion into a time continuous signal), and transmits the physical signal to the base station apparatus 3. The processing may be referred to as reception processing.

The RF unit 12 converts (down-converts) a signal received via the antenna unit 11 into a baseband signal using orthogonal demodulation, and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a CP from the converted digital signal, performs a fast Fourier transform (FFT) of the signal from which the CP has been removed, and extracts a signal in the frequency domain.

The baseband unit 13 generates an OFDM symbol by performing an inverse fast Fourier transform (IFFT) on the data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power controller.

A configuration example of the base station apparatus 3 according to an aspect of the present embodiment will be described below.

Figure 6:
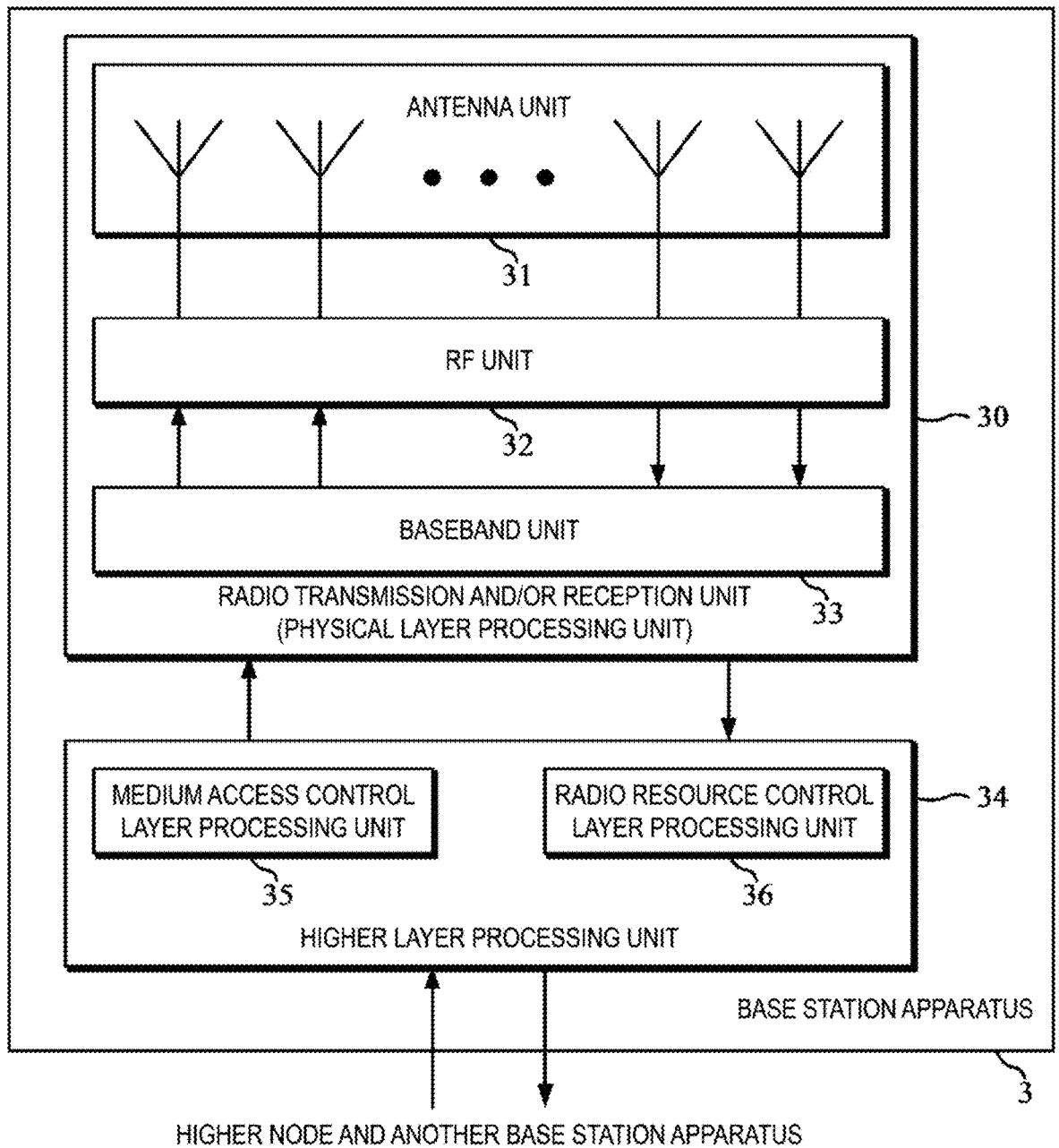
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. The base station apparatus 3 includes a radio transmission and/or reception unit 30 and a higher layer processing unit 34 as illustrated. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (TB or DL-SCH) allocated on a PDSCH, system information, an RRC message, a MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 using higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted. A physical signal generated in the radio transmission and/or reception unit 30 is transmitted to the terminal apparatus 1 (that is, transmission processing is performed). In addition, the radio transmission and/or reception unit 30 performs reception processing on the received physical signal.

The medium access control layer processing unit 15 and/or 35 may be referred to as a MAC entity.

Each of the units with reference numerals 10 to 16 included in the terminal apparatus 1 may be configured as a circuit. Each of the units with reference numerals 30 to 36 included in the base station apparatus 3 may be configured as a circuit. Some or all of the units with reference numerals 10 to 16 included in the terminal apparatus 1 may be configured as a memory and a processor connected to the memory. Some or all of the units with reference numerals 30 to 36 included in the base station apparatus 3 may be configured as a memory and a processor connected to the memory. Various aspects (operations and processing) according to the present embodiment may be implemented (performed) in a memory included in the terminal apparatus 1 and/or the base station apparatus 3 and a processor connected to the memory.

Figure 7:
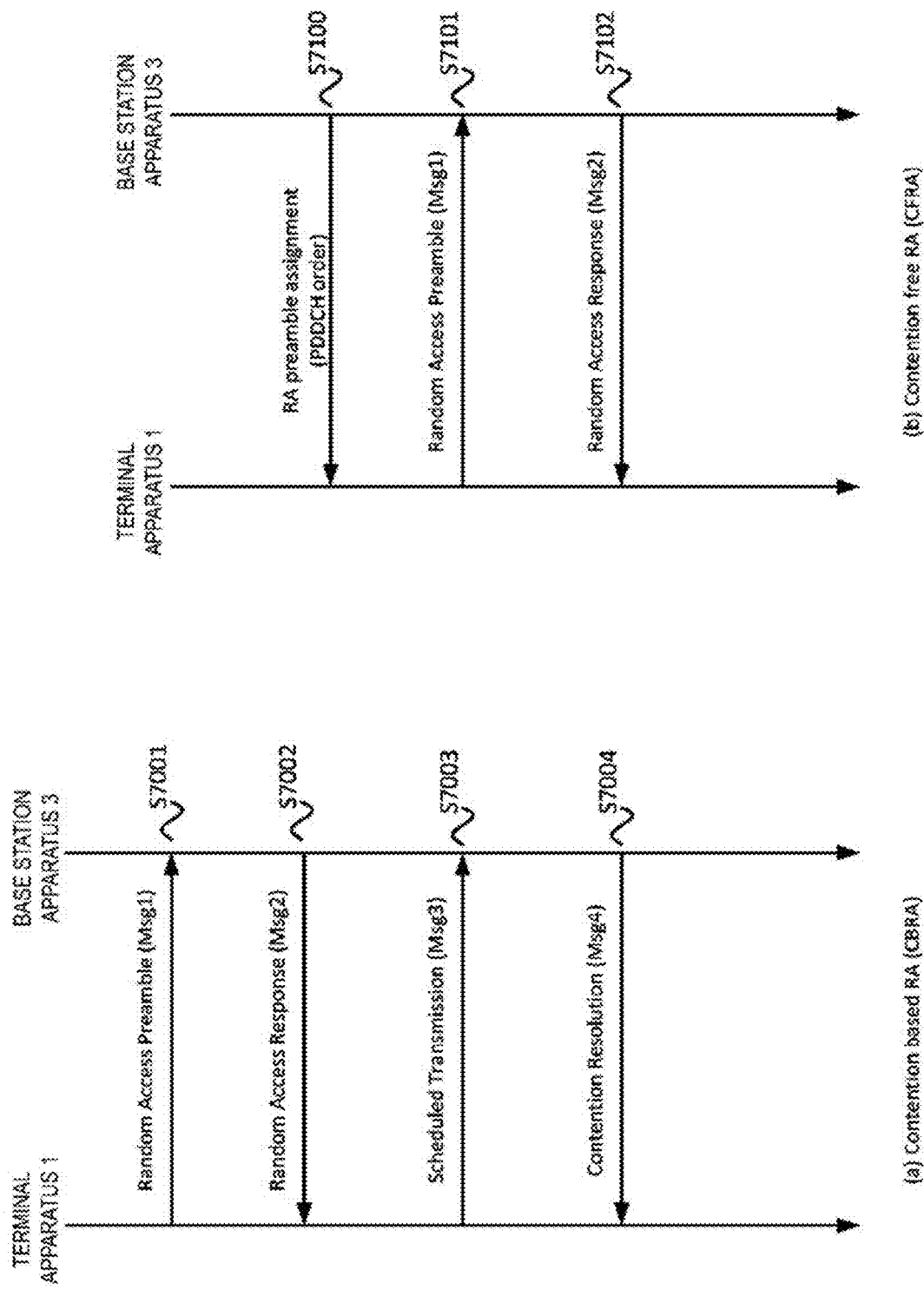
FIG. 7 is a diagram illustrating an example of a random access procedure according to an aspect of the present embodiment.

FIG. 7 is a diagram illustrating an example of a random access procedure according to an aspect of the present embodiment. FIG. 7(a) shows an example of a contention-based random access (CBRA). FIG. 7(b) shows an example of contention-free RA (CFRA) (or non-contention-based RA (NCBRA)).

The random access procedure is performed for initial access from an RRC idle state, RRC connection (re-)establishment, recovery from beam failure, handover, downlink data arrival, uplink data arrival, positioning, timing advance or timing alignment (TA). Although CBRA may be performed in all cases, CFRA is performed for handover, downlink data arrival, positioning, and TA.

Because the terminal apparatus 1 performs CBRA autonomously (voluntarily), a contention may occur due to the multiple terminal apparatuses 1 simultaneously performing the random access procedure (that is, starting the random access procedure at the same timing). On the other hand, in a case that the base station apparatus 3 indicates CFRA to the terminal apparatus 1 connected thereto, a random access procedure can be performed such that no contention occurs between the multiple terminal apparatuses 1.

The CBRA procedure of FIG. 7(a) will be described.

S7001 is a step in which the terminal apparatus 1 requests a target cell for a response for initial access via a PRACH. In S7001, a message transmitted by the terminal apparatus 1 via the PRACH may be referred to as a Msg1. Msg1 may be a random access preamble configured using a higher layer parameter.

Prior to performing the processing of S7001, the terminal apparatus 1 may receive an SSB to perform time frequency synchronization, frame synchronization, and/or acquisition of system information (acquisition/configuration of one or multiple higher layer parameters associated with the cell).

S7002 is a step in which the base station apparatus 3 makes a response to Msg1 from the terminal apparatus 1. The message used for the response may be referred to as Msg2. The Msg2 may be transmitted via the PDSCH. The PDSCH including the Msg2 may be scheduled with a PDCCH mapped to type 1 PDCCHCSS. In other words, after the Msg1 is transmitted, the terminal apparatus 1 may monitor the PDCCH to be used for scheduling of the PDSCH including the Msg2. A cyclic redundancy check (CRC) bit included in the PDCCH may be scrambled with a random access-radio network temporary identifier (identity) (RA-RNTI). The Msg2 may include an uplink grant (RAR grant) to be used for scheduling of the PUSCH including Msg3. The RAR grant may include at least a temporary cell-RNTI (TC-RNTI). The RAR grant may include a TPC command indicating a correction value for a power control adjustment value to be used for the transmission power of the PUSCH including the Msg3.

S7003 is a step of the terminal apparatus 1 to transmit at least an RRC connection or an RRC connection re-establishment request, or a C-RNTI of the terminal apparatus 1 to a target cell (the target base station apparatus 3). For example, the message transmitted by the terminal apparatus 1 may be referred to as Msg3. The Msg3 may include an identifier or identity (ID) for identifying the terminal apparatus 1. The ID may be an ID managed in a higher layer. The ID may be an SAE temporary mobile subscriber identity (S-TMSI). The ID may be mapped to the CCCH of the logical channel.

S7004 is a step in which the base station apparatus 3 transmits a contention resolution message (Msg4) to the terminal apparatus 1. In other words, after the Msg3 is transmitted, the terminal apparatus 1 may monitor the PDCCH to be used for scheduling of the PDSCH including the Msg4. The Msg4 may include a contention resolution ID (UE contention resolution ID). Here, the contention resolution ID is used to resolve a contention in which multiple terminal apparatuses 1 transmit signals using the same radio resource.

In a case in which the contention resolution ID included in the Msg 4 received by the terminal apparatus 1 is has the same value as the ID used to identify the terminal apparatus 1 in S7004, the terminal apparatus 1 may consider that the contention resolution has been successfully completed and set the value of the TC-RNTI in the C-RNTI field. The terminal apparatus 1 having the value of TC-RNTI set in the C-RNTI field may consider that RRC connection is completed. Further, in order to notify the base station apparatus 3 of the completion of the RRC connection, the terminal apparatus 1 that has completed the RRC connection may set (map) and transmit Ack (Msg5) to the PUCCH (PUCCH resource) indicated by the PUCCH resource indicator field included in the PDCCH that the Msg4 has scheduled. This Ack may correspond to the HARQ process ID (HPID or HARQ process number) included in the PDCCH that the Msg4 has scheduled.

Further, the CORESET for monitoring the PDCCH to be used for the scheduling of the Msg4 may be the same as or different from the CORESET monitoring the PDCCH to be used for the scheduling of the Msg2, or may be configured separately.

In a case in which carrier aggregation or dual connectivity (DC) is configured, S7001, S7002, and S7003 may be performed at an SpCell, and S7004 may be performed at a cell (SpCell or SCell) indicated using cross-carrier scheduling.

The CFRA procedure of FIG. 7(b) will be described.

S7100 is a step of making a request from the base station apparatus 3 to the terminal apparatus 1 to transmit a random access preamble (Msg1) for the purpose of handover, or the like. S7100 is a random access procedure performed by the base station apparatus 3 and the terminal apparatus 1 in an RRC connection established state. The base station apparatus 3 may perform assignment (resource assignment) of the random access preamble (Msg1) via dedicated signaling. The PDCCH for such dedicated signaling may be referred to as a PDCCH order. The Msg1 may be assigned using a different set from the Msg1 used in CBRA. The terminal apparatus 1 monitors the PDCCH (PDCCH order) for resource assignment of the Msg1 in S7100. Further, the PDCCH order may be a DCI format in which CRC of the DCI format 1_0 is scrambled with a C-RNTI and all values of 3B described above are "1".

At least one or all of the following 5A to 5E may be included as fields in the DCI format 1_0 used for the random access procedure started by the PDCCH order.

5A) Random access preamble index field
5B) UL/SUL indicator field
5C) SS/PBCH index field
5D) PRACH mask index field
5E) Reserved (R) bit field 5A described above corresponds to a higher layer parameter ra-PreambleIndex. 5B described above is used to indicate the carrier for transmitting the PRACH unless all values of 5A described above are 0, and otherwise the field is reserved. Unless all values of 5A described above are 0, SC described above indicates the index of an SSB used for the determination of a PRACH transmission timing (PRACH occasion), and otherwise this field is reserved. Unless all values of 5A described above are 0, 5D described above is used to indicate the RACH transmission timing associated with the SSB corresponding to SC described above, and otherwise this field is reserved. Here, 0 may be a zero padding bit.

S7101 is a step of transmitting the Msg1 with the terminal apparatus 1 allocated in a case that it has received the PDCCH including resource assignment of the Msg1. After transmitting the Msg1, the terminal apparatus 1 may monitor the PDCCH (PDCCH search space) used for scheduling of the PDSCH including Msg2.

S7102 is a step in which the base station apparatus 3 makes a response to Msg1 to the terminal apparatus 1. The basic processing is the same as the S7002, and thus descriptions thereof are omitted.

In a case in which CFRA is performed at the SpCell, S7100, S7101, and S7102 may be performed at the SpCell.

Higher layer parameters for the random access procedure may be configured.

The following 6A to 6I may be used for the MAC entity of the terminal apparatus 1 as a variable of the terminal apparatus 1 in the random access procedure.

6A) PREAMBLE_INDEX
6B) PREAMBLE_TRANSMISSION_COUNTER
6C) PREAMBLE_POWER_RAMPING_COUNTER
6D) PREAMBLE_POWER_RAMPING_STEP
6E) PREAMBLE_RECEIVED_TARGET_POWER
6F) PREAMBLE_BACKOFF
6G) PCMAX
6H) SCALING_FACTOR_BI
6I) TEMPORARY_C-RNTI

In a case that the random access procedure is started in a certain serving cell (in other words, in S7001 or S7100 in FIG. 7), the MAC entity of the terminal apparatus 1 flushes an Msg3 buffer, sets a value of 6B described above to 1, sets a value of 6C described above to 1, sets a value of 6F described above to 0 ms, sets a value of 6H described above to 1, and sets values of 6D, 6E, and 6G described above based on one or multiple higher layer parameters corresponding thereto, and may perform a random access resource selection procedure.

Here, in the present embodiment, a higher layer parameter may be a parameter given by the MAC CE, may be a parameter given by RRC signaling, may be based on a parameter given by the MIB, or may be a parameter given by the SIB (system information).

In S7001 or S7101 in FIG. 7, a value of 6A described above may be set to a value of ra-PreambleIndex corresponding to the selected SSB or CSI-RS or ra-PreambleIndex explicitly indicated by the PDCCH or RRC. The terminal apparatus 1 may configure the PRACH resource (the resource of the random access preamble) corresponding to the set index, and perform a random access preamble transmission procedure.

In the S7001 or S7101 in FIG. 7, in a case in which the value of 6B described above is greater than 1 for the random access preamble, in a case in which a notification to stop a power ramping counter is not received from a lower layer, and in a case in which the selected SSB has not been changed, the MAC entity of the terminal apparatus 1 may increment the value of 6C described above by one. In addition, the MAC entity of the terminal apparatus 1 may set a value of 6E described above to a value of transmission power at least based on a higher layer parameter preambleReceivedTargetPower, the value of 6C described above, and the value of 6D described above, and indicate the transmission of the random access preamble using the selected PRACH, the corresponding RA-RNTI, and 6A and 6E described above to the physical layer. Further, the higher layer parameter preambleReceivedTargetPower corresponds to the initial value of the transmission power of the random access preamble.

In a case that the random access preamble is transmitted, the MAC entity of the terminal apparatus 1 starts ra-ResponseWindow configured for the higher layer parameter BeamFailureRecoveryConfig at the reception timing of the first PDCCH (first PDCCH occasion) from the end of transmission of the random access preamble in S7101, regardless of possible occurrence of a measurement gap. The MAC entity of the terminal apparatus 1 may monitor the PDCCH of SpCell for the response to the beam failure recovery request identified by the C-RNTI while ra-ResponseWindow is running.

Similarly, in S7001, the MAC entity of the terminal apparatus 1 starts ra-ResponseWindow configured in the higher layer parameter RACH-ConfigCommon at the reception timing of the first PDCCH from the end of the transmission of the random access preamble. The MAC entity of the terminal apparatus 1 may monitor the PDCCH of SpCell for RAR identified by the RA-RNTI while ra-ResponseWindow is running.

In S7001 and S7002 or S7101 to S7102, in a case that ra-ResponseWindow expires and no corresponding Msg2 is received, the MAC entity of the terminal apparatus 1 may increment the value of 6B described above by one. In a case that the incremented value of 6B described above is the higher layer parameter preambleTransMax+1, the random access problem is indicated in the higher layer (RRC layer).

In S7003, in a case that the Msg3 is transmitted, the MAC entity of the terminal apparatus 1 may start or restart the higher layer parameter ra-ContentionResolutionTimer in the first symbol at the end of transmission of the Msg3 and monitor the PDCCH while ra-ContentionResolutionTimer is running.

In S7003 and S7004, the MAC entity of the terminal apparatus 1 discards the value of 6I described above in a case that ra-ContentionResolutionTimer expires, and considers that the contention resolution is not successful. In a case that the contention resolution is considered to be unsuccessful, the MAC entity of the terminal apparatus 1 may flush the HARQ buffer used for the transmission of the MAC PDU in the Msg3 buffer, and increment the value of 6B described above by one. In a case that the incremented value of 6B described above is the higher layer parameter preambleTransMax+1, the random access problem is indicated in the higher layer (RRC layer). In other words, in a case that the value of 6B described above exceeds the maximum number of preamble transmission operations, the MAC entity of the terminal apparatus 1 indicates the random access problem on the higher layer (the RRC layer). In a case that the random access procedure is not completed, the MAC entity of the terminal apparatus 1 may select a random backoff time from 0 to 6F described above, delay transmission of the random access preamble by the back-off time, and perform the random access resource selection procedure. Further, the value of the higher layer parameter preambleTransMax may be the maximum value of 6B described above.

The MAC entity of the terminal apparatus 1 discards CFRA resources excluding CFRA resources for the beam failure recovery request upon the completion of the random access procedure and flushes the HARQ buffer used for the transmission of the MAC PDU of the Msg3.

Figure 8:
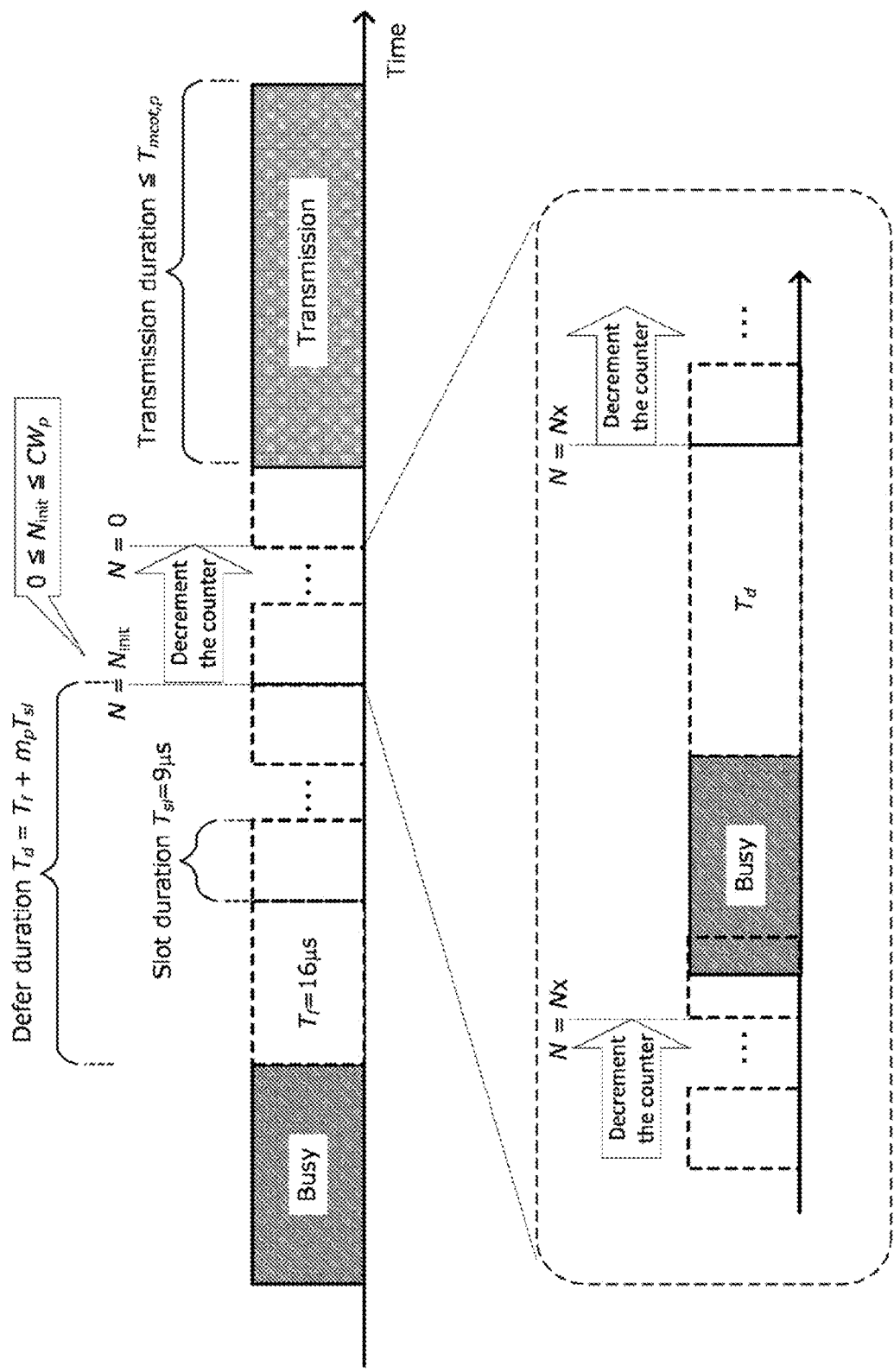
FIG. 8 is a diagram illustrating an example of a channel access procedure (CAP) according to an aspect of the present embodiment.

FIG. 8 is a diagram illustrating an example of a channel access procedure (CAP) according to an aspect of the present embodiment. The terminal apparatus 1 or the base station apparatus 3 performs energy detection before a prescribed physical signal is transmitted, and on a carrier on which NR-U cell transmission is performed (i.e., an NR-U carrier), a BWP (i.e., an NR-U BWP), or a channel (i.e., an NR-U channel), in a case that they are determined to be idle (to be clear, to be free, to perform no communication, to transmit no specific physical signal, to be detected with no specific physical signal power (energy), and to have a detected (measured) power (energy) or the sum of power not exceeding a prescribed threshold) for a prescribed period, they may transmit a physical signal on the carrier, BWP, or channel. In other words, in a case that the terminal apparatus 1 or the base station apparatus 3 performs communication in the NR-U cell, it performs clear channel assessment (CCA) or channel measurement to check that the NR-U cell is idle for a prescribed period. The prescribed period may be determined from a defer duration $T_d$, a counter N, and a CCA slot duration $T_{sl}$. Further, not being idle in a case that CCA is performed may be referred to as "busy". Further, CCA may be performed by the radio transmission and/or reception unit 10 of the terminal apparatus 1 and/or the radio transmission and/or reception unit 30 of the base station apparatus 3. Further, a channel access procedure may include performing CCA for a prescribed period before the terminal apparatus 1 or the base station apparatus 3 transmits a physical signal on a certain channel. Prior to transmitting such a physical signal, a procedure to perform energy detection to determine whether a channel is idle or a procedure to determine whether a channel is idle and transmit a physical signal in a case that the channel is idle may be referred to as a channel access procedure and/or a CCA procedure and/or a listen-before-talk (LBT) procedure. Here, the NR-U cell may be an NR-U carrier and/or an NR-U BWP and/or an NR-U channel, and may include at least a frequency band available for transmission of a physical signal of the NR-U. In other words, the NR-U cell, the NR-U carrier, the NR-U BWP, and the NR-U channel may be synonymous. In the present embodiment, the NR-U cell may be paraphrased with an NR-U carrier, an NR-U BWP, and/or an NR-U channel. The NR-U cell may include at least one of an NR-U carrier, an NR-U BWP, and an NR-U channel. An NR cell may include at least one of an NR carrier, an NR BWP, and an NR channel Here, in a case that the base station apparatus 3 and/or the terminal apparatus 1 can perform (is capable of performing) a multi-carrier access procedure (CAP for each of multicarriers) in one NR-U operating band, multiple carriers (NR-U carriers) and/or multiple BWPs (NR-U BWPs) may be configured for one NR-U cell.

A prescribed period is a period in which the counter N is zero in the channel on which an idle state in a defer duration after detection of a signal from another apparatus than the aforementioned apparatus is first sensed. The terminal apparatus 1 or the base station apparatus 3 can transmit a signal after the value of the counter N becomes 0. Further, in a CCA slot duration, in a case that it is determined that the state is busy, the decrement of the counter N may be postponed. An initial value $N_{int}$ of the counter N may be determined based on the value of a channel access priority class and the value of a corresponding contention window ($CW_p$) (CW size or CWS). For example, the value of $N_{int}$ may be determined based on a random function uniformly distributed from among 0 to the value of $CW_p$. A possible value of $N_{int}$ (a range of value) may be increased by updating the value of $CW_p$.

In a case that the terminal apparatus 1 or the base station apparatus 3 transmits one or multiple physical signals in the NR-U cell, the terminal apparatus 1 or the base station apparatus 3 sets the value of the counter N to $N_{int}$.

In a case that the value of N is greater than 0, the terminal apparatus 1 or the base station apparatus 3 sets the value of N to N−1 in a case that the state is determined to be clear in one CCA slot duration. In other words, in a case that the state is determined to be clear in one CCA slot duration, the terminal apparatus 1 or the base station apparatus 3 may decrement the value of the counter N by one.

In a case that the value of the decremented N becomes zero, the terminal apparatus 1 or the base station apparatus 3 may stop CCA in the CCA slot duration. Otherwise, that is, in a case that the value of N is greater than 0, the terminal apparatus 1 or the base station apparatus 3 may continuously perform CCA for the CCA slot duration until the value of N becomes 0.

The terminal apparatus 1 or the base station apparatus 3 performs CCA in the added CCA slot duration and determines that the state is idle, and in a case that the value of N is zero, it can transmit a physical signal.

The terminal apparatus 1 or the base station apparatus 3 may perform CCA until the state is determined to be busy in the added defer duration or the state is idle in all slots of the added defer duration. The terminal apparatus 1 or the base station apparatus 3 can transmit a physical signal in a case that the state is determined to be idle and the value of N is zero in the added defer duration. The terminal apparatus 1 or the base station apparatus 3 may continuously perform CCA in a case that the state is determined to be busy in the added defer duration.

A channel access procedure that is variable based on information or conditions for which the value p of CAPC and the value of $CW_p$ are configured may be referred to as a type 1 channel access procedure (type 1 CAP), and a channel access procedure in which the value of $CW_p$ is always 0, the counter N corresponding to the value of $CW_p$ is not used, or CCA is performed only once before transmission may be referred to as a type 2 channel access procedure (type 2 CAP). That is, the type 1 channel access procedure is a channel access procedure in which the period of CCA is changed depending on the value of $CW_p$ updated based on the configured value p of CAPC or conditions. In addition, the type 2 channel access procedure is a channel access procedure in which CCA is performed only once before transmission of a physical signal, and transmission can be performed in a case that the channel (frequency band) to transmit the physical signal is determined to be idle. Here, a time before transmission may include a time immediately before transmission. In a case that the channel access procedure is not completed before transmission of a physical signal, the terminal apparatus 1 and/or the base station apparatus 3 may not transmit the physical signal at the transmission timing or may postpone transmission.

Figure 9:
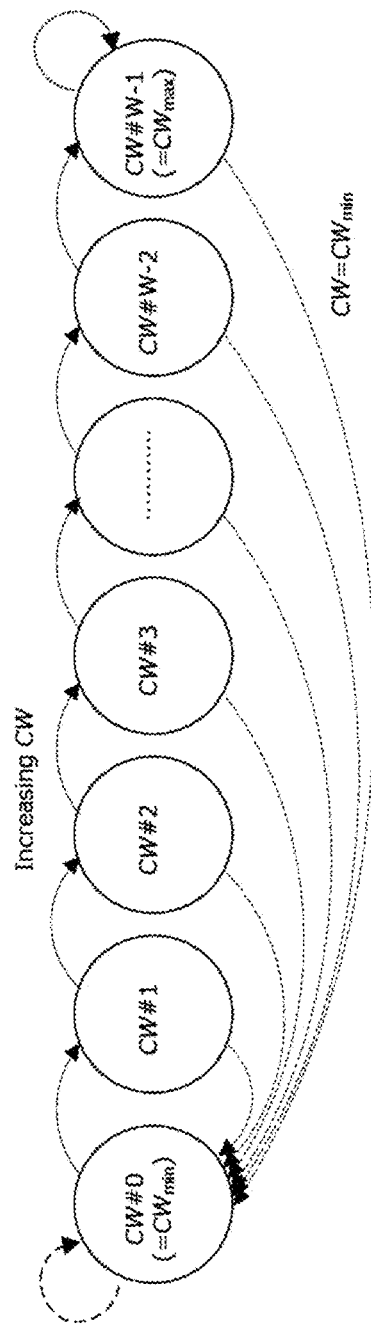
FIG. 9 is a diagram illustrating an example of a channel access priority class (CAPC) and a CW adjustment procedure (CWAP) according to an aspect of the present embodiment.

FIG. 9 is a diagram illustrating an example of a channel access priority class (CAPC) and a CW adjustment procedure according to an aspect of the present embodiment.

The value p of a CAPC is used to indicate the number $m_p$ of the CCA slot duration $T_{sl}$ included in a defer duration $T_d$, a minimum value and a maximum value for a CW, a maximum channel occupancy time, and an acceptable value of $CW_p$ (CWS). The value p of a CAPC may be configured according to the priority of a physical signal. The value p of a CAPC may be indicated as included in a DCI format.

The terminal apparatus 1 may adjust the value of a CW for determining the value of $N_{init}$ before $N_{init}$ is set for a value of the counter N. Further, in a case that the random access procedure is successfully completed, the terminal apparatus 1 may maintain the updated value of the CW for the random access procedure. In addition, in a case that the random access procedure is successfully completed, the terminal apparatus 1 may set the updated value of the CW to $CW_{min}$ for the random access procedure. Here, in the present embodiment, $CW_{min}$ may be, for example, CW #0 illustrated in FIG. 9, that is, the initial value of $CW_p$ corresponding to the value p of the CAPC. Here, setting the updated value of the CW to the $CW_{min}$ may be updating the value of the CW updated in a case that one or multiple prescribed conditions are satisfied to $CW_{min}$. In addition, setting the updated value of the CW to $CW_{min}$ can be resetting the value of the CW to $CW_{min}$.

The terminal apparatus 1 may adjust the value of the CW for determining the value of $N_{init}$ before setting $N_{init}$ for the value of the counter N corresponding to the CCA performed before transmission of Msg1. Further, the terminal apparatus 1 may maintain the updated value of the CW in a case that it is considered that the terminal apparatus 1 has succeeded in reception of Msg2 and/or succeeded in reception of Msg4. In addition, the terminal apparatus 1 may set the updated value of the CW to $CW_{min}$ in a case that it is considered that the terminal apparatus 1 has succeeded in reception of Msg2 and/or succeeded in reception of Msg4.

Here, adjusting the value of the CW may be increasing the value by one level until the value reaches $CW_{max}$ from $CW_{min}$ in a case that the value of $CW_p$ satisfies prescribed conditions. In a case that the value reaches $CW_{max}$, the value increases from $CW_{min}$ by one level again. That is, adjusting the value of the CW may be updating the value of $CW_p$. Updating the value of $CW_p$ may be set to bring the value of $CW_p$ to a one-level greater value. For example, updating may be bring the value from CW #3 to CW #4 or from CW #n−1 to CW #n. In addition, the terminal apparatus 1 and/or the base station apparatus 3 may determine a value of $N_{init}$ based on a random function uniformly distributed between zero and the updated value of $CW_p$ each time the value of the CW is adjusted.

The value p of the channel access priority class (CAPC) applied to transmission of Msg1 may be determined based on system information, may be determined based on higher layer parameters, or may be associated with an SSB. For example, in a case that the value p of the CAPC corresponding to Msg1 is P, the value of Nin it is determined based on a random function that is uniformly distributed between 0 and CW #0.

For example, the terminal apparatus 1 increments the value of 6B described above by one in a case that it is considered that reception of Msg2 or Msg4 has failed (not successful) in the S7002, S7004, and S7102 in FIG. 7. Then, in a case that the terminal apparatus 1 transmits Msg1, the value of $CW_p$ used for the value of $N_{init}$ is updated from CW #0 to CW #1. The terminal apparatus 1 may adjust (update) the value of $CW_p$ used for the value of $N_{init}$ in accordance with the value of 6B described above. In a case that the total number of $CW_p$s corresponding to the value p of the CAPC is less than a higher layer parameter preambleTransMax, the value of $CW_p$ may return to $CW_{min}$ (i.e., CW #0) and the value of $CW_p$ may be updated again before the value of 6B becomes a higher layer parameter preambleTransMax+1. Further, the value (allowable value) of $CW_p$ may correspond to the value obtained by mod (the value of 6B described above), the total number of $CW_p$s (e.g., W CWs from CW #0 to CW #W−1)). Here, mod (A, B) may be a function of outputting the remainder of A divided by B (divisor). For example, in a case that the value of 6B described above is 10 and the total number of $CW_p$s is 7, the value of $CW_p$ may be CW #3.

In a case that a prescribed time elapses after the base station apparatus 3 transmits Msg2 or the timer expires and it is considered that the base station apparatus 3 has failed in reception of Msg3 corresponding to Msg2 (not successful) in S7002 and S7003 in FIG. 7, the base station apparatus 3 may adjust the value of CW for determining a value of $N_{init}$ before transmitting or re-transmitting Msg2 and before setting $N_{init}$ to the value of the counter N corresponding to CCA for Msg2. Further, in a case that it is considered that the base station apparatus 3 has successfully received Msg3 corresponding to Msg2, the updated value of CW may not be adjusted. That is, the base station apparatus 3 may maintain the updated value of CW. In addition, in a case that it is considered that the base station apparatus 3 has successfully received Msg3 corresponding to Msg2, the updated value of CW may be set to $CW_{min}$.

In a case that it is considered that the base station apparatus 3 has failed (is not successful) in reception of Ack (Msg5) corresponding to Msg4 after transmitting Msg4 in S7004 in FIG. 7, the base station apparatus 3 may adjust the value of CW for determining a value of $N_{init}$ before transmitting or re-transmitting Msg4 and before setting $N_{init}$ to the value of the counter N corresponding to the channel access procedure performed before the transmission of Msg4. In a case in which Msg4 is transmitted to multiple terminal apparatuses 1 in a prescribed period, the base station apparatus 3 may determine whether to adjust the value of CW, based on the success rate of reception of Msg5. In a case in which Msg4 is transmitted to multiple terminal apparatuses 1 in a prescribed period, the base station apparatus 3 may determine whether to adjust the value of CW, based on the success rate of reception of Msg5. That is, in a case that the success rate of reception of Msg5 exceeds a prescribed threshold, the base station apparatus 3 may not adjust (maintain) the updated value of CW. In addition, in a case that the success rate of reception of Msg5 exceeds the prescribed threshold, the base station apparatus 3 may set the updated value of the CW to the $CW_{min}$.

In addition, in a case that it is considered that the terminal apparatus 1 has failed (is not successful) in reception of Msg2, the length (value) of ra-ResponseWindow may be configured to a one-level greater value. In addition, in a case that it is considered that the terminal apparatus 1 has failed in reception of Msg4, the length (value) of ra-ContentionResolutionTimer may be configured to a one-level greater value. The terminal apparatus 1 may determine the length of ra-ResponseWindow and/or the length of ra-ContentionResolutionTimer based on a value of a higher layer parameter, and a value of $CW_p$, and a CCA slot duration. For example, in a case that the value based on the higher layer parameter is 10 slots (e.g., 10 ms), the value p of CAPC is 4, and the value of $CW_p$ is 63, a length of ra-ResponseWindow and/or a length of ra-ContentionResolutionTimer may be obtained from 10 ms+63×9 μs+$T_d$ (e.g., 25 μs). Further, the value based on the higher layer parameter may be configured for each of ra-ResponseWindow and ra-ContentionResolutionTimer. Further, in a case that it is considered that the terminal apparatus 1 is successful in reception of Msg2, the length (value) of ra-ResponseWindow may be maintained. Similarly, in a case that it is considered that the terminal apparatus 1 is successful in reception of Msg4, the length (value) of ra-ContentionResolutionTimer may be maintained. In addition, in a case that it is considered that the terminal apparatus 1 is successful in reception of Msg2, the length (value) of ra-ResponseWindow may be set (returned) to the value (i.e., initial value) configured using the higher layer parameter. Similarly, in a case that it is considered that the terminal apparatus 1 is successful in reception of Msg4, the length (value) of ra-ContentionResolutionTimer may be set (returned) to the value (i.e., initial value) configured using the higher layer parameter.

In a case that the base station apparatus 3 has received Msg1 received in S7001 again after transmitting Msg4 in S7004 in FIG. 7, the base station apparatus 3 may adjust the value of CW for determining a value of $N_{init}$ before transmitting Msg2 corresponding to the retransmitted Msg1 and setting $N_{init}$ to the value of the counter N corresponding to CCA for Msg2. Further, in a case that the base station apparatus 3 transmits Msg4 and then receives Ack (Msg5) corresponding to Msg4, that is, in a case that the random access procedure is successfully completed, the base station apparatus 3 may maintain the updated value of CW. In addition, in a case that the random access procedure is successfully completed, the base station apparatus 3 may set the updated value of CW to $CW_{min}$ that is the initial value of $CW_p$.

In a case that a prescribed time elapses or the timer expires and it is considered that the base station apparatus 3 has failed (is not successful) in reception of Msg1 corresponding a PDCCH order in S7101 in FIG. 7, the base station apparatus 3 may adjust the value of CW for determining a value of $N_{init}$ before transmitting or re-transmitting the PDCCH order and before setting $N_{init}$ to the value of the counter N corresponding to CCA for the PDCCH order. Further, in a case that it is considered that the base station apparatus 3 has successfully received Msg1 corresponding to the PDCCH order, the base station apparatus 3 may maintain the updated value of CW. In addition, in a case that it is considered that the base station apparatus 3 has successfully received Msg1 corresponding to the PDCCH order, the base station apparatus 3 may set the updated value of CW to $CW_{min}$.

In a case that a prescribed time elapses or the timer expires and it is considered that the base station apparatus 3 has failed (is not successful) in reception of Msg1 corresponding the PDCCH order in S7101 in FIG. 7, whether to adjust the value of CW for determining a value of $N_{init}$ may be based on a case in which it is considered that the reception of Msg1 corresponding to the PDCCH order transmitted to multiple terminal apparatuses 1 in a prescribed time period has failed (has not been successful) at a prescribed rate. For example, in a case that the PDCCH order has been transmitted from the terminal apparatus A to the terminal apparatus E in a prescribed first time period and it is assumed that the corresponding Msg1 has been received from each of the terminal apparatus A to the terminal apparatus E, it is considered that the transmission of the PDCCH order has succeeded, and the base station apparatus 3 may not adjust the value of CW. In addition, in a case that it is considered that the terminal apparatus A and the terminal apparatus E has received the corresponding Msg1 and other terminal apparatuses are not successful in receiving Msg1 (e.g., the success rate of reception of Msg1 is 40%) in a case that the PDCCH order has been transmitted to the terminal apparatus A to the terminal apparatus E in a first prescribed time period, it is considered that the transmission of the PDCCH order is not successful and the base station apparatus 3 may adjust the value of CW for the PDCCH order. Further, in a case that the success rate of reception of Msg1 exceeds a prescribed threshold, it is considered that the transmission of the PDCCH order is successful and the base station apparatus 3 may maintain the updated value of CW. In addition, in a case that the success rate of reception of Msg1 exceeds the prescribed threshold, the base station apparatus 3 may set the updated value of CW to $CW_{min}$.

Next, the procedure of SR according to the present embodiment will be described.

The MAC entity in the terminal apparatus 1 may be configured with zero, one, or a value greater than one SR configurations. One SR configuration constitutes a set of PUCCH resources for SR across different BWPs and/or different cells. For a logical channel, PUCCH resources for at most one SR may be configured for each BWP. The set of PUCCH resources may include one or multiple PUCCH resources.

Each SR configuration may correspond to one or multiple logical channels. Each logical channel may be mapped to zero or one SR configuration. It may be configured by RRC (i.e., a higher layer parameter or RRC information). An SR configuration of the logical channel triggering a buffer status report (BSR) may be considered to be an SR configuration corresponding to the triggered SR.

The higher layer parameter (RRC parameter) of 7A to 7C described below may be configured for the SR procedure. Further, 7A and 7B may be configured for each SR configuration. In a case in which 7A is not configured, the terminal apparatus 1 may apply 0 to a value of 7A.

7A) sr-ProhibitTimer
7B) sr-TransMax
7C) sr-ConfigIndex

As a variable of the terminal apparatus 1, SR_COUNTER configured for each SR configuration may be used in the SR procedure.

In a case that SR is triggered and there is no other SR that is suspended and corresponding to the same SR configuration, the MAC entity of the terminal apparatus 1 sets SR_COUNTER of the corresponding SR configuration to zero.

In a case that SR is triggered, it is considered that the SR is suspended until the SR is cancelled. All suspended SRs triggered prior to the MAC PDU assembly are canceled, each sr-ProhibitTimer is stopped in a case that the MAC PDU is transmitted, and the MAC PDU includes BSR MAC CE which includes a buffer status to the last event that triggered the BSR prior to the MAC PDU assembly. In a case that an uplink grant (resources assigned by an uplink grant) can correspond to all suspended data that can be transmitted, all suspended SRs are canceled.

For the terminal apparatus 1, it is considered that only the PUCCH resource is valid in a BWP that is active in a case that there is an SR transmission occasion (SR transmission timing).

In a case that at least one SR is suspended, the MAC entity of the terminal apparatus 1 starts the random access procedure at SpCell and cancels the suspended SR in a case that a valid PUCCH resource is not configured for each of suspended SRs. Otherwise, in a case that there the MAC entity of the terminal apparatus 1 has an SR transmission occasion in valid PUCCH resources for a configured SR with respect to the SR configuration corresponding to the suspended SRs, in a case that sr-ProhibitTimer is not running in the SR transmission occasion, the PUCCH resource for the SR transmission occasion does not overlap the measurement gap, the PUCCH resources for the SR transmission occasion does not overlap UL-SCH resources, and further the value of SR_COUNTER is a value smaller than the value of sr-TransMax, the MAC entity of the terminal apparatus 1 increments the value of SR_COUNTER by one, instructs the physical layer to signal an SR with one valid PUCCH resource for the SR, and starts sr-ProhibitTimer. Otherwise (e.g., in a case that the value of SR_COUNTER is the same as the value of sr-TransMax), RRC (RRC layer or RRC layer processing unit) may be notified of releasing the PUCCH to all the serving cells, RRC may be notified of releasing the SRS to all of the serving cells, both configured downlink assignment (downlink grant) and uplink grant may be cleared, the random access procedure may be started at SpCell, and all suspended SRs may be canceled. Here, releasing the physical signal may include releasing a resource reserved for a target physical signal (here, PUCCH or SRS), or may include releasing the configuration for the target physical signal.

The MAC entity of the terminal apparatus 1 may stop the ongoing random access procedure started by the MAC entity before the MAC PDU assembly due to the suspended SR with no the configured valid PUCCH resource. In a case that the MAC PDU is transmitted using the uplink grant other than the uplink grant provided by the RAR, such a random access procedure may be stopped. In addition, the MAC PDU includes BSR MAC CE including a buffer status to the last event that triggered BSR before the MAC PDU assembly or the uplink grant (resource assigned by the uplink grant) corresponds to all suspended transmittable data.

In a case that the terminal apparatus 1 (the MAC entity of the terminal apparatus 1) transmits an SR using the PUCCH resource (indicating triggering transmission of an SR of the terminal apparatus 1 to the physical layer) in the NR-U cell (NR-U carrier, NR-U BWP, or NR-U channel), the terminal apparatus 1 may determine whether the channel access procedure is performed before transmission of the SR based on configured information. An SR may be a PUCCH including at least an SR (PUCCH resource) and/or a PUCCH resource used for SR transmission.

In a case that the terminal apparatus 1 performs a type 1 channel access procedure prior to transmission of an SR (or a PUCCH including an SR), the terminal apparatus 1 sets the value of CW used to determine a value of $N_{init}$ used in the type 1 channel access procedure performed before transmission of the SR corresponding to SR_COUNTER configured for each SR configuration to CW #0, performs CCA until the value of the counter N becomes zero before transmission of the SR, and in a case that the NR-U channel is determined to be idle, the terminal apparatus 1 can transmit the SR, and in a case that the NR-U channel is determined to be busy, the terminal apparatus 1 holds (postpones) transmission of the SR until the next transmission occasion. Further, in a case that the value of SR_COUNTER increments by one, the value of CW used for the value of $N_{init}$ corresponding to SR_COUNTER may be reset from CW #0 ($CW_{min}$) to CW #1 (i.e., the value of CW may be updated). Further, in a case that the value of CW used for the value of $N_{init}$ corresponding to SR_COUNTER is $CW_{max}$ and the value of CW is adjusted, the value of $CW_p$ may be reset to the initial value CW #0 ($CW_{min}$).

In a case that the terminal apparatus 1 and/or the physical layer of the terminal apparatus 1 sets SR_COUNTER to zero in the MAC entity, the value of CW used for the type 1 channel access procedure may be set to the initial value $CW_{min}$. In addition, in a case that the terminal apparatus 1 and/or the physical layer of the terminal apparatus 1 determines that there is no other SR suspended in the MAC entity, the value of CW used for the type 1 channel access procedure may be set to the initial value $CW_{min}$.

In a case that the terminal apparatus 1 performs a type 2 channel access procedure prior to transmission of an SR (or a PUCCH including an SR), the terminal apparatus 1 performs CCA once before transmission of the SR, in a case that the NR-U channel is determined to be idle, the terminal apparatus 1 can transmit the SR, and in a case that the NR-U channel to be used in transmission of the SR is determined to be busy, the terminal apparatus 1 holds (or postpones) transmission of the SR until the next transmission occasion. In a case that the terminal apparatus 1 holds transmission of the SR and performs the type 1 CAP before transmission of the SR in the next SR transmission occasion, the terminal apparatus 1 may update the value of CW used for the type 1 CAP to the one greater allowable value. In addition, in a case that the terminal apparatus 1 holds transmission of the SR and notifies the physical layer to the MAC layer (MAC entity) of holding of transmission of the SR, the terminal apparatus 1 may increment SR_COUNTER used for transmission of the SR by one. In addition, the terminal apparatus 1 may not increment the value of SR_COUNTER used for transmission of the SR in a case that transmission of the SR is suspended based on the NR-U channel determined to be busy.

In a case that the MAC entity of the terminal apparatus 1 cancels all suspended SRs and starts the random access procedure at SpCell and in a case that the channel access procedure prior to transmission of the SR is a type 1 channel access procedure, the value of CW used for the value of $N_{init}$ for Msg1 of the random access procedure may be configured based on a higher layer parameter or may be the minimum value ($CW_{min}$) of the value of CW used for the value of Nitta for the SR configuration. Further, in a case that the channel access procedure prior to transmission of the SR is a type 2 channel access procedure, CCA may be performed only once prior to transmission of Msg1 to determine whether the NR-U channel is idle.

Figure 10:
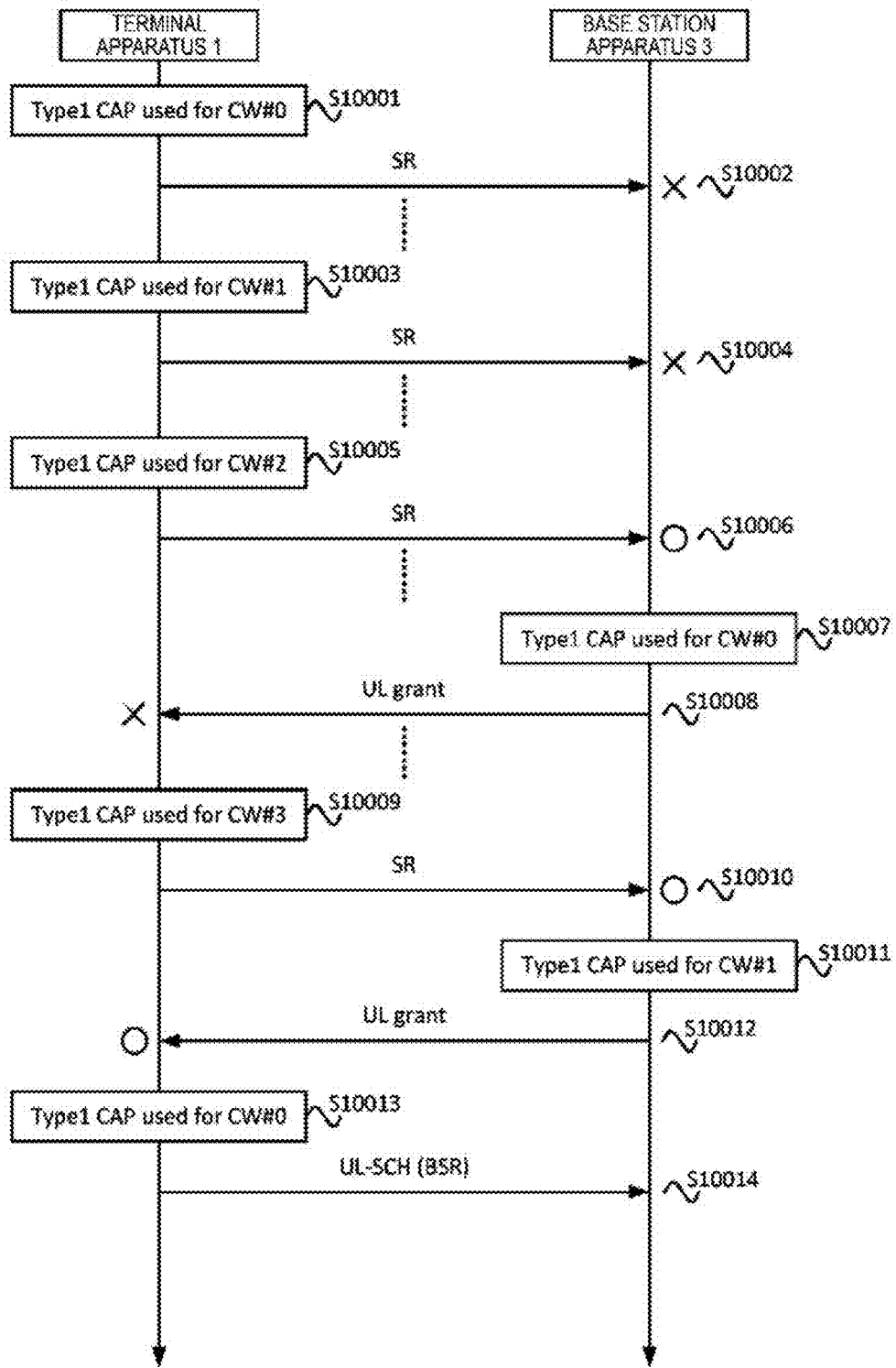
FIG. 10 is a diagram illustrating an example of a CAP and a CWAP at the time of SR transmission according to an aspect of the present embodiment.

FIG. 10 is a diagram illustrating an example of a channel access procedure (CAP) and a CW adjustment procedure (CWAP) at the time of SR transmission according to the present embodiment.

In S10001, the terminal apparatus 1 or the MAC entity of the terminal apparatus 1 satisfies the conditions described above in a case that the valid PUCCH resource is configured for the suspended SR in the NR-U cell, and performs the channel access procedure (CAP) configured for the PUCCH resource and/or the SR in the physical layer in a case that the MAC entity instructs the physical layer to signal an SR with the PUCCH resource. In a case that the CAP is type 1 CAP, the value of $N_{init}$ may be set from the value of CW (e.g., CW #0) and the random function used for $N_{init}$ set as the initial value of the counter N of the type 1 CAP. In a case that the value of $N_{init}$ and N are determined, the terminal apparatus 1 performs CCA until the value of the counter N is zero, and performs CCA once immediately before transmission of the SR, and in a case that all channels are idle, the terminal apparatus 1 transmits the SR in the SR transmission occasion.

In S10002, in a case that the terminal apparatus 1 transmits the SR, a prescribed timer may be allowed to run (start). In a case that the uplink grant for the SR is not successfully received until the prescribed timer expires, the terminal apparatus 1 considers that the base station apparatus 3 has failed in detection of the SR. At this time, the physical layer of the terminal apparatus 1 may notify the MAC entity of the terminal apparatus 1 of the failure. Further, in a case that the prescribed timer has not expired and there is an SR transmission occasion, the terminal apparatus 1 may perform the type 2 CAP and transmit the SR in a case that channels are idle. Here, although the prescribed timer is mentioned, it may be a channel occupancy time (COT) of the terminal apparatus 1 or may be a prescribed time period.

In S10003, in a case that the terminal apparatus 1 or the MAC entity of the terminal apparatus 1 performs retransmission of the same SR (SR with the same SR configuration) in the same NR-U cell, the value of SR_COUNTER corresponding to the SR configuration increments by one, and in a case that the above-described conditions are satisfied, the MAC entity instructs the physical layer to signal an SR with the PUCCH resource. Based on the instruction, the physical layer may update the value of CW from CW #0 to CW #1 and set the value of $N_{init}$. The terminal apparatus 1 performs CCA until the value of the counter N is zero, performs CCA once before transmission of the SR, and in a case that the channels are determined to be idle in all the CCA slot durations, the terminal apparatus 1 transmits the SR in the SR transmission occasion.

In S10004, in a case that the terminal apparatus 1 transmits the SR, a prescribed timer may be allowed to run (start). In a case that the uplink grant for the SR is not successfully received until the prescribed timer expires, the terminal apparatus 1 considers that the base station apparatus 3 has failed in detection of the SR. At this time, the physical layer of the terminal apparatus 1 may notify the MAC entity of the terminal apparatus 1 of the failure.

In S10005, in a case that the terminal apparatus 1 or the MAC entity of the terminal apparatus 1 performs retransmission of the same SR (SR with the same SR configuration) in the same NR-U cell, the value of SR_COUNTER corresponding to the SR configuration increments by one, and in a case that the above-described conditions are satisfied, the MAC entity instructs the physical layer to signal an SR with the PUCCH resource. Based on the instruction, the physical layer may update the value of CW from CW #1 to CW #2 and set the value of $N_{init}$. The terminal apparatus 1 performs CCA until the value of the counter N is zero, performs CCA once before transmission of the SR, and in a case that all the channels are determined to be idle, the terminal apparatus 1 transmits the SR in the SR transmission occasion. Further, in a case that allowable values of a configurable CW are only CW #0 and CW #1 (i.e., in a case that there are only two allowable values of a configurable CW), the value of CW may return to CW #0 from CW #1. In addition, in a case that there is only one allowable value for the configurable CW (e.g., CW #0 only), the terminal apparatus 1 may set the value of CW used for N nit based on the random function of CW from zero to the value of CW #0 each time the value of SR_COUNTER increments.

In a case that the base station apparatus 3 successfully receives the SR in S10006, the base station apparatus 3 may transmit a PDCCH including a DCI format (uplink grant) used to schedule the UL-SCH (PUSCH) for the new transmission.

In a case that the base station apparatus 3 transmits the uplink grant in the NR-U cell in S10007, the base station apparatus 3 performs the CAP before the uplink grant is transmitted. In a case that the type 1 CAP is configured for the uplink grant or the PDCCH including the uplink grant, the base station apparatus 3 may set the value of the counter N for the CAP prior to transmission of the PDCCH to the value of $N_{init}$ based on the random function of CW #0, perform CCA based on the type 1 CAP, and transmit the uplink grant in a case that all channels are idle.

In a case that the base station apparatus 3 transmits the uplink grant in S10008, a prescribed timer may be allowed to run. In addition, in a case that the UL-SCH corresponding to the uplink grant cannot be successfully received for a prescribed time period after transmitting the uplink grant and the prescribed timer has not expired, a type 2 CAP may be performed to transmit the uplink grant. Further, although the prescribed timer is mentioned, it may be a COT of the base station apparatus 3 or may be a prescribed time period. In addition, in a case that the prescribed timer expires, the base station apparatus 3 may not transmit the uplink grant.

In a case that the terminal apparatus 1 is unable to successfully receive the uplink grant and the prescribed timer expires (a predetermined time period has elapsed) in S10008, the terminal apparatus 1 may perform the type 1 CAP for the next SR transmission occasion.

In a case that the terminal apparatus 1 or the MAC entity of the terminal apparatus 1 performs retransmission of the same SR (SR with the same SR configuration) in the same NR-U cell in S10009, the value of SR_COUNTER corresponding to the SR configuration increments by one, and in a case that the above-described conditions are satisfied, the MAC entity instructs the physical layer to signal an SR with the PUCCH resource. Based on the instruction, the physical layer may update the value of CW from CW #2 to CW #3 and set the value of $N_{init}$. The terminal apparatus 1 performs CCA until the value of the counter N is zero, performs CCA once immediately before transmission of the SR, and in a case that all the channels are determined to be idle, the terminal apparatus 1 transmits the SR in the SR transmission occasion. Further, although CW #3 is described, CW #3 may be CW #0 or CW #1 depending on the number of values of configurable CW.

In a case that the terminal apparatus 1 transmits an SR and the base station apparatus 3 successfully receives the SR in S10010, the terminal apparatus 1 may transmit an uplink grant corresponding to the SR.

In a case that the base station apparatus 3 transmits the uplink grant in the NR-U cell in S10011, the base station apparatus 3 performs the CAP before the uplink grant is transmitted. In a case that the type 1 CAP is configured for the uplink grant or the PDCCH including the uplink grant, the base station apparatus 3 updates the value of CW from CW #0 to CW #1. The base station apparatus 3 may set the value of the counter N for the CAP before transmission of the PDCCH to the value of $N_{init}$ based on the random function of CW #1, perform CCA based on the type 1 CAP, and transmit the uplink grant in a case that all the channels are idle.

In a case that the terminal apparatus 1 successfully receives the uplink grant in S10012, the terminal apparatus 1 may transmit the UL-SCH using the PUSCH resource scheduled by the uplink grant. At this time, in a case that the uplink grant includes a CAPC field or a field indicating the type of CAP, the terminal apparatus 1 may determine a type of the CAP before transmission of the PUSCH including the UL-SCH and a value of CW used for the CAP based on the two fields.

In a case that the terminal apparatus 1 successfully receives the uplink grant in the NR-U cell in S10013, the terminal apparatus 1 performs the CAP before transmission of the PUSCH including the corresponding UL-SCH. In a case that channels are determined to be idle in the CAP, the terminal apparatus 1 may transmit the PUSCH. In a case that the type 1 CAP is set in a field indicating the type of the CAP included in the uplink grant, the terminal apparatus 1 transmits the PUSCH after performing the type 1 CAP, and transmits the PUSCH after performing the type 2 CAP in a case that the type 2 CAP is set in a field indicating the type of the CAP. An example in which the type 1 CAP is set in a field indicating the type of the CAP is illustrated in S10013. In the case of the type 1 CAP, the terminal apparatus 1 may determine the value of CW based on the value p of the CAPC set in the CAPC field. In a case that transmission of the PUSCH is initial transmission for the terminal apparatus 1, the value of CW may be CW #0. The terminal apparatus 1 may set the value of the counter N for the CAP before transmission of the PUSCH to the value of $N_{init}$ based on the random function of CW #0, perform CCA based on the type 1 CAP, and transmit the PUSCH in a case that all the channels are idle (S10014). Further, in a case that the terminal apparatus 1 successfully receives the uplink grant, the terminal apparatus 1 may set the updated value of CW used for SR transmission to $CW_{min}$. In other words, in a case that it is considered that SR transmission is successful, the terminal apparatus 1 may set the value of CW to $CW_{min}$.

In a case that the value of SR_COUNTER is set to zero in the MAC entity, the terminal apparatus 1 may set the updated value of CW to $CW_{min}$. In addition, in a case that the terminal apparatus 1 determines that there is no other suspended SR in the MAC entity, the terminal apparatus 1 may set the updated value of CW to the $CW_{min}$. In addition, in a case that the terminal apparatus 1 determines that the UL-SCH including a BSR has been successfully transmitted, the terminal apparatus 1 may set the updated value of CW to $CW_{min}$.

In a case that the base station apparatus 3 successfully receives the UL-SCH and a BSR is included in the UL-SCH in S10014, the base station apparatus 3 may transmit one or multiple uplink grants in order to assign the necessary PUSCH in consideration of the BSR. Further, in a case that the UL-SCH has been successfully received, the base station apparatus 3 may set the updated value of CW to $CW_{min}$. In other words, in a case that it is considered that the uplink grant corresponding to the SR has been successfully received by the terminal apparatus 1, the base station apparatus 3 may set the updated value of CW to $CW_{min}$.

The terminal apparatus 1 may set the updated value of CW to $CW_{min}$ in a case that the random access procedure is started in the NR-U cell (NR-U cell as SpCell) to perform transmission of the SR. In addition, in a case that all suspended SRs are canceled in the MAC entity, the terminal apparatus 1 may set the updated value of CW to the $CW_{min}$. In addition, in a case that one or multiple configured downlink assignments and/or uplink grants are cleared, the terminal apparatus 1 may set the updated value of CW to $CW_{min}$. In addition, in a case that the terminal apparatus 1 notifies the RRC of releasing the PUCCH for all serving cells, the terminal apparatus 1 may set the updated value of CW to $CW_{min}$.

The value p of the CAPC may be independently configured for each of the PUSCH, PUCCH, and PRACH. In addition, the value p of the CAPC may have a common value configured as a cell-specific higher layer parameter for the PUSCH, PUCCH, and PRACH. In addition, the value p of the CAPC may be configured as an independent higher layer parameter for each of the PUSCH, PUCCH, and PRACH. In addition, the value p of the CAPC for the PUSCH may be indicated as included in the DCI format used for scheduling of the PUSCH. In addition, the value p of the CAPC for the PUCCH may be indicated as included in the DCI format including a PUCCH resource indicator field. In addition, the value p of the CAPC for the PRACH may be indicated as included in the DCI format for the PDCCH order. In addition, the value p of the CAPC for the PRACH may be determined according to the type of the random access procedure. For example, the value p of the CAPC for the CBRA may be determined based on system information and/or higher layer parameters. In addition, the value p of the CAPC for the CFRA may be determined based on the higher layer parameters, or may be configured as included in the DCI format corresponding to the PDCCH order. In the CFRA, the value p of the CAPC may be determined based on the higher layer parameters, the field of the DCI format, or the configuration of the system information and/or higher layer parameters.

In a case that the terminal apparatus 1 transmits a HARQ-ACK for the PDSCH with the PUCCH resource, the type of the channel access procedure and/or the value p of the CAPC for the PUCCH may be configured with dedicated one or multiple fields included in the DCI format used for scheduling of the PDSCH. Further, the DCI format may include a PUCCH resource indicator field. In other words, the type of the channel access procedure and/or the value of the CAPC for the PUCCH resource may be used for the PUCCH resource indicated by the PUCCH resource indicator field. In addition, in a case that the terminal apparatus 1 transmits the SR using the PUCCH resource, the type of the channel access procedure and/or the value p of the CAPC for the PUCCH may be configured based on one or multiple higher layer parameters included in the PUCCH configuration or the SR configuration.

The value p of the CAPC may be determined for the PUSCH and PUCCH in association with information to be transmitted. For example, in a case that UCI is included and transmitted in the PUSCH or the PUCCH, the value p of the CAPC may be configured individually in accordance with the type of information included in the UCI (HARQ-ACK, SR, CSI, etc.) or a combination thereof.

Although the value p of the CAPC has been described in the present embodiment, the type of the channel access procedure (CAP) (type 1 CAP or type 2 CAP), the value of CW, and/or the value of $T_{mcot}$ may be similarly configured.

For example, the DCI formats (DCI format 0_0, 0_1, 1_0, and 1_1) used for the scheduling of the PDSCH and PUSCH and resource assignment of the PRACH in the NR-U cell may include some or all of 8A to 8E described below as fields to perform the channel access procedure.

8A) Type of channel access procedure (CAP) (channel access type (CAT))
8B) Value p of channel access priority class (CAPC)
8C) Maximum channel occupancy time $T_{mcot}$
8D) Value of CW
8E) Maximum number of CCA slot durations m In a case in which the PUCCH resource indicator field is included in the DCI formats (1_0 and 1_1) used for the scheduling of the PDSCH, in addition to some or all of 8A to 8E described above, the channel access procedure prior to transmission of the PUCCH to the HARQ-ACK of the PDSCH may be performed based on at least one of 8A to 8E described above included in the DCI formats.

In a case in which the received DCI formats indicate resource assignment of the random access preamble, in other words, in a case in which the PDCCH order is received, and the PDCCH order includes some or all of 8A to 8E described above, the channel access procedure prior to transmission the random access preamble may be performed based on some or all of 8A to 8E described above included in the PDCCH order.

In a case in which an SR is transmitted on the PUCCH of the NR-U carrier, some or all of 8A to 8E described above may be included in the PUCCH configuration or the SR configuration. That is, in a case in which a channel access procedure is performed for the PUCCH including the SR, a parameter for the channel access procedure may be configured based on a higher layer parameter. In addition, in a case in which a channel access procedure is performed on the PUCCH including the SR, a parameter for the channel access procedure may be transmitted and configured from the base station apparatus 3 to the terminal apparatus 1 via the RRC layer signal.

Next, a HARQ operation according to the present embodiment will be described.

The MAC entity of the terminal apparatus 1 may include at least one HARQ entity for each serving cell. At least one HARQ entity may maintain a number of parallel HARQ processes. Each HARQ process can be associated with one HPID. The HARQ entity guides HARQ information and the associated TB received on the DL-SCH to the corresponding one or multiple HARQ processes.

The number (maximum number) of parallel DL HARQ processes for each HARQ entity may be configured based on higher layer parameters (e.g., RRC parameters), or may be default values unless the higher layer parameters are received. A dedicated broadcast HARQ process may be used for a BCCH. Further, the broadcast HARQ process may be referred to as a broadcast process.

The HARQ process supports one TB in a case that the physical layer is not configured with downlink spatial multiplexing. In addition, the HARQ process supports one or two TBs in a case that the physical layer is configured with downlink spatial multiplexing.

In a case that the MAC entity of the terminal apparatus 1 is configured with higher layer parameter pdsch-AggregationFactor having a value greater than 1, pdsch-AggregationFactor may provide the number of TBs transmitted in the bundle of dynamic downlink assignments. A bundling operation (HARQ-ACK bundling operation) relies on a HARQ entity for invoking (activating) the same HARQ process for each transmission operation that is part of the same bundle. After the initial transmission, retransmission of the HARQ with the value one less than the value configured by pdsch-AggregationFactor (i.e., pdsch-AggregationFactor−1) may continue in the bundle.

In a case that the downlink assignment is indicated, the MAC entity of the terminal apparatus 1 may assign one or multiple TBs and associated HARQ information received from the physical layer to the HARQ process indicated by the associated HARQ information. In addition, in a case that the downlink assignment is indicated for the broadcast HARQ process, the MAC entity of the terminal apparatus 1 may assign the received Tbs to the broadcast HARQ process.

In a case that transmission is performed for the HARQ process, the HARQ information associated with the one or two TBs (in the case of downlink spatial multiplexing) may be received from the HARQ entity.

For each received TB and associated HARQ information, in a case that an NDI is provided, in a case that the NDI is toggled compared to the transmission value (the value of NDI associated with the HPID included in the PDCCH) received before corresponding to the TB, in a case that the HARQ process corresponds to a broadcast process and this is transmission received first for the TB in accordance with the system information schedule indicated by the RRC, or in a case that this is transmission truly received first for the TB (i.e., there is no prior NDI (not present) for this TB and new transmission), the HARQ process (a HARQ process associated with a certain HPID) considers that the transmission is new transmission. Otherwise, the HARQ process considers this transmission as retransmission. Further, previously received transmission may be transmission received in the past. Here, transmission may be of a TB transmitted from the base station apparatus 3.

In a case that this (received TB) is of new transmission, the MAC entity attempts to decode the received data (data for the received TB). In addition, in a case that this is retransmission and the data of the TB has not been successfully decoded, the MAC entity instructs the physical layer to combine the data from which the most recent data has been received within the soft buffer for the TB and decodes the combined data. In addition, in a case that it is considered that the data that the MAC entity attempted to decode has been successfully decoded for the TB, in a case that the data for the TB has been successfully decoded before, or in a case that the HARQ process is the same as the broadcast process, the MAC entity transfers the decoded MAC PDU to a higher layer (RLC layer, PDCP layer, and/or RRC layer). In addition, in a case that this is the first successful decoding of the data for the TB, the MAC entity transfers the MAC PDU decoded to the disassembly and demultiplexing entity. Otherwise, the MAC entity instructs the physical layer to exchange data that the MAC entity attempted to decode with data in the soft buffer for this TB. The MAC entity indicates the physical layer to generate an acknowledgement (s) of the data of the TB in a case that the HARQ process is related to the transmission indicated with the TC-RNTI, in a case that the contention resolution is not yet successful, in a case that the HARQ process corresponds to a broadcast process, or in a case that the timeAlignmentTimer associated with TAG including the serving cell to which HARQ feedback is transmitted stops or expires. Further, the acknowledgement may be ACK or NACK.

In a case that the terminal apparatus 1 and/or the MAC entity of the terminal apparatus 1 considers the transmission as retransmission in the HARQ process in the NR-U cell, the physical layer of the terminal apparatus 1 received the indication to generate the acknowledgement (s) of the data in the TB may update the value of CW used for $N_{init}$ in a case that the type 1 channel access procedure is performed prior to transmission of the PUCCH or the PUSCH including HARQ-ACK. In addition, in a case that the terminal apparatus 1 and/or the MAC entity of the terminal apparatus 1 considers the transmission as new transmission in the HARQ process in the NR-U cell, the physical layer of the terminal apparatus 1 received the indication to generate the acknowledgement (s) of the data in the TB may set the value of CW used for $N_{init}$ to the initial value of $CW_p$ or update the value of CW (i.e., maintain the value of CW) in a case that the type 1 channel access procedure is performed prior to transmission of the PUCCH or the PUSCH including HARQ-ACK. Further, in a case that the type 2 channel access procedure is performed prior to transmission of the PUCCH or the PUSCH including HARQ-ACK, the physical layer of the terminal apparatus 1 performs CCA only once prior to transmission of the PUCCH or the PUSCH including HARQ-ACK, regardless of whether the transmission is new transmission or retransmission, and in a case that the NR-U channel is determined to be idle, the PUCCH or the PUSCH including the HARQ-ACK may be transmitted.

Here, updating the value of CW is that, for example, in a case that there are three allowable values of configurable CW including CW #0, CW #1, and CW #2 (CW #0<CW #1<CW #2) and the value of CW is CW #0, the value of CW is updated to CW #1 that is one greater value. In addition, updating the value of CW is to update the value of CW to CW #2 that is one greater value in a case that the value of CW is CW #1. In addition, in a case that the value of CW is CW #2 ($CW_{max}$) and there is no one greater value than the value of CW, updating the value of CW can include resetting the value to CW #0 ($CW_{min}$).

Here, the physical layer may include at least one of the transmitter, the reception unit, the radio transmission and/or reception unit, and/or the measurement unit, or it may be a physical layer processing unit. The MAC entity may be a MAC layer or a MAC layer processing unit.

In a case that it is determined that the NDI in the PDCCH for the C-RNTI is toggled compared to the value in the previous transmission, the MAC entity ignores the NDI received in all downlink assignments in the PDCCH for the TC-RNTI.

In a case in which the DCI format used for the scheduling of the PDSCH in the NR-U cell is detected in the PDCCH, in a case that the DCI format includes a HARQ process ID (HPID) and NDI, the terminal apparatus 1 can determine whether the transmission of the PDSCH is new transmission or retransmission based on whether the NDI has been toggled for the HPID. Furthermore, in a case that the DCI format includes a field indicating the PUCCH resource, it may be determined whether to adjust the value of CW based on whether the NDI has been toggled. For example, in a case that the value of the NDI for the HARQ process associated with a first HPID has been toggled, the terminal apparatus 1 sets the value of $CW_p$ corresponding to the value p of each CAPC to $CW_{min}$, otherwise (i.e. in a case that the value of the NDI has not been toggled), the terminal apparatus 1 may increase the value of the $CW_p$ to one greater allowable value (value of CW) (that is, the terminal apparatus 1 may update the value of the value of $CW_p$ (value of CW)).

In a case that a HARQ-ACK codebook for the HARQ process associated with one or multiple HPIDs is generated, in a case that the value of the NDI has not been toggled for at least one HPID, the terminal apparatus 1 may update the value of CW for the type 1 channel access procedure performed prior to transmission of the PUCCH or the PUSCH including the HARQ-ACK codebook.

In a case in which the PDCCH and the PDSCH including the DCI format used for the scheduling of the PDSCH in the NR-U cell are transmitted, in a case that the type 1 channel access procedure is performed prior to transmission of the PDCCH and the PDSCH and it is determined that the NR-U channel is idle in all CCA slot durations, the base station apparatus 3 transmits the PDCCH and the PDSCH, and in a case that it is determined that the NR-U channel is not idle, the base station apparatus 3 may postpone transmission of the PDCCH and the PDSCH until it can be determined that the NR-U channel is idle in all the CCA slot durations.

Even a prescribed period elapses after transmitting the PDCCH and the PDSCH, the base station apparatus 3 may retransmit the PDCCH and the PDSCH in a case that the PUCCH or PUSCH including the HARQ-ACK for the PDSCH has not been successfully received. The base station apparatus 3 retransmits the PDCCH and the PDSCH without toggling the value of the NDI for the HPID. In other words, the base station apparatus 3 may indicate that the PDSCH is retransmission without toggling the value of the NDI for the HPID. At this time, the base station apparatus 3 may update the value of CW in the case in which the type 1 channel access procedure is performed.

Further, the base station apparatus 3 may reset the value of CW corresponding to the HARQ process for the HPID to $CW_{min}$ in a case that the PUCCH or the PUSCH including the HARQ-ACK for the PDSCH corresponding to the HARQ process associated with the HPID can be successfully received within a prescribed period after the PDCCH and the PDSCH are transmitted. In other words, to toggle the value of the NDI for the HARQ process associated with the HPID, the base station apparatus 3 may set the value of CW to $CW_{min}$ in a case that the channel access procedure is performed before the transmission of the PDCCH and the PDSCH. Here, in a case that a HARQ process associated with multiple HPIDs can be managed, the base station apparatus 3 may perform a channel access procedure and/or a CW adjustment procedure for each HPID.

In a case that the base station apparatus 3 transmits the PDCCH and the PDSCH scheduled by the PDCCH and is not able to successfully receive the PUCCH or the PUSCH including a HARQ-ACK corresponding to the PDSCH (i.e., HARQ-ACK for the HPID corresponding to the PDSCH) in a prescribed period (e.g., until the prescribed timer expires), the base station apparatus 3 may update the value of CW for the PDCCH and the PDSCH. Note that, in a case that the PUSCH including the HARQ-ACK for the HPID corresponding to the PDSCH is successfully received instead of the PUCCH, the base station apparatus 3 may not update the value of CW for the PDCCH and the PDSCH.

In a case that it is considered that the HARQ operation of the HARQ process with a certain HPID is successful, the base station apparatus 3 and/or the terminal apparatus 1 may set the value of CW updated in association with the operation to $CW_{min}$.

In a case that the terminal apparatus 1 has received the PDSCH with the same HPID and indicating retransmission after transmitting the HARQ-ACK for the received PDSCH via the PUCCH or the PUSCH, is required for retransmission of the HARQ-ACK for the PDSCH, or performs the type 1 channel access procedure prior to transmission of the PUCCH including the HARQ-ACK for the PDSCH, the terminal apparatus 1 may update the value of CW used for $N_{init}$. In other words, each time retransmission is indicated for the PDSCH with the same HPID, the terminal apparatus 1 may update the value of CW used for the corresponding $N_{init}$ in a case that the type 1 channel access procedure is performed prior to transmission of the PUCCH including the HARQ-ACK for the PDSCH.

The SSB and/or CSI-RS in the NR-U cell may be collectively referred to as a NR-U discovery reference signal (DRS). The NR-U DRS may be detected in order for the terminal apparatus 1 to check whether the NR-U cell is activated or deactivated.

Next, a procedure for reporting CSI according to the present embodiment will be described.

Time/frequency resources that can be used by the terminal apparatus 1 to report CSI may be controlled (configured) by the base station apparatus 3. CSI may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI), and/or a layer 1-reference signal received power (L1-RSRP).

For the CQI, PMI, CRI, SSBRI, LI, RI, and L1-RSRP, the terminal apparatus 1 may configure N CSI-ReportConfig report settings (where N is a value equal to or greater than 1), M CSI-ResourceConfig resource settings (where M is a value equal to or greater than 1), and one or two lists of trigger states by a higher layer (higher layer processing unit) and/or as a higher layer parameter. The trigger state may be given by AperiodicTriggerStateList, and/or CSI-SemiPersistentOnPUSCH-TriggerStateList that are higher layer parameters. Each trigger state in AperiodicTriggerStateList may include a list of one or multiple associated CSI-ReportConfig indicating a channel and a resource set ID for optional interference. Each trigger state in CSI-SemiPersistentOnPUSCH-TriggerStateList may be included in one associated CSI-ReportConfig.

CSI-ResourceConfig may include at least one or all of CSI-ResourceConfigId, csi-RS-ResourceSetList, bwp-Id, and/or resourceType. csi-RS-ResourceSetList may select either nzp-CSI-RS-SSB or csi-IM-ResourceSetList. nzp-CSI-RS-SSB may include nzp-CSI-RS-ResourceSetList and/or csi-SSB-ResourceSetList.

Each report setting CSI-ReportConfig is associated with one downlink BWP given at CSI-ResourceConfig associated with the channel measurement, and may include one or multiple parameters for one CSI report band, a codebook configuration including a codebook subset limit, a behavior in the time domain, the frequency granularity for the CQI and PMI, the measurement limiting configuration, and an amount relating to CSI reported by the terminal apparatus 1 such as LI, L1-RSRP, CRI, and SSBRI. Here, the frequency granularity may be a size of the frequency domain (e.g., a bandwidth, number of PRBs).

The behavior of CSI-ReportConfig in the time domain is indicated by the higher layer parameter (RRC parameter) reportConfigType, and can be set to "aperiodic", "semiPersistentOnPUCCH", "semiPersistentOnPUSCH", or "periodic". Configured periodicity and slot offset (offset of the time domain) for CSI report of periodic, semiPersistentOnPUCCH, semiPersistentOnPUSCH is applied to numerology of the uplink BWP in which the CSI report is configured to be transmitted. In a case that the PMI/CQI report is of a wideband or a subband, reportFreqConfiguration indicates the report granularity of the frequency domain including the CSI report band. A timeRestrictionForChannelMeasurements parameter in CSI-ReportConfig may be configured so that the time domain can be limited for one or multiple channel measurements, and timeRestrictionForInterferenceMeasurements may be configured so that the time domain can be limited for one or multiple interference measurements. The CSI-ReportConfig may further include one or multiple configuration parameters for the type ICSI or type IICSI including a codebook subset limit, or CodebookConfig including one or multiple configurations for a group based report.

Each CSI resource setting CSI-ResourceConfig may include a configuration of a list of S CSI resource sets (S is a value equal to or greater than 1) given by the higher layer parameter csi-RS-ResourceSetList. The list may include a reference to one or both of one or multiple NZP CSI-RS resource sets and one or multiple SS/PBCH block sets, or the list may be configured with a reference to one or multiple CSI-IM resource sets. Each resource setting is allocated to the DL BWP identified by the higher layer parameter bwp-Id, and all CSI resource settings linked to one CSI report setting are in the same DL BWP.

The behavior of the time domain of one or multiple CSI-RS resources in the CSI resource setting is indicated by the higher layer parameter resourceType and may be set to be aperiodic, periodic, or semi-persistent. The number of configured CSI-RS resource sets for the periodic resource setting and the semi-persistent CSI resource setting may be limited to S=1. The periodicity and slot offset configured for the periodic resource setting and semi-persistent CSI resource setting may be given according to the numerology of the associated DL BWP given based on the bwp-Id. In a case that multiple CSI-ResourceConfigs constituted by the same NZP CSI-RS resource ID is configured, the terminal apparatus 1 may configure the behavior of the same time domain for the multiple CSI-ResourceConfigs. All CSI resource settings linked to one CSI report setting may have the same time domain behavior, configure the same time domain, and configure parameters of the same time domain.

Using higher layer signaling for one or multiple CSI resource settings for channel measurement and interference measurement, one or multiple CSI-IM resources for interference measurement, one or multiple CSI IM resources for interference measurement, one or multiple NZP CSI-RS resources for interference measurement, and one or multiple NZP CSI-RS resources for channel measurement may be configured.

The terminal apparatus 1 may assume that one or multiple NZP CSI-RS resources for channel measurement and one or multiple CSI-IM resources for interference measurement configured for one CSI report are in Quasi-CoLocation (QCL) in a resourcewise manner in association with "QCL-TypeD". In a case that one or multiple NZP CSI-RS resources are used for interference measurement, the terminal apparatus 1 may assume that one or multiple NZP CSI-RS resources for channel measurement, one or multiple CSI-IM resources for interference measurement, and/or one or multiple NZP CSI-RS resources for interference measurement configured for one CSI report are in Quasi-CoLocation (QCL) in association with "QCL-TypeD".

The terminal apparatus 1 may calculate one or multiple CSI parameters on the assumption of a dependent relationship between CSI parameters. The LI may be calculated based on reported CQI, PMI, RI, and CRI. The CQI may be calculated based on reported PMI, RI, and CRI. The PMI may be calculated based on the reported RI and CRI. The RI may be calculated based on the reported CRI.

The report configuration for the CSI may be configured to be aperiodic using the PUSCH, periodic using the PUCCH, and semi-persistent using the PUCCH or the DCI-activated PUSCH. The CSI-RS resource may be configured to be periodic, semi-persistent, or aperiodic.

FIG. 11 is a diagram showing an example of triggering/activation of a CSI report for a possible CSI-RS configuration according to an aspect of the present embodiment. FIG.

11 illustrates supported combinations of one or multiple CSI report configurations and one or multiple CSI-RS resource configurations and how CSI report is triggered for each CSI-RS resource configuration. Periodic CSI-RS is configured by a higher layer. Semi-persistent CSI-RS is activated/deactivated by an activation command Aperiodic CSI-RS is configured by a higher layer and is triggered/activated by the DCI or an activation command In a case that the higher layer parameter NZP-CSI-RS-ResourceSet is configured and in a case that the higher layer parameter repetition is set to "off" by the terminal apparatus 1, the terminal apparatus 1 may determine one CRI from a supported set of one or multiple CRI values, or may report the number (number or value) in each CRI report. In a case that the higher layer parameter repetition is set to "on", the CRI report may not be supported. In a case that the higher layer parameter codebookType is set to typeII" or "typeII-PortSelection", the CRI report may not be supported.

The periodicity measured in one or multiple slots may be configured by the higher layer parameter reportSlotConfig for periodic CSI report or semi-persistent CSI report in the PUCCH. Further, the periodic CSI may be referred to as P-CSI. In addition, semi-persistent CSI may also be referred to as SP-CSI.

The allowed slot offset may be configured by the higher layer parameter reportSlotOffsetList for aperiodic CSI report or semi-persistent CSI report in the PUSCH. The offset may be selected in the activating/triggering DCI. Further, the aperiodic CSI may be referred to as A-CSI.

For CSI report, the terminal apparatus 1 may configure one of two possible subband sizes by higher layer signaling. A subband may be defined as an $N^{SB}_{PRB}$ continuous PRB, or may depend on the total number of PRBs of a BWP.

FIG. 12 is a diagram showing an example of configurable subband sizes according to an aspect of the present embodiment. The subband sizes may be given corresponding to the bandwidths of a BWP (the number of PRBs). Any one of two possible subband sizes may be configured by the higher layer parameter subbandSize.

reportFreqConfiguration included in CSI-ReportConfig indicates the frequency granularity of CSI report. A CSI report setting configuration may define a CSI report band as a subset of one or multiple subbands of the BWP. reportFreqConfiguration indicates csi-ReportingB and as a continuous or discontinuous subset of the one or multiple subbands of the BWP to which the CSI is reported. The terminal apparatus 1 may not expect that the CSI-RS resource linked to the CSI report setting is configured with csi-ReportingB and including a subband in which the frequency density of each CSI-RS port for each PRB in the subband is smaller than the configured density of the CSI-RS resource. In a case that the CSI-IM resource is linked to the CSI report setting, the terminal apparatus 1 may not expect to configure csi-ReportingB and including the subband in which the CSI-IM resource element (RE) is not present in all the PRBs in the subband. In other words, in a case that csi-ReportingBand is configured, at least one CSI-IM RE may be present in each subband.

Wideband CQI report or subband CQI report is configured by the higher layer parameter cqi-FormatIndicator. In a case that the wideband CQI report is configured, the wideband CQI may be reported for each codeword for the entire CSI report band. In a case that the subband CQI report is configured, one CQI for each codeword may be reported for each subband in the CSI report band.

Wideband PMI report or subband PMI report is configured by the higher layer parameter pmi-FormatIndicator. In a case that the wideband PMI report is configured, the wideband PMI may be reported for each codeword for the entire CSI report band. In a case that the subband PMI report is configured, one wideband indication may be reported to the entire CSI report band and one subband indication may be reported for each subband of the CSI report band, except two antenna ports. In a case that the two antenna ports are configured for the subband PMI, the PMI may be reported to each subband in the CSI report band.

The CSI report setting may have wideband frequency granularity in a case that any one condition of the following 9A to 9D is satisfied. In other words, in a case that at least one of the conditions described below is satisfied, the terminal apparatus 1 may consider that the frequency granularity for the CSI report setting is a wideband.

9A) reportQuantity is set to "cri-RI-PMI-CQI", or "cri-RI-LI-PMI-CQI", cqi-FormatIndicator indicates one CQI report, and pmi-FormatIndicator indicates one PMI report.

9B) reportQuantity is set to "cri-RI-i1".

9C) reportQuantity is set to "cri-RI-CQI" or "cri-RI-i1-CQI" and cqi-FormatIndicator indicates one CQI report.

9D) reportQuantity is set to "cri-RSRP" or "ssb-Index-RSRP".

In a case that it is considered that any condition of 9A to 9D described above is not satisfied, the CSI report setting may have the subband frequency granularity. In other words, the terminal apparatus 1 may consider that the frequency granularity for the CSI report setting is a subband.

In a case that the subband is configured in the CSI report setting, the first subband size may be given based on the subband size corresponding to the bandwidth of the BWP (the number of PRBs) and the start index of the BWP. In addition, the final subband size, the first subband size may be given based on the subband size corresponding to the bandwidth of the BWP (the number of PRBs), the start PRB index of the BWP, and the bandwidth of the BWP.

In a case that semi-persistent CSI report is configured for the terminal apparatus 1, the terminal apparatus 1 may report the CSI in a case that both the CSI-IM resource and the NZP CSI-RS resource are configured as periodic or semi-persistent. In addition, in a case that the aperiodic CSI report is configured for the terminal apparatus 1, the terminal apparatus 1 may report the CSI in a case that both the CSI-IM resource and the NZP CSI-RS resource are configured as periodic, semi-persistent, or aperiodic. The CSI-IM resource and the NZP CSI-RS resource may each be configured with one or multiple resources.

The terminal apparatus 1 configured with the DCI format 1_0 may not expect to trigger multiple CSI reports with the same CSI-ReportConfigId.

For the aperiodic CSI, each trigger state configured using a higher layer parameter CSI-AperiodicTriggerState may be associated with one or multiple CSI-ReportConfigs respectively linked to a periodic resource setting, a semi-persistent resource setting, or an aperiodic resource setting. In a case that one resource setting is configured, the resource setting given by the higher layer parameter resourceForChannelMeasurement may be used for channel measurement for L1-RSRP calculation. In a case that two resource settings are configured, a first resource setting given by the higher layer parameter resourceForChannelMeasurement is used for channel measurement, and a second resource setting given by the higher layer parameter csi-IM-ResourcesForInterference or the higher layer parameter nzp-CSI-RS-ResourcesForInterference may be used for interference measurement performed with CSI-IM (one or multiple CSI-IM resources) or NZP CSI-RS (one or multiple Non Zero Power CSI-RS). In a case that three resource settings are configured, the first resource setting given by the higher layer parameter resourceForChannelMeasurement is used for channel measurement, the second resource setting given by the higher layer parameter csi-IM-ResourcesForInterference may be used for CSI-IM-based interference measurement, and a third resource setting given by the higher layer parameter nzp-CSI-RS-ResourcesForInterference may be used for NZP CSI-RS-based interference measurement.

For the semi-persistent CSI or the periodic CSI, each CSI-ReportConfig may be linked to one or multiple periodic resource settings or semi-persistent resource settings. In a case that one resource setting is configured, the resource setting given by the higher layer parameter resourceForChannelMeasurement may be used for channel measurement for L1-RSRP calculation. In a case that two resource settings are configured, the first resource setting given by the higher layer parameter resourceForChannelMeasurement is used for channel measurement, and the second resource setting given by the higher layer parameter csi-IM-ResourcesForInterference may be used for interference measurement performed with CSI-IM (one or multiple CSI-IM resources).

The terminal apparatus 1 is not expected to configure CSI-RS resources that are greater than one in a resource set for channel measurement for one CSI-ReportConfig including a higher layer parameter codebookType set to "typeII" or "typeII-PortSelection".

The terminal apparatus 1 is not expected to configure NZP CSI-RS resources that are greater than 64 in a resource set for channel measurement for one CSI-ReportConfig including the higher layer parameter codebookType set to "none", "cri-RI-CQI", "cri-RSRP", or "ssb-index-RSRP".

In a case that the interference measurement is performed in CSI-IM, each CSI-RS resource for the channel measurement may relate to the CSI-IM resource in a resource-wise manner by numbering the CSI-RS resource and the CSI-IM resource in one or multiple corresponding resource sets. The number of CSI-RS resources for channel measurement may be the same as the number of CSI-IM resources.

In a case that the interference measurement is performed in NZP CSI-RS, the terminal apparatus 1 may not expect NZP CSI-RS resources that are greater than one in the associated resource set within the resource setting for the channel measurement. The terminal apparatus 1 configured with the higher layer parameter nzp-CSI-RS-ResourcesForinterference may expect that a CSI-RS port not greater than 18 is configured in the NZP CSI-RS resource set.

For CSI measurements of the terminal apparatus 1, each NZP CSI-RS port configured for interference measurement may correspond to an interference transmission layer, and all interference transmission layers in one or multiple NZP CSI-RS ports for interference measurement may consider an energy per resource element (EPRE) ratio and may assume another interference signal in one or multiple REs of the NZP CSI-RS resources for the channel measurement, the NZP CSI-RS resources for interference measurement, or CSI-IM resources for interference measurement.

Here, the CSI measurement may be performed by measuring the CSI-RS resources and calculating the CSI. The CSI measurement includes channel measurement and interference measurement. The channel measurement may be performed using the NZP CSI-RS resources. The interference measurement may be performed using the CSI-IM resources and/or the NZP CSI-RS resources and/or ZP CSI-RS resources.

As indicated by the higher layer parameters CSI-ResourceConfig and NZP-CSI-RS-ResourceSet, the terminal apparatus 1 may have one or multiple NZP CSI-RS resource set configurations. Each NZP CSI-RS resource set may be configured from K (where K is a value equal to or greater than 1) NZP CSI-RS resources.

The terminal apparatus 1 assumes non-zero transmission power (that is, the NZP CSI-RS resources) for the CSI-RS resources in a case that some or all of the 10A to 10M parameters described below are configured. The NZP CSI-RS resources may be configured with higher layer parameters NZP-CSI-RS-Resource, CSI-ResourceConfig, and NZP-CSI-RS-ResourceSet for each CSI-RS resource configuration.

10A) nzp-CSI-RS-ResourceId
    10B) periodicityAndOffset
    10C) resourceMapping
    10D) nrofPorts
    10E) density
    10F) cdm-Type
    10G) powerControlOffset
    10H) powerControlOffsetSS
    10I) scramblingID
    10J) bwp-Id
    10K) repetition
    10L) qcl-InfoPeriodicCSI-RS
    10M) trs-Info All CSI-RS resources in one set may be configured with the same 10E value and the same 10D value, except that the NZP CSI-RS resources are used for interference measurement.

10A described above may be used to determine the ID of the CSI-RS resource configuration.

10B may be used to define periodicity and slot offset of the CSI-RS for P-CSI and/or
    SP-CSI.

10C described above may be used to define the number of CSI-RS resource ports in a slot, a CDM type, an OFDM symbol, and a subcarrier occupancy rate.

10D described above may be a parameter included in 10C described above and may be used to define the number of CSI-RS ports.

10E described above is a parameter included in 10C described above and may be used to define CSI-RS frequency density of each CSI-RS port of each PRB. In a case that a value of 10E is ½, it may also be used to define a PRB offset. The odd/even PRB allocation indicated by 10E may be related to a common resource block grid.

10F described above is a parameter included in 10C described above and may be used to define a CDM value and a pattern.

10G described above may be a presumed ratio of the PDSCH EPRE and the NZP CSI-RS EPRE in a case that the terminal apparatus 1 derives a CSI report (CSI feedback).

10H described above may be an assumed ratio of the SS/PBCH block EPRE and the NZP CSI-RS EPRE.

10I described above may be used to define a scrambling ID of CSI-RS and may have a length of 10 bits.

10J is a parameter included in CSI-ResourceConfig and may be used to define a BWP in which configured CSI-RS is allocated.

10K described above is a parameter included in NZP-CSI-RS-ResourceSet and may be associated with one CSI-RS resource set. 10K described above may be used to define whether the terminal apparatus 1 can assume that one or multiple CSI-RS resources in the NZP CSI-RS resource set are transmitted using the same downlink space region transmission filter. In addition, 10K described above may be configured only in a case that the higher layer parameter reportQuantity associated with all report settings linked to the CSI-RS resource set is set to "cri-RSRP" or "none".

10L may include a reference to TCI-State indicating one or multiple QCL sources RSs and QCL types. In a case that the TCI-State is configured with a reference to RS associated with "QCL-TypeD", the RS may be SS/PBCH block allocated to the same or different CC/DL BWP, or may be CSI-RS resource configured as a periodic, which is allocated to the same or different
CC/DL BWP.

10M described above is a parameter included in NZP-CSI-RS-ResourceSet and may be associated with a CSI-RS resource set. In addition, with respect to 10M described above, the terminal apparatus 1 may assume that antenna ports with the same port index of one or multiple configured CSI-RS resources in NZP-CSI-RS-ResourceSet are the same. 10M described above may be configured in a case that no report setting is configured or in a case that reportQuantity associated with all report settings linked to the CSI-RS resource set is set to "none".

The bandwidth (number of PRBs) of the CSI-RS resource in one BWP and the initial common resource block (CRB) index may be determined in each CSI-FrequencyOccupation IE configured by the higher layer parameter freqBand in the CSI-ResourceMapping IE based on the higher layer parameters nrofRBs and startingRB.

nrofRBs and startingRB may be configured by an integer multiple of 4RBs. A reference point of startingRB may be a common resource block grid CRB0. In a case that startingRB is a value smaller than $N^{start}_{RB}$, the terminal apparatus 1 may assume that the initial CRB index $N_{initialRB}$ of the CSI-RS resource is the same value as $N^{start}_{RB}$. Otherwise, $N_{initialRB}$ may be the same value as startingRB.

The value of nrofRBs may not match the bandwidth of the carrier or the bandwidth of the BWP, or may be configured to be the same value. In addition, startingRB may be configured to have the same value as the PRB index 0 (starting PRB index) of the carrier, or may be configured to have the same value as the PRB index 0 of a certain BWP, or may be configured independently of these. Further, the value of nrofRBs may be indicated as the bandwidth of the CSI report band. The value of startingRB may indicate the starting position of the frequency domain of the CSI report band. Mapping of the frequency domain of the CSI-RS may be indicated based on nrofRBs and startingRB.

In a case that nrofRBs is a value greater than $N^{size}_{BWP}+N^{start}_{RB}-N_{initialRB}$, the terminal apparatus 1 may assume that the bandwidth $N^{BW}_{CSI-RS}$ of the CSI-RS resource is the same value as the $N^{size}_{BWP}+N^{start}_{RB}-N_{initialRB}$. Otherwise, $N^{BW}_{CSI-RS}$ may be the same value as nrofRBs. Further, in all cases, the terminal apparatus 1 may expect that $N^{BW}_{CSI-RS}$ is at a value equal to or greater than the smaller value of the 24 PRBs and $N^{size}_{BWP}$ PRBs.

The terminal apparatus 1 may have one or multiple CSI-IM resource set configurations indicated by the higher layer parameters csi-IM-ResourceSet. Each CSI-RS resource set may be configured from K (where K is a value equal to or greater than 1) CSI-IM resources.

The following parameters may be configured for each CSI-IM resource configuration by using the higher layer parameter csi-IM-Resource.

11A) csi-IM-ResourceId
11B) subcarrierLocation-p0
11C) subcarrierLocation-p1
11D) symbolLocation-p0
11E) symbolLocation-p1
11F) periodicityAndOffset
11G) freqB and For each of one or multiple PRBs configured according to 11G, the terminal apparatus 1 may assume that at least one CSI-IM resource is allocated. Further, 11G may be CSI-FrequencyOccupation.

11A described above may be used to determine an ID of the CSI-IM resource configuration.

11B or 11C described above may be used to define a subcarrier occupancy rate of the CSI-IM resource in the slot for csi-IM-ResourceElementPattern set to "pattern0" or "pattern1".

11D or 11E described above may be used to define OFDM symbol allocation of the CSI-IM resource in the slot for csi-IM-ResourceElementPattern set to "pattern0" or "pattern1".

11F described above may be used to define periodicity and slot offset of the CSI-IM for periodic and/or semi-persistent CSI-IM.

11G described above may include a parameter for configuring a frequency occupancy rate of CSI-IM.

The MAC entity of the terminal apparatus 1 may perform at least some or all of the following 12A to 12H in a case that the BWP (DL BWP and/or UL BWP) is activated in each activated serving cell configured with the BWP.

12A) Transmission on the UL-SCH in the BWP
12B) Transmission on the RACH in the BWP in a case that a PRACH occasion is configured
12C) Monitoring of the PDCCH in the BWP
12D) Transmission of the PUCCH in BWP in a case that the BWP is configured
12E) CSI report on the BWP
12F) Transmission of SRS in BWP in a case that the BWP is configured
12G) Reception of DL-SCH in the BWP
12H) Start or restart of a configured uplink grant for a postponed grant type 1 configured in the active BWP in accordance with the retained configuration, and start at a symbol based on a prescribed rule The MAC entity of the terminal apparatus 1 may perform at least some or all of 12A to 12H described above in a case that the BWP (DL BWP and/or UL BWP) is deactivated, or may perform any one or both of 12I and 12J described below.

12I) Clear any of a configured downlink assignment and a configured uplink grant for a configured grant type 2 in the BWP
12J) Postponing of any of configured uplink grants of the configured grant type 1 in an inactive BWP The terminal apparatus 1 may be configured with CSI-ReportConfig with the higher layer parameter reportQuantity set to at least one of "none", "cri-RI-PMI-CQI", "cri-RI-i1", "cri-RI-i1-CQI", "cri-RI-CQI", "cri-RSRP", "ssb-Index-RSRP", and/or "cri-RI-LI-RMI-CQI".

In a case that the terminal apparatus 1 is configured with CSI-ReportConfig with the higher layer parameter reportQuantity set to "none", the terminal apparatus 1 may not report any quantity of CSI-ReportConfig.

In a case that the terminal apparatus 1 is configured with CSI-ReportConfig with a higher layer parameter reportQuantity set to "cri-RI-PMI-CQI" or "cri-RI-LI-RMI-CQI", the terminal apparatus 1 may report a desired precoding matrix for the entire report band and/or the desired precoding matrix for each subband.

In a case that the terminal apparatus 1 is configured with CSI-ReportConfig with the higher layer parameter reportQuantity set to "cri-RI-i1", the terminal apparatus 1 may expect codebookType set to "Type1-SinglePanel" for the CSI-ReportConfig and pmi-FormatIndicator configured in the wideband PMI report, and the terminal apparatus 1 may report one PMI constituting one wideband indication (e.g., ii) for the entire CSI report band.

In a case that the terminal apparatus 1 is configured with CSI-ReportConfig with the higher layer parameter reportQuantity set to "cri-RI-i1-CQI", the terminal apparatus 1 may expect codebookType set to "Type1-SinglePanel" for the CSI-ReportConfig and pmi-FormatIndicator configured in the wideband PMI report, and the terminal apparatus 1 may report one PMI constituting one wideband indication (e.g., ii) for the entire CSI report band. In addition, in this case, the CQI may be calculated based on the reported ii assuming PDSCH transmission with $N_p$ (where $N_p$ is a value equal to or greater than 1) precoders. The terminal apparatus 1 may randomly select one precoder from $N_p$ precoder for each PRG (precoding resource block group) of a PDSCH. A PRG size for CQI calculation may be configured by a higher layer parameter pdsch-BundleSizeForCSI.

In a case that the terminal apparatus 1 is configured with CSI-ReportConfig with the higher layer parameter reportQuantity set to "cri-RI-CQI" and in a case that the terminal apparatus 1 is configured with a higher layer parameter non-PMI-PortIndication included in one CSI-ReportConfig, r (r is one or a value greater than one) ports may be provided in order of layer ordering for a rank r, and each CSI-RS resource in the CSI resource setting is may be linked to CSI-ReportConfig based on the order of nzp-CSI-RS-ResourceId associated with the linked CSI resource setting for channel measurement given by a higher layer parameter resourcesForChannelMeasurement. A configured higher layer parameter non-PMI-PortIndication may include the sequence of one or multiple port indexes $p^{(1)}_0, p^{(2)}_0, p^{(2)}_1, p^{(3)}_0, p^{(3)}_1, p^{(3)}_2, \ldots, p^{(R)}_0, p^{(R)}_1, \ldots,$ and $p^{(R)}_{R-1}. p^{(v)}_0, \ldots,$ and $p^{(v)}_{v-1}$ is one or multiple CSI-RS port indexes associated with a rank v, and satisfies R∈ {1, 2, ..., P}. P∈{1, 2, 4, 8} may be the number of ports of the CSI-RS resource. The terminal apparatus 1 may only report RI corresponding to one or multiple configured fields of PortIndexFor8Ranks. In addition, in a case that the terminal apparatus 1 is not configured with the higher layer parameter non-PMI-PortIndication, the terminal apparatus 1 may associate, for each CSI-RS resource in the CSI resource setting linked to CSI-ReportConfig, one or multiple CSI-RS port indexes $p^{(v)}_0, \ldots,$ and $p^{(v)}_{v-1}$, which are {0, ..., v−1} with one or multiple ranks v=1, 2, ..., and P. In a case that the CQI for the rank is calculated, the terminal apparatus 1 may use one or multiple ports indicated for the rank for the selected CSI-RS resource. The precoder for one or multiple indicated ports may be assumed to be an identifier matrix scaled with the value obtained by v (e.g., $1/\sqrt{(v)}$).

In a case that the terminal apparatus 1 is configured with CSI-ReportConfig with the higher layer parameter reportQuantity set to "cri-RSRP" or "ssb-Index-RSRP" and in a case that the terminal apparatus 1 is further configured with a higher layer parameter groupBasedBeamReporting set to "disabled", the terminal apparatus 1 may not need to update measurement for CSI-RS resources and/or SSB resources that are greater than 64. In addition, the terminal apparatus 1 may report nrofReportedRS different pieces of CRI or SSBRI for each report setting in one report. Further, in this case, in a case that the higher layer parameter groupBasedBeamReporting set to "enabled" is configured, the terminal apparatus 1 may not need to update measurement for CSI-RS resources and/or SSB resources that are greater than 64. In addition, the terminal apparatus 1 may report two different pieces of CRI or SSBRI for each report setting in one report period. One or multiple CSI-RS resources and/or one or multiple SSB resources may be received simultaneously by the terminal apparatus 1 using one spatial region reception filter or multiple simultaneous spatial region filters.

Here, being different include the meanings of being independent, being individually configured/calculated, and being identifiable.

In a case that the terminal apparatus 1 is configured with CSI-ReportConfig with the higher layer parameter reportQuantity set to "cri-RSRP", "cri-RI-PMI-CQI", "cri-RI-i1", "cri-RI-i1-CQI", "cri-RI-CQI", and/or "cri-RI-LI-RMI-CQI", and in a case that $K_s$ resources (where $K_s$ is a value greater than 1) is configured in nzp-CSI-RS-Resource-Set corresponding to the channel measurement, the terminal apparatus 1 may derive a CSI parameter other than CRI based on the reported CRI. CRIk (k is one or a value greater than one) may correspond to a (k+1)-th entry of csi-IM-Resource associated with corresponding csi-IM-Resource-Set in a case that it is configured as a configured (k+1)-th entry of nzp-CSI-RS-Resource associated with nzp-CSI-RS-ResourceSet corresponding to channel measurement and/or a higher layer parameter. In a case that a CSI-RS resource with $K_s$ of 2 is configured, each resource may include 16 CSI-RS ports at most. In a case that Ks is larger than 2 and CSI-RS resources up to 8 are configured, each resource may include 8 CSI-RS ports at most.

The terminal apparatus 1 is configured with CSI-ReportConfig with the higher layer parameter reportQuantity set to "cri-RI-PMI-CQI", "cri-RI-i1", "cri-RI-i1-CQI", "cri-RI-CQI", and/or "cri-RI-LI-RMI-CQI" the terminal apparatus 1 may not be expected to configure CSI-RS resources greater than eight in one CSI-RS resource set included in a resource setting linked to CSI-ReportConfig.

In a case that the terminal apparatus 1 is configured with CSI-ReportConfig with the higher layer parameter reportQuantity set to "cri-RSRP" or "none", and CSI-ReportConfig is linked to the resource setting configured to the higher layer parameter resourceType set to "aperiodic", the terminal apparatus 1 may not be expected to be configured with CSI-RS resources greater than 16 in one CSI-RS resource set included in the resource setting.

LI indicates that the colon in the precoder matrix of the reported PMI corresponds to the strongest layer of a codeword corresponding to the largest reported wideband CQI. In a case that two wideband CQIs are reported and have the same value, LI may correspond to the strongest layer of a first codeword.

In a case that "QCL-TypeC" and "QCL-TypeD" are resource-wise QCLed for calculation of L1-RSRP, the terminal apparatus 1 may be configured with one or multiple CSI-RS resources, one or multiple SS/Both PBCH block resources, or one or multiple CSI-RS resources, and one or multiple SS/PBCH block resources. In addition, a CSI-RS resource setting up to 16 CSI-RS resource sets having 64 resources in each set may be configured. In other words, the base station apparatus 3 does not make such a configuration. The total number of different CSI-RS resources in all resource sets may not be configured to more than 128. In other words, the terminal apparatus 1 may not be expected to be configured with more than 128 CSI-RS resources. In other words, the base station apparatus 3 is not configured with more than 128 CSI-RS resources.

The CSI-RS resources may have a variable configurable number (upper limit value) depending on one or multiple prescribed conditions.

CSI-ReportConfig may include at least some or all of the following parameters from 13A to 13P.

13A) reportConfigId
13B) carrier
13C) resourcesForChannelMeasurement
13D) csi-IM-ResourcesForInterference
13E) nzp-CSI-RS-ResourceForInterference
13F) reportConfigType
13G) reportQuantity
13H) reportFrecronfiguration
13I) timeRestrictionForChannelMeasurements
13J) timeRestrictionForInterferenceMeasurements
13K) codebookConfig
13L) groupBasedBeamReporting
13M) cqi-Table
13N) subbandSize
13O) non-PMI-PortIndication
13P) semiPersistentOnPUSCH 13B may be configured with a serving cell index. In addition, 13H may include cqi-FormatIndicator, pmi-FormatIndicator, and/or csi-ReportingB and described above.

A CSI reference resource for a certain serving cell may be defined based on at least some or all of the following 14A and 14B.

14A) In the frequency domain, the CSI reference resource may be defined by a group of one or multiple downlink PRBs corresponding to a band relating to derived CSI.

14B) In the time domain, the CSI reference resource for CSI report in an uplink slot n' may be defined by one downlink slot $n-n_{CSI\_ref}$.

A downlink slot n may be determined based on the floor functions of the uplink slot n' and $\mu_{DL}$ and $\mu_{UL}$. $\mu_{DL}$ may be a downlink SCS configuration, and $\mu_{UL}$ may be an uplink SCS configuration.

For P-CSI report and/or SP-CSI report, in a case that one CSI reference resource is configured for channel measurement and $n_{CSI\_ref}$ corresponds to a valid downlink slot, $n_{CSI\_ref}$ may be a value equal to or greater than the value of $4*2^{\mu_{DL}}$ or $4*2^{\mu_{UL}}$. In addition, in a case that multiple CSI reference resources are configured for channel measurement and $n_{CSI\_ref}$ corresponds to a valid downlink slot, $n_{CSI\_ref}$ may be a value equal to or greater than the value of $5*2^{\mu_{DL}}$.

For A-CSI report, in a case that the terminal apparatus 1 is indicated by DCI (a CSI request field) to report CSI in the same slot as a CSI request, $n_{CSI\_ref}$ is present in the same valid downlink slot as the CSI request corresponding to the reference resource, otherwise, $n_{CSI\_ref}$ may be a value equal to or greater than a prescribed value in a case that the slot $n-n_{CSI\_ref}$ corresponds to the valid downlink slot. The prescribed value may satisfy a delay request condition.

In a case that a periodic and/or semi-persistent CSI-RS and/or CSI-IM or SSB is used for channel measurement and/or interference measurement, the terminal apparatus 1 may not be expected to measure a channel and/or interference in CSI-RS/CSI-IM/SSB in which the final OFDM symbol is received to a symbol in consideration of the delay request condition before a transmission time of the first OFDM symbol of A-CSI report.

A slot in a serving cell may be a valid downlink slot in a case that it configures a downlink or flexible symbol configured in at least one higher layer and is not within a measurement gap with respect to the terminal apparatus 1.

In a case that there is no valid downlink slot for the CSI reference resource corresponding to the CSI report setting in a certain serving cell, the CSI report may be omitted (may not be transmitted or may not be included in the CSI report) in the serving cell in an uplink slot n'.

After the CSI report (re)configuration (CSI-ReportConfig is configured), serving cell activation, BWP change, or the activation of the SP-CSI, the terminal apparatus 1 may transmit (report) a CSI report only after CSI-RS/CSI-IM is received in at least one of one or multiple CSI-RS transmission occasions for channel measurement and/or one or multiple CSI-IM occasions for interference measurement from the CSI reference resource. Otherwise, the report may be dropped.

In a case that DRX is configured, the terminal apparatus may transmit (report) a CSI report only after CSI-RS/CSI-IM is received in at least one of one or multiple CSI-RS transmission occasions for channel measurement and/or one or multiple CSI-IM occasions for interference measurement at a DRX active time from the CSI reference resource. Otherwise, the report may be dropped.

In a case that CSI feedback is derived, the terminal apparatus 1 may not describe that at least one CSI-RS resource for the channel measurement overlaps with the CSI-IM resource for interference measurement or NZP CSI-RS resource for interference measurement.

In a case that the terminal apparatus 1 is configured to report a CQI index or further configured to derive a CQI index, the terminal apparatus 1 may assume at least some or all of the following 15A to 15N in the CSI reference resource in order to derive a CQI index, or derive PMI and RI.

15A) First two OFDM symbols are occupied by control signaling (PDCCH, CORESET).
15B) The number of PDSCHs and the DMRS symbols is 12.
15C) The same BWP SCS as PDSCH reception is configured.
15D) A bandwidth is configured for a corresponding CQI report.
15E) A reference resource uses a CP length and SCS configured for PDSCH reception.
15F) No RE is used in a PSS, a SSS, and a PBCH.
15G) A value of RV is zero.
15H) A ratio of PDSCH EPRE and CSI-RS EPRE is given based on a prescribed rule.
15I) There is no RE allocated for NZP CSI-RS and ZP CSI-RS.
15J) Front loaded DM-RS symbols in the same number as the maximum front loaded symbols configured by a higher layer parameter maxLength in DMRS-DownlinkConfig is assumed.
15K) Additional DM-RS symbols in the same number as additional symbols configured by a higher layer parameter dmrs-AdditionalPosition
15L) A PDSCH symbol does not include DM-RS.
15M) A PRB band ring size is 2 PRBs.
15N) For CQI calculation, the terminal apparatus 1 has an antenna port of PDSCH signals and an antenna port of CSI-RS in a corresponding relationship.

The terminal apparatus 1 may perform aperiodic CSI report using a PUSCH of a serving cell c based on successful decoding of the DCI format 0_1 that triggers an aperiodic CSI trigger state.

An aperiodic CSI report carried by a PUSCH may support wideband and subband frequency granularity. The aperiodic CSI report carried by the PUSCH may support type I and type II CSI.

The terminal apparatus 1 may perform semi-persistent CSI report in the PUSCH based on successful decoding of the DCI format 0_1 for activating a semi-persistent CSI trigger state. The DCI format 0_1 may include a CSI field indicating activation or deactivation of semi-persistent CSI trigger state. The semi-persistent CSI report on the PUSCH may support type I and type II CSI with wideband and subband frequency granularity. The PUSCH resource and MCS may be allocated to be semi-persistent by the uplink DCI.

The CSI report on the PUSCH may be multiplexed with the uplink data on the PUSCH. The CSI report on the PUSCH may be performed without multiplexing with uplink data from the terminal apparatus 1.

Type I CSI feedback (type I CSI report) may be supported for CSI report on the PUSCH. Type I wideband and subband CSI may be supported for the CSI report on the PUSCH. The type II CSI may be supported for the CSI report on the PUSCH.

For the type I and type II CSI feedback (type I and type II CSI reports) on the PUSCH, the CSI report may be composed of two parts. Part 1 (CSI part 1 or part 1 CSI) has a fixed payload size and may be used to identify the number of information bits in Part 2 (CSI part 2 or part 2 CSI). Part 1 may be completely transmitted before Part 2.

For type I CSI feedback, Part 1 may include RI, CRI, and/or CQI for the first codeword. Part 2 may include CQI for the second codeword in a case that PMI is included and RI is greater than 4.

For type II CSI feedback, Part 1 may include an indication of the number of non-zero wideband amplitude coefficients per layer for RI, CQI, and/or type II CSI. Each field of Part 1 may be individually encoded. Part 2 may include PMI of the type II CSI. Part 1 and part 2 may be individually encoded.

The type II CSI report carried on the PUSCH may be calculated independently of any of the type II CSI reports carried in a PUCCH format 3 or 4.

In a case that the higher layer parameter reportQuantity is configured to one of "cri-RSRP" or "ssb-Index-RSRP", the CSI feedback may be constituted of one part.

Although configured for the PUCCH, a method of the PUCCH may be used as an encoding method for both type I and type II reports transmitted on the PUSCH.

FIG. 13 is a diagram showing an example of priority report levels for part 2 CSI according to an aspect of the present embodiment. In a case that CSI report on the PUSCH is constituted of two parts, the terminal apparatus 1 may exclude a part of the part 2 CSI. The exclusion of part 2 CSI may be determined based on FIG. 13. $NR_{ep}$ may be the number of CSI reports configured to be carried on the PUSCH. Priority 0 is the highest priority, and Priority $N_{Rep}$ is the lowest priority. A CSI report n may correspond to the CSI report with an n-th lower priority (higher priority) among $N_{Rep}$ CSI reports. One or multiple subbands for a certain CSI report n indicated by the higher layer parameter csi-ReportingB and may be numbered sequentially in the order of the increase in the lowest subband of csi-ReportingBand as a subband 0. In a case that part 2 CSI information for a particular priority level is excluded, the terminal apparatus 1 may exclude all information at the priority level.

In a case that the terminal apparatus 1 is scheduled to transmit a TB on the PUSCH with one or multiple CSI reports, the part 2 CSI may be excluded only in a case that the number of bits mapped to the PUSCH exceeds a prescribed value. In addition, the part 2 CSI may also be excluded level-by-level in order from the part 2 CSI with lower priority level until the number of bits that can be mapped to the PUSCH has a value equal to or smaller than a prescribed value. In addition, in a case that the part 2 CSI is transmitted on a PUSCH without TB, it may be sequentially excluded from one or multiple bits with a lower priority level until the code rate of the part 2 CSI is lower than a threshold code rate.

In a case that the terminal apparatus is configured with an active semi-persistent CSI report configuration on the PUSCH, the CSI direction may be deactivated in a case that the downlink BWP or the uplink BWP is changed. Another activation command may be required to enable the semi-persistent CSI report to be valid.

The terminal apparatus 1 may be semi-statically configured by a higher layer to perform periodic CSI report on the PUCCH. The terminal apparatus 1 may be configured by a higher layer for one or multiple periodic CSI reports corresponding to one or multiple related CSI report settings configured by higher layers. The periodic CSI report in PUCCH formats 2, 3, and 4 may support the type I CSI with wideband frequency granularity.

After the HARQ-ACK corresponding to the PDSCH carrying a select command is transmitted in the slot n, the terminal apparatus 1 may perform the semi-persistent CSI report on the PUCCH to which starting from the slot $n+3N^{subframe\mu}_{slot}+1$ has been applied. The select command may include one or multiple CSI report settings with the associated CSI resource setting configured. The semi-persistent CSI report on the PUCCH may support the type I CSI. The semi-persistent CSI report on the PUCCH format 2 may support the type I CSI with wideband frequency granularity. The semi-persistent CSI report on the PUCCH format 3 or 4 may support type I CSI and type II CSI part 1 with wideband and subband frequency granularity.

In a case that the PUCCH carries the type I CSI with the wideband frequency granularity, the CSI payload carried in the PUCCH format 2 and PUCCH format 3 or 4 may be identified and may be the same regardless of RI and CRI. For the type I CSI subband report in the PUCCH format 3 or 4, the payload may be separated into two parts. The first part may include RI, CRI, and/or CQI for the first codeword. The second part may include CQI for the second codeword in a case that PMI is included and a value of RI is greater than 4.

Although the semi-persistent report carried in the PUCCH format 3 or 4 supports type II CSI feedback, it may support only Part 1 of the type II CSI feedback. Supporting the type II CSI report in the PUCCH format 3 or 4 may be determined based on capability information of the terminal apparatus 1. The type II CSI report carried in the PUCCH format 3 or 4 may be calculated independently of any of one or multiple type II CSI reports carried on the PUSCH.

In a case that the terminal apparatus 1 is configured with CSI report in the PUCCH format 2, 3, or 4, each PUCCH resource may be configured for each candidate UL BWP.

In a case that the terminal apparatus 1 is configured with the active semi-persistent CSI report configuration on the PUCCH and does not receive a deactivation command, the CSI report may be performed in a case that the BWP configured to perform the reporting is an active BWP, otherwise, the CSI report may be postponed.

The terminal apparatus 1 may not be expected to report CSI with a payload size greater than 115 bits in a case that the PUCCH format 4 is configured. In a case that all of the CSI reports are constituted by one part for one or multiple CSI reports transmitted on the PUCCH, the terminal apparatus 1 may exclude a portion of one or multiple CSI reports. Exclusion of the CSI may be determined based on a prescribed priority rule. The CSI report may continue to exclude lower priority CSI until the CSI report code rate reaches a value equal to or lower than the threshold configured by the higher layer parameter maxCodeRate.

In a case that any of the one or multiple CSI reports is constituted of two parts, the terminal apparatus 1 may exclude a part of the part 2 CSI. Exclusion of the part 2 CSI may be performed as in FIG. 13. Furthermore, the part 2 CSI may continue to exclude lower priority CSI until the part 2 CSI code rate is a value equal to or lower than the threshold configured by the higher layer parameter maxCodeRate.

In a case that the semi-persistent CSI report carried on the PUSCH overlaps with the PUSCH data transmission at one or multiple symbols at the same time and the earliest symbol of these PUSCH channels is not earlier than $N_2+d_2$ (that is, a prescribed timing or a prescribed time interval) after the last symbol of DCI for scheduling the PUSCH, the CSI report may not be transmitted. Otherwise, the timeline request condition is not met and may thus be determined to be an error case.

In a case that the terminal apparatus 1 transmits the second PUSCH including the first PUSCH including one or multiple semi-persistent CSI reports and UL-SCH, and the first PUSCH transmission overlaps second PUSCH transmission, the terminal apparatus 1 may transmit the second PUSCH without transmitting the first PUSCH. In a case that at least one of the first PUSCH transmission or the second PUSCH transmission is related to DCI format detection by the terminal apparatus 1, the terminal apparatus 1 may expect that the first PUSCH transmission and the second PUSCH transmission satisfy the above-described time conditions for the overlapping PUSCH transmission.

The CSI report procedure described above may be applied in a case that a size of an LBT subband is equal to a size of a BWP in the NR-U cell.

In a case that a size of one LBT subband is a value (the number of PRBs or a bandwidth) that is equal to or larger than a BWP size in a serving cell, and in a case that a BWP is included in the LBT subband in the frequency domain, that is, in a case that a BWP is present in the LBT subband, and in a case that CSI-RS is indicated as being punctured in the LBT subband, the terminal apparatus 1 may not update CSI in the BWP, or may not transmit CSI for the subband that is not updated and/or in which CSI-RS is not able to be measured (or is not measured) as a CSI report.

Here, in the LBT subband, the CSI-RS being puctured may be not transmitting the CSI-RS in the frequency domain of a certain LBT subband. For example, before the base station apparatus 3 transmits SSB and/or PDCCH and/or PDSCH and/or CSI-RS, the base station apparatus 3 may not transmit any downlink signal including CSI-RS in each LBT subband in which the CAP is performed and the channels are not evaluated as being clear in each LBT subband. In other words, the base station apparatus 3 may transmit any downlink signal including the CSI-RS in the LBT subband in which it is determined that channels are clear. Similarly, the terminal apparatus 1 may transmit any uplink signal in the LBT subband in which it is determined that channels are clear. The terminal apparatus 1 may transmit any uplink signal in the LBT subband in which it is determined that channels are not clear.

The base station apparatus 3 may not expect that a corresponding CSI report is transmitted from the terminal apparatus 1 in an LBT subband indicating that the CSI-RS is punctured.

In a case that the frequency domain of some of BWPs is included in the LBT subband, that is, in a case that the frequency domain of the BWPs partially overlap the frequency domain of the LBT subband, and/or in a case that one BWP overlaps multiple LBT subbands and in a case that cqi-FormatIndicator of CSI-ReportConfig for the BWP indicates wideband CQI in the frequency domain, in a case that the CSI-RS is indicated to be punctured in at least one LBT subband among multiple LBT subbands, the terminal apparatus 1 may not update the CQI for the BWP or may not transmit CSI including the wideband CQI that has not been updated as a CSI report. In addition, in this case, in a case that the cqi-FormatIndicator indicates the subband CQI, the terminal apparatus 1 may not update the subband CQI for each of one or multiple subbands overlapping with one or multiple LBT subbands in which the CSI-RS is punctured, or may transmit CSI excluding one or multiple subband CQIs that have not been updated, and/or failed to measure the CSI-RS as a CSI report. In other words, the terminal apparatus 1 may calculate and update the subband CQI for each of one or multiple subbands overlapping one or multiple LBT subbands in which the CSI-RS is not punctured, may transmit the CSI including updated one or multiple subband CQIs as a CSI report, or may not transmit one or multiple subband CQIs that have not been updated, and/or failed to measure (did not measure) the CSI-RS.

In a case that the frequency domain of some of BWPs is included in the LBT subband, that is, in a case that the frequency domain of the BWPs partially overlap the frequency domain of the LBT subband, and/or in a case that one BWP overlaps multiple LBT subbands and in a case that pmi-FormatIndicator of CSI-ReportConfig for the BWP indicates wideband PMI in the frequency domain, in a case that the CSI-RS is indicated to be punctured in at least one LBT subband among multiple LBT subbands, the terminal apparatus 1 may not update the PMI for the BWP or may not transmit CSI including the wideband PMI that has not been updated as a CSI report. In addition, in this case, in a case that the pmi-FormatIndicator indicates the subband PMI, the terminal apparatus 1 may not update the subband PMI for each of one or multiple subbands overlapping the LBT subband in which the CSI-RS is punctured, or may transmit CSI excluding the subband PMI that has not been updated as a CSI report. In other words, the terminal apparatus 1 may calculate and update the subband PMI for each of one or multiple subbands overlapping one or multiple LBT subbands in which the CSI-RS is not punctured, may transmit the CSI including the updated one or multiple subband PMIs as a CSI report, or may not transmit one or multiple subband PMIs that have not been updated, and/or failed to measure (did not measure) the CSI-RS.

The LBT subband may be configured to indicate a frequency domain (i.e., a channel, an NR-U carrier, an NR-U BWP) for which the terminal apparatus 1 and/or the base station apparatus 3 performs LBT (i.e., CCA and/or CAP) and determines whether the channel is clear. For example, a size of the frequency domain of the LBT subband may be 20 MHz (i.e., a prescribed value), may be the number of PRBs corresponding to 20 MHz (i.e., a prescribed value), or may be configured as a higher layer parameter. A start RB and a bandwidth (the number of PRBs) indicating a starting position of the frequency domain used to define the LBT subband may be configured as higher layer parameters. In a case that at least one LBT subband is configured and the uplink transmission and the downlink transmission are performed in the same operating band, the frequency domain and the time domain of the LBT subband may be a common and/or common configuration and/or common recognition among the terminal apparatus 1 and the base station apparatus 3. Further, the LBT subband may be referred to as an LBT carrier (CCA carrier or CAP carrier), an LBT band (CCA bands or CAP band), or an LBT-BWP (CCA-BWP or CAP-BWP). In a case that the capability of the base station apparatus 3 and/or the terminal apparatus 1 to perform LBT using one or multiple LBT subbands is supported, one or multiple LBT subbands may be configured for one NR-U cell (or one NR-U operating band) based on the capability information.

A subband and a wideband used for the CSI measurement including the CQI measurement and/or the PMI measurement (i.e., the CSI measurement for performing the CQI calculation and/or the PMI calculation) may be referred to as a CSI subband and a CSI wideband. Similarly, a subband and a wideband used in the CQI measurement may be referred to as a CQI subband and a CQI wideband. A subband and a wideband used in the PMI measurement may be referred to as a PMI subband and a PMI wideband. In addition, the CSI subband/wideband may be a generic term for a case in which any one or both the CQI subband/wideband and the PMI subband/wideband are included. Further, a bandwidth (the number of PRBs) of the CSI wideband may be the same value as the bandwidth configured for the CSI report band. Alternatively, the CSI report band may be constituted by one or multiple CSI subbands.

Figure 14:
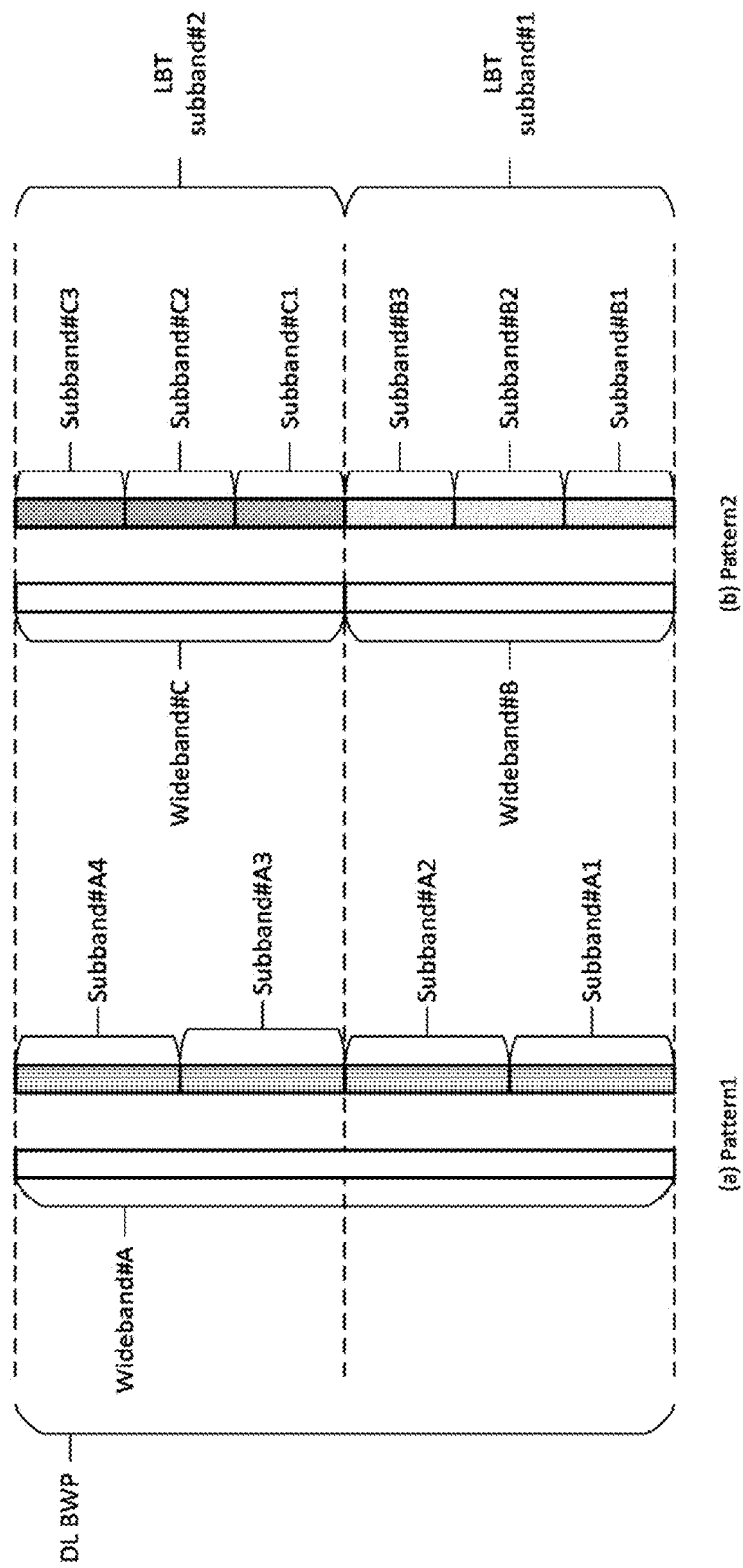
FIG. 14 is a diagram illustrating an example of a mapping pattern of CSI widebands and CSI subbands according to an aspect of the present embodiment.

FIG. 14 is a diagram illustrating an example of a mapping pattern of CSI widebands and CSI subbands according to an aspect of the present embodiment. FIG. 14(a) illustrates an example in which the start RB and the bandwidth of the DL BWP and the CSI wideband overlap. FIG. 14(b) illustrates an example in which the start RB and the bandwidth of each LBT subband and each CSI wideband overlap.

For example, a case in which the terminal apparatus 1 and the base station apparatus 3 can be indicated in the DCI format 2_0 that COT can be acquired for each of LBT subband #1 and LBT subband #2 (i.e., in a case that such a capability is supported) and a case in which it is indicated that a COT can be acquired in both the LBT subband #1 and the LBT subband #2 will be described. In FIG. 14(a), in accordance with one or multiple CSI-ReportConfigs configured in the terminal apparatus 1, the terminal apparatus 1 can update and report the value of each wideband CQI and/or wideband PMI for a wideband #A and can update and report the value of each subband CQI and/or subband PMI for a subband #A1 to a subband #A4. Further, in a case that the priority rule of the CSI report is applied, the priority of wideband CSI (CQI/PMI) with respect to the wideband #A is the highest, and the priority may become lower in order from the subband #A1. In addition, in FIG. 14(b), in accordance with one or multiple CSI-ReportConfigs configured in the terminal apparatus 1, the terminal apparatus 1 can update and report the value of the wideband CQI and/or wideband PMI for each of a wideband #B and/or a wideband #C and can update and report the value of each subband CQI and subband PMI for a subband #B1 to a subband #B3 and a subband #c1 to a subband #C3. Further, in a case that the priority rule of the CSI report is applied, the priority of the wideband CSI (CQI/PMI) for a wideband #B and/or a wideband #C may be the highest and priorities may become lower in order from the subband #B1 to the subband #C3 therefrom, and priorities of subbands may become lower in order of the subband #B1, the subband #C1, the subband #B2, the subband #C2, and the subband #C3. In this case, the terminal apparatus 1 may report the CSI of CSI-ReportConfig associated even in a case that the cqi-FormatIndicator is wideband CQI or subband CQI, or pmi-FormatIndicator is wideband PMI or subband PMI. The base station apparatus 3 may assume the type and number of CSIs to be reported and the number of bits for a CSI, based on the DCI format 2_0.

In a case that the channel is determined to be clear in the LBT subband and the LBT is considered to be successful, the base station apparatus 3 and/or the terminal apparatus 1 may transmit the physical signal/physical channel in the LBT subband. Further, due to the successful LBT, the base station apparatus 3 and/or the terminal apparatus 1 may determine that the COT has been acquired.

Next, in FIG. 14, a case in which only one of the two LBT subbands acquires a COT in the DCI format 2_0, for example, a case in which a COT can be acquired in an LBT subband #1, but a COT cannot be acquired in an LBT subband #2 will be described. In FIG. 14(a), the terminal apparatus 1 may not update or report the value of each wideband CQI and/or wideband PMI for the wideband #A according to one or multiple CSI-ReportConfigs configured in the terminal apparatus 1. In addition, the terminal apparatus 1 may update and report the value of the subband CQI and/or subband PMI for each of the subband #A1 and/or subband #A2. In addition, the terminal apparatus 1 may not update or report the value of the subband CQI and subband PMI for each of the subband #A3 and subband #A4. In FIG. 14(a), the wideband CQI may be calculated excluding the mapped CSI-RS of the LBT subband #2. In FIG. 14(b), the terminal apparatus 1 may update and report the value of each wideband CQI and wideband PMI for the wideband #B according to one or multiple CSI-ReportConfigs configured in the terminal apparatus 1. The terminal apparatus 1 may not update or report the value of each wideband CQI and/or wideband PMI for the wideband #C. The terminal apparatus 1 may update and report the value of the subband CQI and/or subband PMI for each of the subband #B1 to the subband #B3. The terminal apparatus 1 may not update or report the value of the subband CQI and/or subband PMI for each of the subband #C1 to the subband #C3.

In the case of FIG. 14(b), the CSI report band can be configured for each LBT subband, and thus, the maximum number of configurations and/or higher layer parameters associated with CSI report, such as the number of CSI-RS resources (NZP CSI-RS resources and/or CSI-IM resources), and/or the number of CSI-RS resources for each resource set, and/or the number of CSI-RS resource sets, and/or the number of CSI resource configurations, the number of CSI-ReportConfigs that can be configured for one BWP, may be expanded.

In the case of FIG. 14(a) and/or FIG. 14(b), an ID for identifying an LBT subband (e.g., an LBT subband ID) may be configured as a higher layer parameter. In particular, in the case of FIG. 14(b), CSI-ReportConfig may include an LBT subband ID. The base station apparatus 3 may enable the reporting of wideband CSI and/or subband CSI to be triggered for each LBT subband.

In the interference measurement, in a case that the CSI-IM resource is configurable individually for each LBT subband as illustrated in FIG. 14(b), and in a case that an acquisition state of a COT for each LBT subband is indicated, the terminal apparatus 1 performs interference measurement in the LBT subband in which the COT has been acquired and can report the result.

Although FIG. 14 describes a case in which two LBT subbands are configured for one BWP, the same applies even in a case that the number of LBT subbands configured to one BWP is more than two.

In FIG. 14, a guard band may be configured between the LBT subband #1 and the LBT subband #2. In such a case, in the CSI report band including the guard band, the wideband CQI and wideband PMI, and the subband CQI and subband PMI may be calculated considering that the CSI-RS is mapped to the guard band.

Further, in a case that the wideband CQI and/or wideband PMI have not been updated, the associated RI and/or CRI may not be updated, and the associated RI and/or CRI may not be reported.

In a case that multiple LBT subbands are configured for one BWP, one or multiple NZP-CSI-RS-Resource and/or one or multiple csi-IM-Resource may be configured, or one or multiple CSI-ReportConfigs may be configured for each LBT subband. In other words, for each LBT subband, one or multiple CSI-RS resources may be configured so that the wideband CQI/PMI and the subband CQI/PMI can be calculated, or one or multiple CSI-ReportConfigs may be configured.

Further, the start RB and the bandwidth of the BWP and/or the carrier and/or the serving cell and the start RB and the bandwidth of each CSI report band may not match. In other words, the start RB and the bandwidth of the BWP and/or the carrier and/or the serving cell and the start RB and the bandwidth of each CSI report band may be configured individually.

Figure 15:
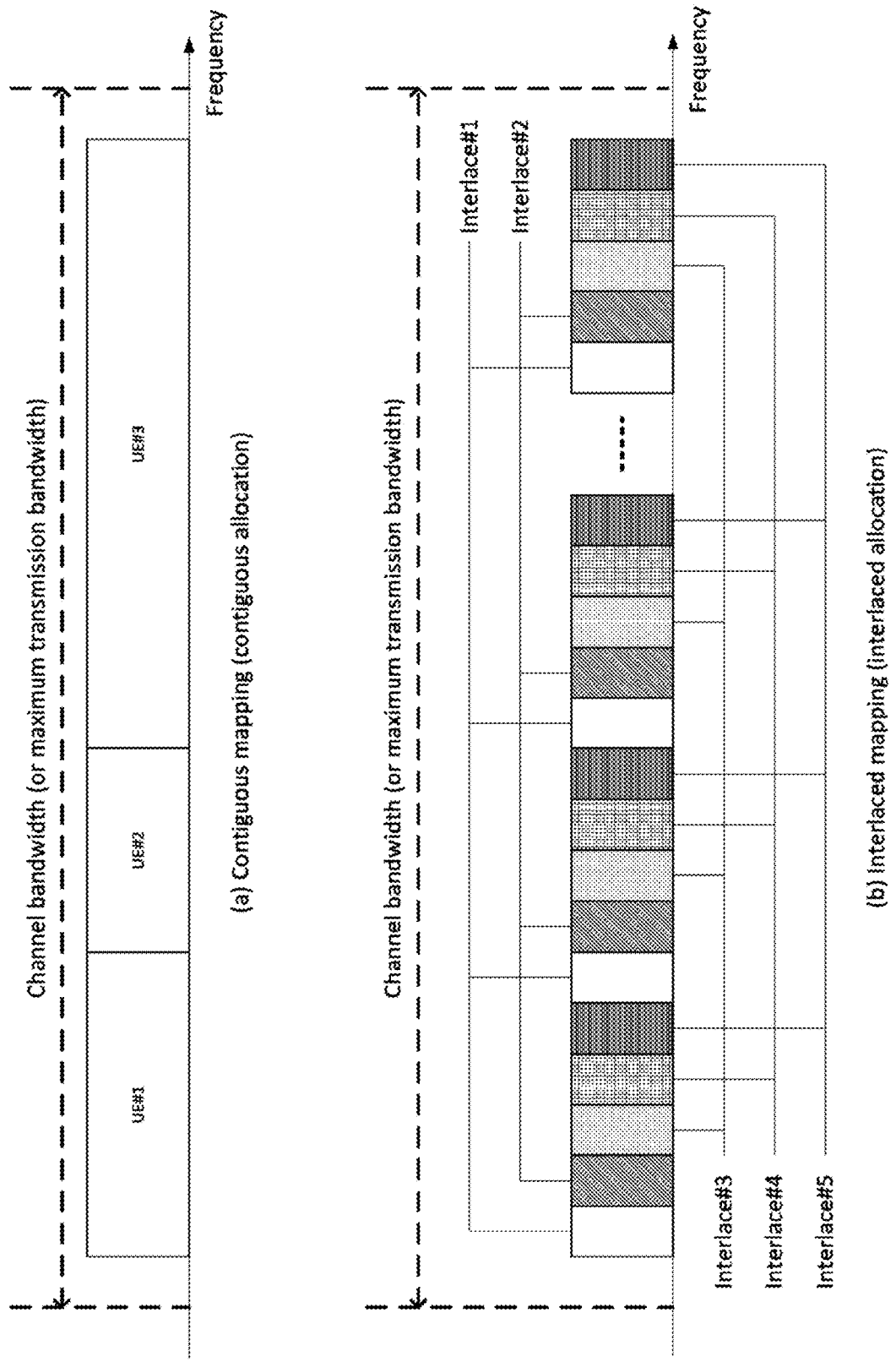
FIG. 15 is a diagram illustrating an example of frequency mapping (resource assignment, mapping to physical resources) according to the present embodiment.

FIG. 15 is a diagram illustrating an example of frequency mapping (resource assignment, mapping to physical resources) according to the present embodiment. FIG. 15(a) is an example in which multiple PRBs are continuously disposed (contiguous mapping or localized mapping) with respect to one terminal apparatus 1 and/or base station apparatus 3. The frequency mapping in FIG. 15(a) may be used to realize low PAPR (peak-to-average power ratio) characteristics by a single carrier, for example, a DFT-s-OFDM signal. FIG. 15(b) is an example in which multiple PRBs are continuously disposed at equal or non-equal intervals (interlaced mapping or distributed mapping) with respect to one terminal apparatus 1 and/or base station apparatus 3. The frequency mapping in FIG. 15(b) may be used to realize 80% or more of the transmission bandwidth (maximum transmission bandwidth, channel bandwidth, carrier bandwidth, or BWP bandwidth) with a small number of PRBs in the frequency domain. In other words, the frequency mapping in FIG. 15(b) may be performed to satisfy an occupied channel bandwidth (OCB) requirement. In addition, the number of interlaces may be determined according to the SCS. For example, in a case that the SCS is 15 kHz, the number of interlaces may be 10 or 11. Furthermore, in a case that the SCS is 30 kHz, the number of interlaces may be 5 or 6. The number of interlaces may be the maximum multiplexing order of the terminal apparatus 1 in the frequency domain. The number of interlaces may be the same, regardless of the magnitude of a frequency bandwidth. For example, even in a case that a frequency bandwidth is 20 MHz or 40 MHz and in a case that the SCS is 15 kHz, the number of interlaces may be 10 or 11. Further, the base station apparatus 3 and/or the terminal apparatus 1 may transmit a physical channel and/or a physical signal using one or multiple interlaces.

Figure 16:
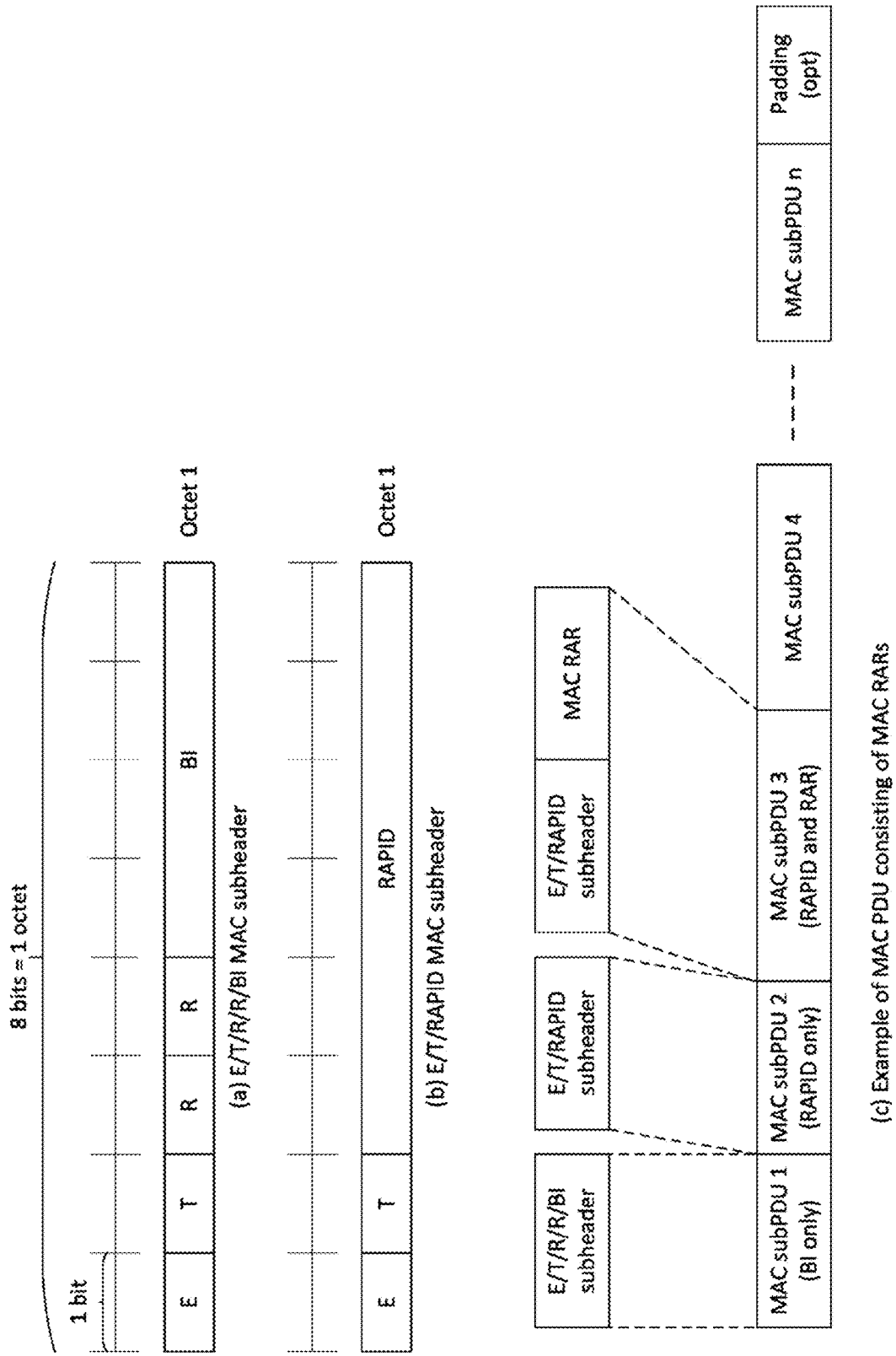
FIG. 16 is a diagram illustrating an example of a configuration of MAC subheaders and a MAC PDU according to the present embodiment.

FIG. 16 is a diagram illustrating an example of configurations of MAC subheaders and a MAC PDU according to the present embodiment. FIG. 16(a) illustrates an example of a configuration of a MAC subheader with a backoff indicator (BI). The MAC subheader with a BI may be constituted by five header fields of E/T/R/R/BI. FIG. 16(b) illustrates an example of a configuration of a MAC subheader with a random access preamble identifier (RAPID). The MAC subheader with the RAPID may be constituted by three header fields of E/T/RAPID. FIG. 16(c) illustrates an example of a configuration of a MAC PDU. The MAC PDU may be constituted by one or multiple MAC subPDUs, and may optionally include padding. Each MAC subPDU may be constituted of one of a MAC subheader with only a BI, a MAC subheader with only a RAPID, and a MAC subheader with a RAPID and a MAC random access response (RAR). Here, in a case that the MAC PDU includes a MAC subPDU with only a BI, the MAC subPDU with only the BI may be placed at the beginning of the MAC PDU. Each of the MAC subPDU with only a RAPID and the MAC subPDU with a RAPID and a MAC RAR may be placed between the MAC subPDU with only a BI and the padding in a case that the MAC subPDU and/or padding with only a BI are in the MAC PDU. In a case that the MAC subPDU with only a BI and the padding are not in the MAC PDU, each MAC subPDU with a RAPID and a MAC RAR may be freely placed. Further, in a case that the padding is in the MAC PDU, the padding may be placed at the end in the MAC PDU. The presence and length of the padding may be determined implicitly based on a TB size and a size of one or multiple MAC subPDUs.

The Extension (E) field may be a flag indicating whether a MAC subPDU including a MAC subheader configured to include at least the E field is the last MAC subPDU in the MAC PDU. For example, a value in the E field may be set to "1" to indicate that at least another MAC subPDU continues. In order to indicate that the MAC subPDU including the MAC subheader is the last MAC subPDU in the MAC PDU, the value of the E field may be set to "0".

The Type (T) field may be a flag indicating whether the MAC subheader includes a RAPID or BI. The value of the T field may be set to "0" to indicate the presence of the BI field in the subheader. The value of the T field may be set to "1" to indicate the presence of the RAPID field in the subheader. In other words, whether the MAC subPDU is constituted by the MAC subheader illustrated in FIG. 16(a) or the MAC subheader illustrated in FIG. 16(b) may be determined based on the value of the T field. Further, the MAC subPDU 3 in FIG. 16(c) describes an example in which a RAPID and an RAR (MAC RAR) are included. In other words, an example in which the value of the T field is set to "1" is described.

The Reserved (R) field is a reserved (R) bit and may be set to "0". Further, in the present embodiment, the R bit may be set to "0".

The BI field is used to identify an overload state in a cell. A size of the BI field may be four bits. The values set in the BI field may be used to calculate a backoff time. For example, the backoff time may be determined using a random number from zero to the value corresponding to the BI field. That is, the backoff time may be determined based on the value of the BI field. The BI field may be used to indicate a parameter related to the backoff time (a backoff parameter value or BPV). The BI field may be used to indicate an index corresponding to the BPV (e.g., 5 ms, 120 ms, 1920 ms, etc.).

The RAPID field may be used to identify the transmitted random access preamble (PRACH and Msg1). The RAPID may be 6 bits. In a case that the RAPID in the MAC subheader of the MAC subPDU corresponds to one of the random access preambles configured for an SI request, the MAC RAR may not be included in the MAC subPDU. In other words, in FIG. 16(c), the RAPID corresponds to the MAC subPDU with only the RAPID (MAC subPDU 2). In a case that the RAPID in the MAC subheader of the MAC subPDU does not correspond to the random access preamble configured for an SI request, the MAC RAR may be included in the MAC subPDU.

The MAC subheader (a size of the MAC subheader) may be adjusted in octet units. 1 octet may have 8 bits. In other words, the size of the MAC subheader and/or MAC PDU may be adjusted in units of 8 bits.

Figure 17:
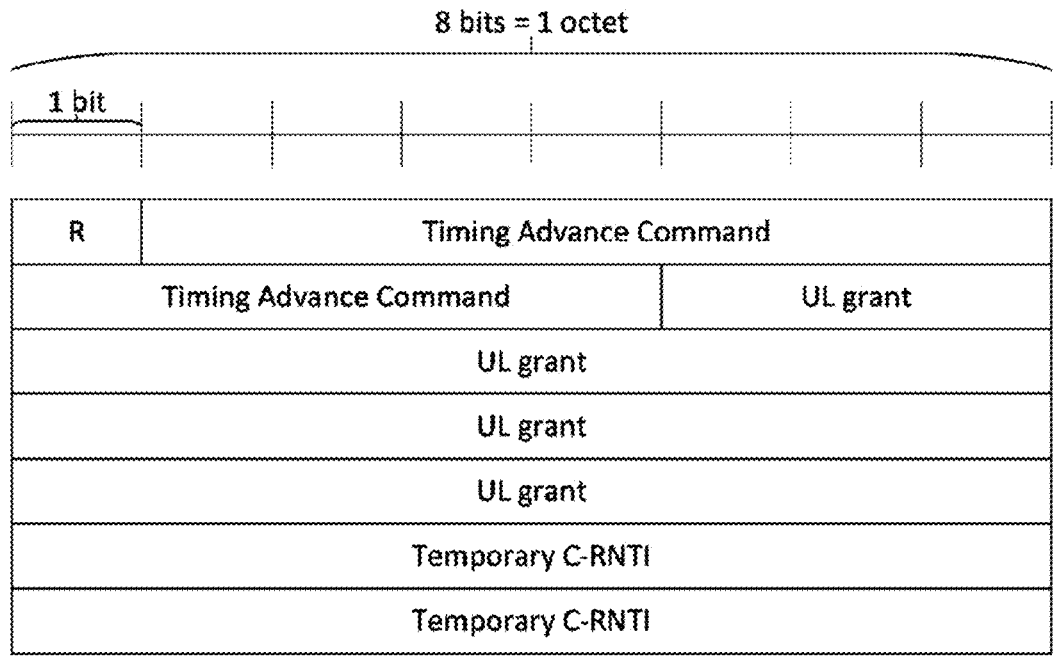
FIG. 17 is a diagram illustrating an example of a configuration of MAC RAR and RAR grant fields for NR according to the present embodiment.

FIG. 17 is a diagram illustrating an example of a configuration of a MAC RAR and RAR grant fields for NR according to the present embodiment. FIG. 17(a) illustrates an example of a configuration of the MAC RAR for NR (NR cell). FIG. 17(b) illustrates an example of a configuration of fields in an RAR grant corresponding to a UL grant in the MAC RAR of FIG. 17(a). The MAC RAR may be referred to as an Msg2.

In the present embodiment, "for NR" may mean corresponding to at least one of an NR cell (a carrier, a BWP, or a channel), an NR terminal apparatus, and an NR base station apparatus. Similarly, "for NR-U" may mean corresponding to at least one of an NR-U cell (a carrier, a BWP, or a channel), an NR-U terminal apparatus, and an NR-U base station apparatus.

In the MAC RAR of FIG. 17(a), the size of the timing advance command (TAC) field may be 12 bits, the size of the uplink (UL) grant field may be 27 bits, and the size of the temporary C-RNTI (TC-RNTI) field may be 16 bits.

The TAC field is used to indicate the index value TA used to control the amount of timing adjustment applied by the MAC entity. In other words, the TAC field may be used to adjust the transmission timing of the terminal apparatus 1.

The UL grant field is used to indicate a resource used in uplink. The UL grant included in the MAC RAR may be used as the RAR grant illustrated in FIG. 17(b).

In the present embodiment, the UL grant included in the MAC RAR may be synonymous with the RAR grant.

The TC-RNTI field may be used to indicate a temporary identifier used by the MAC entity during random access.

FIG. 17(b) illustrates an example of various fields included in the RAR grant for NR. The RAR grant may be used to schedule a Msg3 PUSCH in the random access procedure of NR. Further, the total number of bits used in the RAR grant field at this time may be 27 bits.

The frequency hopping flag (FHF) field in FIG. 17(b) is a field indicating whether frequency hopping is applied to a scheduled PUSCH.

The PUSCH frequency resource allocation (PFRA) field in FIG. 17(b) is a field used to indicate the starting position and the number of resource blocks (or the end position) in the frequency domain of the PUSCH.

Further, the number of bits in the PFRA field may be determined based on the maximum number of PRBs used for uplink transmission (transmission of the PUSCH). For example, in a case that the bandwidth is 20 MHz and the SCS is 15 kHz, the maximum number of PRBs used for uplink transmission may be 104 PRBs, and the number of bits in the PFRA field may be 14 bits. That is, the number of bits in the PFRA field may be determined based on the maximum bandwidth for the uplink, the SCS, and the maximum number of PRBs based on the maximum bandwidth and SCS. Each of the maximum bandwidth and/or SCS may be determined based on a higher layer parameter.

The PUSCH time resource allocation (PTRA) field in FIG. 17(b) is a field used to indicate allocation of the time domain of a scheduled PUSCH.

The MCS field in FIG. 17(b) is a field used to indicate the value of MCS to be applied to the scheduled PUSCH.

The TPC command field for the PUSCH in FIG. 17(b) is the field used to dynamically adjust the transmission power of the scheduled PUSCH.

The CSI request field in FIG. 17(b) is, for example, a field used to request transmission of CSI on the scheduled PUSCH. The CSI request field may be reserved as a reserved (R) bit in the CBRA procedure. The CSI request field may be set to the RAR grant in the CFRA procedure.

The configurations of the MAC RAR and RAR grant illustrated in FIG. 17 may also be applied in the NR-U. Whether the MAC RAR and the RAR grant are applied may be determined based on a higher layer parameter.

Figure 18:
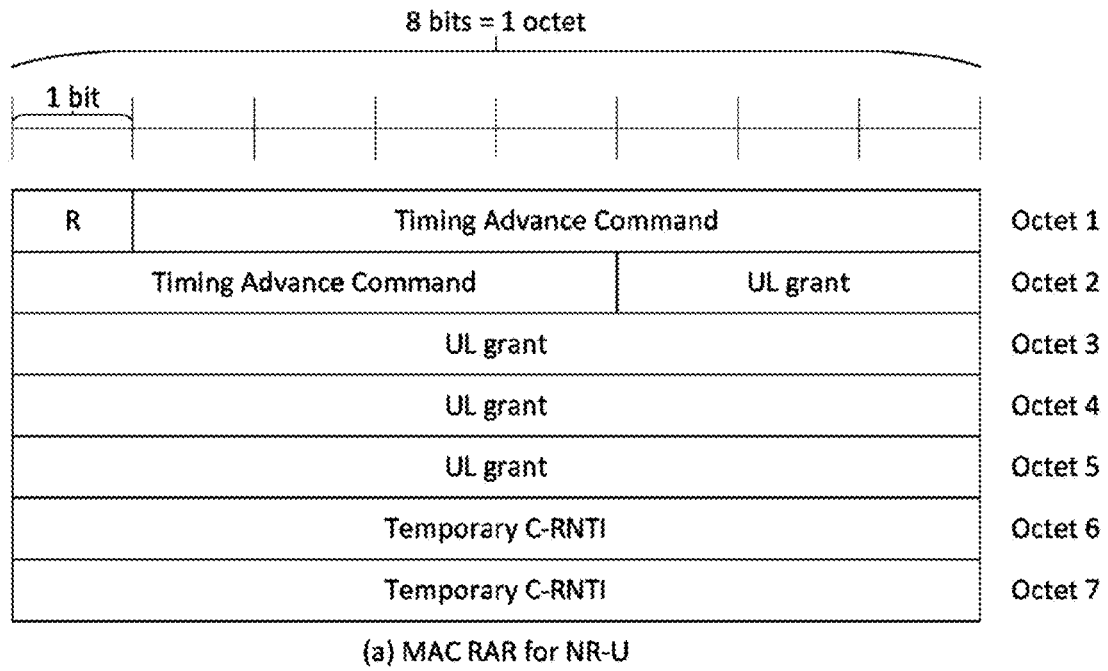
FIG. 18 is a diagram illustrating an example of a configuration of MAC RAR and RAR grant fields for NR-U (example 1) according to the present embodiment.

FIG. 18 is a diagram illustrating an example (example 1) of a configuration of a MAC RAR and RAR grant fields for NR-U according to the present embodiment. FIG. 18(a) illustrates a configuration of a MAC RAR and a MAC payload for NR-U (NR-U cell). FIG. 18(b) illustrates an example of a configuration of fields of an RAR grant corresponding to a UL grant in the MAC RAR of FIG. 18(a).

FIG. 18(a) illustrates the same configuration as that in FIG. 17(a), and the MAC RAR may be constituted by 56 bits (i.e., 7 octets).

FIG. 18(b) illustrates an example of various fields constituting the RAR grant in a case in which the number of bits for the UL grant in the MAC RAR (RAR grant) is equal to that of NR. In a case that interlaced allocation is applied to the frequency domain resource allocation of the PUSCH scheduled by the RAR grant, frequency characteristics can be sufficiently obtained without performing frequency hopping. Thus, the FHF field may not be set to the RAR grant for the NR-U. Here, whether the FHF field is set to the RAR grant may be determined based on a higher layer parameter.

In addition, in a case that the interlaced allocation is applied to the frequency domain resource allocation of the PUSCH scheduled by the RAR grant and the bandwidth is a prescribed value, the number of bits (e.g., up to 10 bits) of the PFRA field included in the RAR grant for the NR-U may be less than the number of bits (e.g., up to 14 bits) of the PFRA field included in the RAR grant for NR. In a case that an interlaced allocation is applied to the frequency domain resource allocation of the PUSCH scheduled by the RAR grant and the bandwidth is 20 MHz and the SCS is 15 kHz, the number of bits in the PFRA field included in the RAR grant for the NR-U may be reduced from 14 bits to 10 bits, which is the number of bits in the PFRA field included in the RAR grant for NR. In other words, in a case that an interlaced allocation is applied to the frequency domain resource allocation of the PUSCH scheduled by the RAR grant and the bandwidth is 20 MHz and the SCS is 15 kHz, the number of bits required for the PFRA field may be reduced from 14 bits at maximum to 10 bits at maximum. Further, the excess 4 bits may be secured in the UL grant (RAR grant) as an R bit, or may be used in one or multiple fields for scheduling the Msg3 PUSCH for the NR-U.

In the NR-U, a field indicating a transmission starting position on the PUSCH in the RAR grant (PUSCH starting position field or PSP field) may be set in order to ensure a period in which LBT is performed before the Msg3 PUSCH is transmitted. Details will be described below.

In the NR-U, the channel access type field may be set (added) to the RAR grant. Further, the channel access type field is a field indicating the type 1 CAP or type 2 CAP, and may be constituted by one bit.

In the NR-U, the CAPC field may be set to the RAR grant. The CAPC field may be constituted by two bits. The terminal apparatus 1 may be configured with a priority of the PUSCH (Msg3 PUSCH) scheduled using the RAR grant based on the value of the CAPC. The priority of the PUSCH may be used to determine the value of a CWS used in the type 1 CAP. The value of the CWS used in the type 1 CAP may be determined based on the value of the CAPC field. However, in a case that the value of the CAPC to be applied to the PUSCH scheduled by the RAR grant is a prescribed value, the CAPC field may not be set to the RAR grant. Here, the prescribed value may be determined beforehand in a specification, or the like. Here, the prescribed value may be determined based on a higher layer parameter.

In FIG. 18, various fields of the RAR grant (UL grant included in the MAC RAR) corresponding to the NR-U may be configured by adjusting the type (number) and size (number of bits) of various fields constituting the RAR grant without changing the configuration of the MAC RAR.

Figure 19:
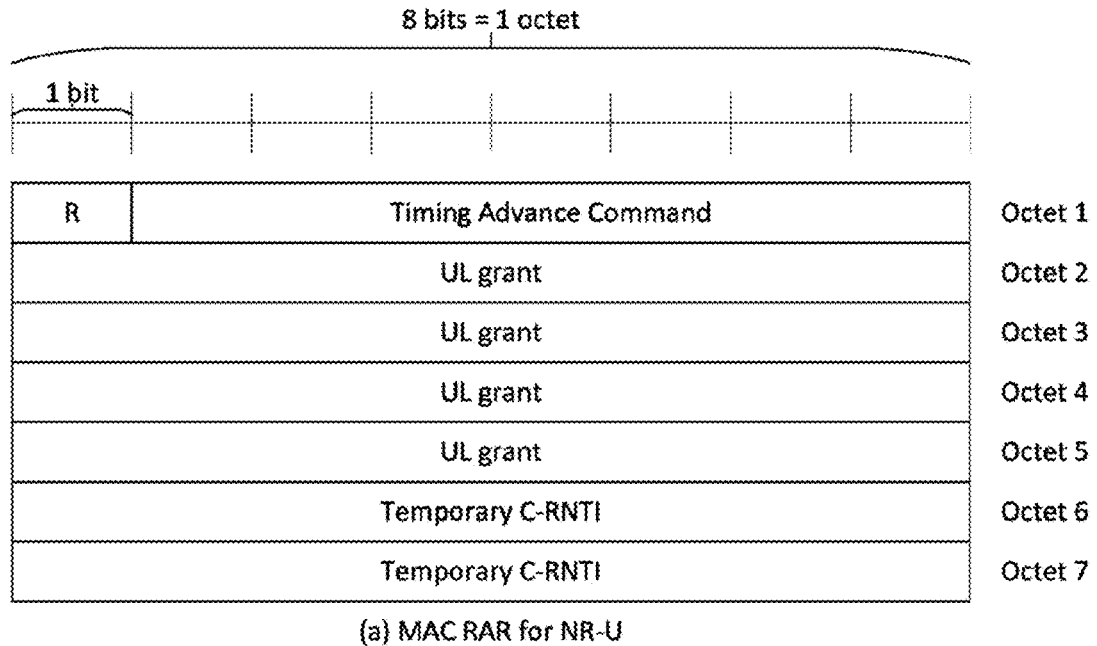
FIG. 19 is a diagram illustrating another example of the configuration of MAC RAR and RAR grant fields for NR-U (example 2) according to the present embodiment.

FIG. 19 is a diagram illustrating another example (example 2) of the configuration of the MAC RAR and RAR grant fields for the NR-U according to the present embodiment. FIG. 19(a) illustrates a configuration of a MAC RAR and a MAC payload for the NR-U. FIG. 19(b) illustrates an example of a configuration of fields of an RAR grant corresponding to a UL grant in the MAC RAR of FIG. 19(a).

Because FIG. 19(a) is based on the assumption that the cell coverage of the NR-U is small compared to that of NR, it is a MAC RAR that is applied in a case that a TA value is assumed to be smaller compared to that of NR. Because the coverage of the TA value becomes narrower, the number of bits constituting the TAC field may also be reduced compared to that of NR. The range of values that the TAC field included in the MAC RAR can indicate may also be narrower compared to that of NR. The TAC field of FIG. 19(a) may be constituted by, for example, of 7 bits rather than 12 bits. In other words, the number of bits of the TAC field included in the MAC RAR for the NR-U may be less than the number of bits of the TAC field included in the MAC RAR for the NR.

The UL grant included in the MAC RAR may be configured using reduced bits of the TAC field, thereby expanding the size of the UL grant.

FIG. 19(b) illustrates an example of a field constituting an expanded UL grant (RAR grant). The size of the FHF field or the PFRA field may be the same as that of the NR. That is, the same allocation as that of the NR may be applied to the resource allocation of the frequency domain of the PUSCH scheduled by the RAR grant. Moreover, even in a case that the CAT field, a CAPC field, or the like necessary for communication of the NR-U is added, the size of the MAC RAR used for the NR-U (the total number of bits and/or the number of octets) can be the same size as that of the NR.

Figure 20:
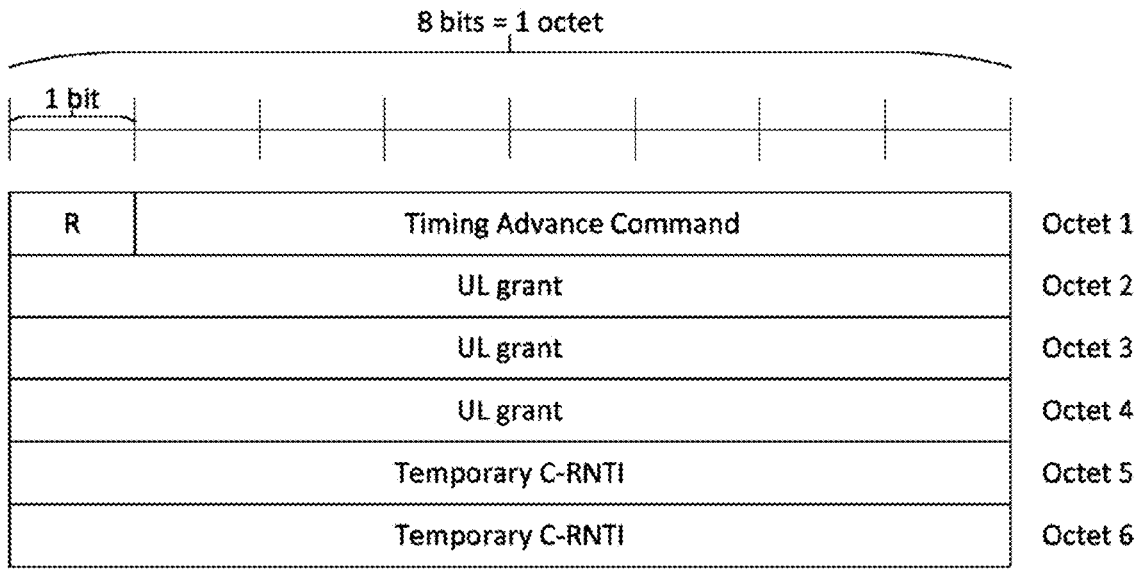
FIG. 20 is a diagram illustrating another example of a configuration of MAC RAR and RAR grant fields for NR-U (example 3) according to the present embodiment.

FIG. 20 is a diagram illustrating another example (example 3) of the configuration of the MAC RAR and RAR grant fields for the NR-U according to the present embodiment. FIG. 20(a) illustrates a configuration of a MAC RAR and a MAC payload for the NR-U. FIG. 20(b) illustrates an example of a configuration of fields of an RAR grant corresponding to a UL grant in the MAC RAR of FIG. 20(a).

FIG. 20 aims to reduce the size of the MAC RAR. By reducing the size of the MAC RAR, the power required for transmission of the MAC RAR can be lowered in accordance with the cell coverage.

In FIG. 20(a), the size of the TAC field included in the MAC RAR may be 7 bits, the size of the UL grant may be 3 octets (24 bits), and the TC-RNTI may be constituted by 2 octets (16 bits).

FIG. 20(b) illustrates an example of various fields and the number of bits constituting the RAR grant in a case that a size of the UL grant (RAR grant) included in the MAC RAR is 3 octets. It is assumed that only interlaced allocation is supported as the frequency domain resource allocation of the PUSCH. Thus, the FHF field may not be set to the RAR grant. In a case that the size of the PFRA field is supported only by the interlaced allocation, the maximum multiplexing order of the terminal apparatus 1 in the frequency domain can be set to 10 in a case that a bandwidth is 20 MHz and the SCS is 15 kHz. In a case that the number of bits in the PFRA field is configured with the bitmap with the maximum multiplexing order, the size of the PFRA field for the NR-U may be a size (e.g., up to 10 bits) of the bitmap with the maximum multiplexing order in the frequency domain in the NR-U rather than the number of bits (e.g., up to 14 bits) in the PFRA field for the NR. In such a case, the size of the PFRA field for the NR-U may be less than the size of the PFRA field for the NR (e.g., up to 14 bits). In other words, the size of the PFRA field included in the RAR grant for the NR-U may be determined based on the size of the bitmap required for the maximum multiplexing order of the terminal apparatus 1 in a case that the interlaced allocation is applied. In addition, in a case that the size of the PFRA field is 10 bits and the maximum multiplexing order of the terminal apparatus 1 is less than 10 due to the combination of the other SCS and the bandwidth, that is, in a case that the number of bits in the bitmap required for the PFRA field is less than 10 bits, the extra bit of the PFRA field may be secured as an R bit. For example, in a case that the maximum multiplexing order of the terminal apparatus 1 is 5, 5 bits is sufficient for the size of the bitmap constituting the PFRA field, and thus, five bits of the 10 bits in the PFRA field may be secured as R bits.

In FIG. 20(b), in a case of at least CBRA, the R bits for the CSI request field may be reduced. In other words, in a case that the size of the RAR grant is smaller than 27 bits, the CSI request field may not be included in the RAR grant.

In FIG. 20(b), in other words, in a case that the size of the RAR grant for the NR-U is smaller than the size of the RAR grant for the NR, the value of CAPC may always be assumed to be a prescribed value (a predetermined class or a predetermined index) for the PUSCH scheduled by the RAR grant. Here, the prescribed value may be determined beforehand in a specification, or the like. Here, the prescribed value may be given using a higher layer parameter. By doing so, it is not necessary to include the CAPC field in the RAR grant, and thus the size of the RAR grant for the NR-U can be reduced.

Figure 21:
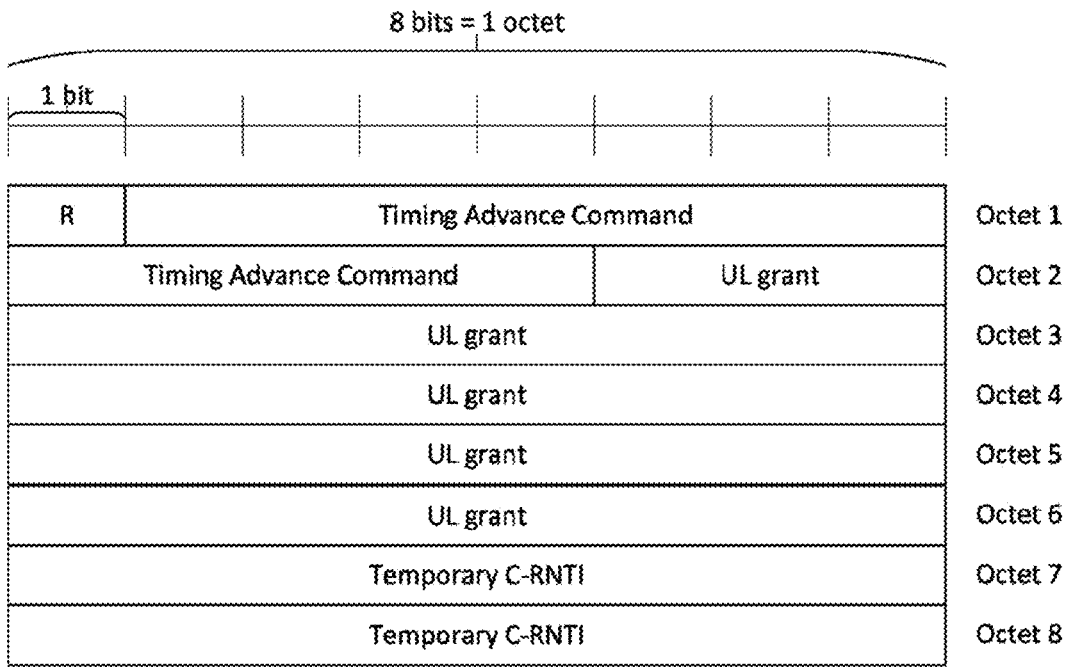
FIG. 21 is a diagram illustrating an example of a configuration of MAC RAR and RAR grant fields for NR-U (example 4) according to the present embodiment.

FIG. 21 is a diagram illustrating another example (example 4) of the configuration of the MAC RAR and RAR grant fields for the NR-U according to the present embodiment. FIG. 21(a) illustrates a configuration of a MAC RAR and a MAC payload for the NR-U. FIG. 21(b) illustrates an example of a configuration of fields of an RAR grant corresponding to a UL grant in the MAC RAR of FIG. 21(a).

FIG. 21(a) illustrates the configuration of the fields in a case that the size of the MAC RAR for the NR-U is expanded more than the size of the MAC RAR for the NR. The size of the TAC field and the size of the TC-RNTI included in the MAC RAR field in FIG. 21(a) may be the same size as the fields included in the MAC RAR for the NR. The size of the UL grant may be greater than the size of the UL grant for the NR. Although FIG. 21(a) describes a case in which the MAC RAR is expanded by one octet, the size of the UL grant may be expanded to greater than 1 octet, as compared to the NR.

FIG. 21(b) illustrates an example of various fields constituting the RAR grant corresponding to the UL grant of FIG. 21(a). In this case, the PFRA can support both continuous allocation and interlaced allocation. In a case that frequency hopping is also possible, the FHF field may be included in the RAR grant. In a case that the bandwidth is wider than 20 MHz, the size of the PFRA field may be expanded to 14 bits at maximum to 16 bits at maximum according to the maximum transmission bandwidth (e.g., 275 PRBs in a case that the SCS is 60 kHz and the bandwidth is 80 MHz). In addition, the size of the PTRA field may be extended from 4 bits to 5 bits so that PTRA can indicate both during a COT and beyond a COT. In addition, the PSP field, the CAT field, and the CAPC field required for the RAR grant for the NR-U may be set.

In FIG. 21, whether the size of the MAC RAR is expanded may be determined based on higher layer parameters related to the size of the MAC RAR.

In FIG. 21, whether the size of the PFRA field is expanded may be determined based on higher layer parameters related to the PFRA. Further, in a case that the size of the PFRA field is not expanded, the remaining bits may be secured as R bits.

In FIG. 21, whether the size of the PTRA field is expanded may be determined based on higher layer parameters related to the PTRA. Further, in a case that the size of the PTRA field is not expanded, the remaining bits may be secured as R bits.

Whether each of the size of the PFRA field and/or the size of the PTRA field is expanded may be determined based on higher layer parameters.

In FIG. 21, in a case that the size of the PFRA field is determined based on the size of the bitmap related to the maximum multiplexing order of the terminal apparatus 1 in the frequency domain, the remaining bits not used in the bitmap may be secured as R bits.

In FIGS. 18 to 21, in a case that one or multiple R bits are secured in the UL grant, the R bits may be used to expand the TC-RNTI, or may be used to expand the RAPID.

The base station apparatus 3 may determine whether to generate the Msg2 for the NR-U by using any MAC RAR of the MAC RARs described in FIG. 17 to FIG. 21 based on the index of the random access preamble and/or the value of the RAPID received by the base station apparatus 3.

Whether to generate the Msg2 for the NR-U using any MAC RAR in the MAC RARs in FIG. 17 to FIG. 21 may be determined based on a higher layer parameter.

In the present embodiment, in a case that the FHF field is set in the RAR grant and the interlaced allocation is applied, the value of the FHF field is not set to "1". In other words, in such a case, the terminal apparatus 1 may expect that frequency hopping is indicated in the FHF field.

Further, whether the FHF field is included in the RAR grant for the NR-U may be determined based on whether only continuous allocation is applied, only interlaced allocation is applied, or both continuous allocation and interlaced allocation are applied to resource assignment (frequency resource allocation) for the PUSCH scheduled using the RAR grant. For example, in a case that only continuous allocation, or continuous allocation and interlaced allocation are applied to the resource assignment, the RAR grant may include the FHF field.

Whether any one or both of continuous allocation and/or interlaced allocation are applied to the frequency resource allocation of the PUSCH (Msg3 PUSCH) scheduled with the RAR grant in the NR-U may be determined based on a higher layer parameter. In addition, whether the RAR grant for the NR-U includes the FHF field may be determined based on a higher layer parameter.

In the present embodiment, whether the CAT field is set in the RAR grant for the NR-U may be set to the CAT field in the RAR grant in a case that the CAT for the PUSCH scheduled with the RAR grant can be selected as both the type 1 CAP and the type 2 CAP. That is, in a case that the CAT applied to the PUSCH scheduled with the RAR grant is either the type 1 CAP or the type 2 CAP, the CAT field may not be set in the RAR grant.

In the present embodiment, whether the CAPC field is set in the RAR grant for the NR-U may be determined based on whether the CAPC for the PUSCH scheduled with the RAR grant is a prescribed CAPC. In a case that the CAPC for the PUSCH scheduled with the RAR grant is a prescribed CAPC, the CAPC field may not be set in the RAR grant.

FIG. 22 is a diagram illustrating an example of fields indicating transmission starting positions on PUSCH (PUSCH starting position fields or PSP fields) in the time domain (time domain starting positions or starting positions in slots) and starting positions on the PUSCH corresponding to each SCS according to the present embodiment. FIG. 22(a) and FIG. 22(b) illustrate an example of fields (2-bit field and 1-bit field) indicating the transmission starting positions on the PUSCH. The fields are fields used to provide a gap (period) for the terminal apparatus 1 to perform LBT by adjusting a transmission timing in a time symbol region. For example, in a case that the value "00" or "0" is set in the field, it indicates that the physical channel/physical signal can be transmitted from the start of the head time symbol region. In a case that the value "01", "10" or "1" is set in the field, it indicates that the physical channel/physical signal can be transmitted from the middle of the head time symbol region. In a case that the value "01" or "1" is set in the field, it indicates that the physical channel/physical signal can be transmitted from the time 25 μ seconds (us) from the head time symbol region in the PUSCH. For example, in 25 μ seconds, the terminal apparatus 1 can perform the transmission after performing 25-μsecond LBT one time. In a case that the value "10" is set in the field, it indicates that the physical channel/physical signal can be transmitted from the time (25+ timing advance (TA)) μs (us) from the head time symbol region in the PUSCH. In a case that the value "11" s set in the field, it indicates that the physical channel/physical signal can be transmitted from the next time symbol region. Furthermore, depending on the value of SCS, a length of one time symbol region corresponding to the SCS may be shorter than 25 μs and/or (25+TA) μs. In such a case, assuming that the value "11" is set in the field, an initial time symbol region after 25 μs or (25+TA) μs or later from the head time symbol region may be indicated. FIG. 22(c) illustrates an example of starting positions on the PUSCH for each value in a case that the SCS is 15 kHz. FIG. 22(d) illustrates an example of starting positions on the PUSCH for each value in a case that the SCS is 30 kHz.

FIG. 23 is a diagram showing an example of a PUSCH frequency resource allocation type for NR-U according to the present embodiment. In a case that a specific PUSCH frequency resource allocation type is applied to the NR-U, the PUSCH frequency resource allocation field included in the UL grant may be indicated by a resource information value (RIV). A RIV may be determined based on a resource allocation starting position ($RB_{START}$), a maximum transmission bandwidth ($N^{UL}_{RB}$), and a value of L. The RIV may be expressed as a bitmap based on whether the maximum transmission bandwidth corresponds to 20 MHz or 10 MHz. Further, the maximum transmission bandwidth may be referred to as a maximum uplink transmission bandwidth.

Various aspects of apparatuses according to one aspect of the present embodiment will be described below.

(1) To accomplish the objective described above, aspects of the present invention are contrived to provide the following measures. In other words, a first aspect of the present invention is a terminal apparatus including a radio transmission and/or reception unit that transmits a random access preamble and monitors a corresponding random access response (RAR) in a random access procedure, and a medium access control (MAC) layer processing unit that increments a value of a preamble transmission counter for counting the number of random access preambles transmitted in a case that it is considered that reception of the RAR is not successful, in which the radio transmission and/or reception unit performs clear channel assessment (CCA) before transmitting the random access preamble in a new radio-unlicensed (NR-U) carrier and sets an initial value $N_{init}$ used to determine a measurement period for the CCA to a counter N, the $N_{init}$ is determined based on a value of contention window (CW) (CW size) configured at least for the random access preamble before the $N_{init}$ is set to the N, and the value of the CW is updated in a case that the value of the preamble transmission counter is incremented.

(2) In addition, a second aspect of the present invention is the terminal apparatus of the first aspect, in which, in the random access procedure, the terminal apparatus successfully receives the RAR, transmits a PUSCH (Msg3) corresponding to the RAR, monitors a contention resolution message (Msg4) corresponding to the Msg3, and increments the value of the preamble transmission counter in a case that it is considered that the reception of the Msg4 is not successful in the NR-U carrier to update the value of the CW.

(3) In addition, a third aspect of the present invention is a method used by a terminal apparatus including transmitting a random access preamble and monitoring a corresponding random access response (RAR) in a random access procedure, incrementing a value of a preamble transmission counter for counting the number of random access preambles transmitted in a case that it is considered that reception of the RAR is not successful, performing clear channel assessment (CCA) before transmitting the random access preamble in a new radio-unlicensed (NR-U) carrier, setting an initial value $N_{init}$ used to determine a measurement period for the CCA to a counter N, in which the $N_{init}$ is determined based on a value of contention window (CW) (CW size) configured at least for the random access preamble before the $N_{init}$ is set to the N, and the value of the CW is updated in a case that the value of the preamble transmission counter is incremented.

(4) In addition, a fourth aspect of the present invention is the method of the third aspect, in which, in the random access procedure, the reception of the RAR is successful, a PUSCH (Msg3) corresponding to the RAR is transmitted, a contention resolution message (Msg4) corresponding to the Msg3 is monitored, and the value of the preamble transmission counter is incremented in a case that it is considered that the reception of the Msg4 is not successful in the NR-U carrier to update the value of the CW.

(5) In addition, a fifth aspect of the present invention is a base station apparatus including a radio transmission and/or reception unit that transmits a physical downlink control channel (PDCCH) order for performing resource assignment of a random access preamble and monitors a random access preamble corresponding to the PDCCH order after the PDCCH order is transmitted, in which the radio transmission and/or reception unit performs clear channel assessment (CCA) before transmitting the PDCCH order in a new radio-unlicensed (NR-U) carrier and sets an initial value $N_{init}$ used to determine a measurement period for the CCA to a counter N, in which the $N_{init}$ is determined based on a value of contention window (CW) (CW size) configured at least for the PDCCH order before the $N_{init}$ is set to the N, and the value of the CW is updated in a case that it is considered that reception of the random access preamble is not successful.

(6) In addition, a six aspect of the present invention is a base station apparatus including a radio transmission and/or reception unit that receives a random access preamble, transmits a corresponding random access response (RAR), and monitors a PUSCH (Msg3) corresponding to the RAR after transmitting the RAR in a random access procedure, in which the radio transmission and/or reception unit performs clear channel assessment (CCA) before transmitting the RAR in a new radio-unlicensed (NR-U) carrier and sets an initial value $N_{init}$ used to determine a measurement period for the CCA to a counter N, in which the $N_{init}$ is determined based on a value of contention window (CW) (CW size) configured at least for the RAR before the $N_{init}$ is set to the N, and the value of the CW is updated in a case that it is considered that reception of the Msg3 is not successful.

(7) In addition, a seventh aspect of the present invention is a method used by a base station apparatus including transmitting a physical downlink control channel (PDCCH) order for performing resource assignment of a random access preamble and monitoring a random access preamble corresponding to the PDCCH order after the PDCCH order is transmitted, performing clear channel assessment (CCA) before transmitting the PDCCH order in a new radio-unlicensed (NR-U) carrier and setting an initial value $N_{init}$ used to determine a measurement period for the CCA to a counter N, in which the $N_{init}$ is determined based on a value of contention window (CW) (CW size) configured at least for the PDCCH order before the $N_{init}$ is set to the N, and the value of the CW is updated in a case that it is considered that reception of the random access preamble is not successful.

(8) In addition, an eighth aspect of the present invention is a method used by a base station apparatus including receiving a random access preamble, transmitting a corresponding random access response (RAR), and monitoring a PUSCH (Msg3) corresponding to the RAR after transmitting the RAR in a random access procedure, performing clear channel assessment (CCA) before transmitting the RAR in a new radio-unlicensed (NR-U) carrier, and setting an initial value $N_{init}$ used to determine a measurement period for the CCA to a counter N, in which the N nit is determined based on a value of contention window (CW) (CW size) configured at least for the RAR before the $N_{init}$ is set to the N, and the value of the CW is updated in a case that it is considered that reception of the Msg3 is not successful.

(9) In addition, a ninth aspect of the present invention is a terminal apparatus including a physical layer processing unit that receives a higher layer signal including a scheduling request configuration (SR configuration) and a physical uplink control channel configuration (PUCCH configuration), and a medium access control (MAC) layer processing unit that instructs transmission of an SR to the physical layer processing unit for new transmission on an uplink shared channel (UL-SCH), in which the physical layer processing unit performs clear channel assessment (CCA) based on a type of a channel access procedure before transmitting a PUCCH including the SR in a new radio-unlicensed (NR-U) carrier, and sets an initial value $N_{init}$ used to determine a measurement period for the CCA to a counter N, the $N_{init}$ is determined based on a value of contention window (CW) (CW size) configured at least for the SR before the $N_{init}$ is set to the N, and the value of the CW is updated in a case that an allowable value of configurable CW is greater than one and a counter value of the SR is incremented.

(10) In addition, a tenth aspect of the present invention is the terminal apparatus of the ninth aspect, in which the physical layer processing unit sets the value of the CW to an initial value $CW_{min}$ in a case that an uplink grant for new transmission of the UL-SCH is detected after transmission of the SR.

(11) In addition, an eleventh aspect of the present invention is the terminal apparatus of the ninth aspect, in which the physical layer processing unit sets the value of the CW to an initial value $CW_{min}$ in a case that a counter value of the SR is set to zero.

(12) In addition, a twelfth aspect of the present invention is a method used by a terminal apparatus including a step of receiving a higher layer signal including a scheduling request configuration (SR configuration) and a physical uplink control channel configuration (PUCCH configuration), a step of instructing transmission of an SR to a physical layer for new transmission of an uplink shared channel (UL-SCH), a step of performing clear channel assessment (CCA) based on a type of a channel access procedure before a PUCCH including the SR is transmitted in a new radio-unlicensed (NR-U) carrier, and a step of setting an initial value $N_{init}$ used to determine a measurement period for the CCA to a counter N, in which the $N_{init}$ is determined based on a value of contention window (CW) (CW size) configured at least for the SR before the $N_{init}$ is set to the N, and the value of the CW is updated in a case that an allowable value of configurable CW is greater than one and a counter value of the SR is incremented.

(13) In addition, a thirteenth aspect of the present invention is a terminal apparatus including a receiver that receives a CSI-RS, a measurement unit that measures and evaluates CSI using the CSI-RS and updates a value of the CSI, and a transmitter that transmits the CSI, in which, in a case that a first condition in which multiple LBT subbands are configured in one BWP corresponding to one bwp-Id of an NR-U carrier, a second condition in which cqi-FormatIndicator corresponding to the BWP indicates a wideband CQI, and a third condition to indicate that LBT has failed in at least one LBT subband among the multiple LBT subbands are satisfied, the measurement unit does not update a value of the wideband CQI.

(14) In addition, a fourteenth aspect of the present invention is the terminal apparatus of the thirteenth aspect, in which, in a case that the first condition, the third condition, and a fourth condition in which cqi-FormatIndicator corresponding to the BWP indicates subband CQI are satisfied, the measurement unit updates a value of the subband CQI in each of one or multiple subbands included in an LBT subband in which LBT is successful, and does not update a value of the subband CQI in each of one or multiple subbands included in an LBT subband in which LBT has failed.

(15) In addition, a fifteenth aspect of the present invention is a method of a terminal apparatus including a step of receiving a CSI-RS, a step of measuring and evaluating CSI using the CSI-RS, a step of updating a value of the CSI, a step of transmitting the CSI, and a step of not updating a value of a wideband CQI in a case that, in one BWP corresponding to one bwp-Id of an NR-U carrier, a first condition in which multiple LBT subbands are configured, a second condition in which cqi-FormatIndicator corresponding to the BWP indicates the wideband CQI, and a third condition to indicate that LBT has failed in at least one LBT subband among the multiple LBT subbands are satisfied.

(16) In addition, a sixteenth aspect of the present invention is the method of the fifteenth aspect including a step of updating a value of a subband CQI in each of one or multiple subbands included in an LBT subband in which LBT is successful and a step of not updating a value of the subband CQI in each of one or multiple subbands included in an LBT subband in which LBT has failed in a case that the first condition, the third condition, and a fourth condition in which cqi-FormatIndicator corresponding to the BWP indicates the subband CQI are satisfied.

(17) In addition, a seventeenth aspect of the present invention is a base station apparatus including a receiver that receives a random access preamble and a transmitter that transmits one or multiple medium access control random access responses (MAC RARs) corresponding to the random access preamble, in which the transmitter sets a timing advance command (TAC) field included in the MAC RAR to a first size and an uplink (UL) grant to a second size in a case that the MAC RAR is transmitted in a new radio access technology (NR) cell, and sets a size of the TAC field included in the MAC RAR to a size smaller than the first size and sets a size of the UL grant to a size greater than the second size in a case that the MAC RAR is transmitted in an NR-unlicensed (NR-U) cell.

(18) In addition, an eighteenth aspect of the present invention is the base station apparatus of the seventeenth aspect, in which, in the NR-U cell, at least one field among a physical uplink shared channel starting position (PSP) field, a channel access type (CAT) field, and a channel access priority class (CAPC) field is set for a random access response (RAR) grant corresponding to the UL grant.

(19) In addition, a nineteenth aspect of the present invention is a method used by a base station apparatus including a step of receiving a random access preamble, a step of transmitting one or multiple medium access control random access responses (MAC RARs) corresponding to the random access preamble, a step of setting a timing advance command (TAC) field included in the MAC RAR to a first size and an uplink (UL) grant to a second size in a case that the MAC RAR is transmitted in a new radio access technology (NR) cell, and a step of setting a size of the TAC field included in the MAC RAR to a size smaller than the first size and setting a size of the UL grant to a size greater than the second size in a case that the MAC RAR is transmitted in an NR-unlicensed (NR-U) cell.

(20) In addition, a twentieth aspect of the present invention is the method of the nineteenth aspect, in which, in the NR-U cell, at least one field among a physical uplink shared channel starting position (PSP) field, a channel access type (CAT) field, and a channel access priority class (CAPC) field is set for a random access response (RAR) grant corresponding to the UL grant.

(21) In addition, a twenty first aspect of the present invention is a terminal apparatus including a transmitter that transmits a random access preamble, and a receiver that receives one or multiple medium access control random access responses (MAC RARs) corresponding to the random access preamble, in which the receiver receives a MAC RAR with a first configuration for a new radio access technology (NR) cell and receives a MAC RAR with a second configuration in an NR-unlicensed (NR-U) cell, and the MAC RAR with the first configuration and the MAC RAR with the second configuration have the same size.

Each of a program running on the base station apparatus 3 and the terminal apparatus 1 according to the present invention may be a program that controls a central processing unit (CPU) and the like (a program causing a computer to function) to realize the functions of the above-described embodiments according to the present invention. In addition, information handled in these apparatuses is temporarily stored in a random access memory (RAM) while being processed, then the information is stored in various types of read only memory (ROM) such as a flash ROM and a hard disk drive (HDD), and is read by the CPU to be modified or rewritten when necessary.

Further, parts of the terminal apparatus 1 and the base station apparatus 3 according to the above-described embodiments may be achieved by computers. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and includes an OS and hardware such as a peripheral device. Furthermore, a "computer-readable recording medium" refers to a portable medium such as a flexible disk, a magneto-optical disc, a ROM, a CD-ROM, and the like, and a storage device such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to realize some of the functions described above, and may be configured to realize the functions described above in combination with a program already recorded in the computer system.

Furthermore, the base station apparatus 3 according to the above-described embodiments may be achieved as an aggregation (apparatus group) including multiple apparatuses. Each of the apparatuses constituting such an apparatus group may include some or all of functions or functional blocks of the base station apparatus 3 according to the above-described embodiments. The apparatus group may only be required to have all functions or all functional blocks of the base station apparatus 3. Furthermore, the terminal apparatus 1 according to the above-described embodiments can also communicate with the base station apparatus as the aggregation.

Moreover, the base station apparatus 3 according to the above-described embodiments may be an evolved universal terrestrial radio access network (EUTRAN) and/or a nextgen RAN (NG-RAN) or NR RAN. Moreover, the base station apparatus 3 according to the above-described embodiments may have some or all of the functions of a higher node for an eNodeB and/or a gNB.

Furthermore, some or all parts of the terminal apparatus 1 and the base station apparatus 3 according to the above-described embodiments may be typically realized as an LSI which is an integrated circuit or may be realized as a chip set. The functional blocks the terminal apparatus 1 and the base station apparatus 3 may be individually achieved as a chip, or some or all of the functional blocks may be integrated into a chip. Furthermore, a circuit integration technique is not limited to the LSI, and may be realized as a dedicated circuit or a general-purpose processor. Furthermore, in a case that a circuit integration technology that replaces LSI appears due to advance of the semiconductor technology, an integrated circuit based on the technology can be used.

Furthermore, although the terminal apparatus has been described as an example of a communication apparatus according to the above-described embodiments, the present invention is not limited to such a terminal apparatus and is applicable to a terminal apparatus or a communication apparatus of a fixed-type or a stationary-type electronic apparatus installed indoors or outdoors, for example, an AV apparatus, a kitchen apparatus, a cleaning or washing apparatus, an air-conditioning apparatus, an office apparatus, a vending machine, and other household apparatuses.

Although the embodiments of the present invention have been described in detail above referring to the drawings, the specific configuration is not limited to the embodiments, and an amendment to a design that falls within the scope that does not depart from the gist of the present invention is also included. In addition, the present invention can be variously modified within the scope of the present invention defined by claims, and embodiments that are made by suitably combining technical means disclosed in the different embodiments are also included in the technical scope of the present invention. Furthermore, a configuration in which constituent elements described in the embodiments exhibiting the same effects are substituted for one another is also included in the technical scope of the present invention.

What is claimed is:

1. A base station apparatus comprising:
    a receiver configured to receive a random access preamble; and
    a transmitter configured to transmit one or more medium access control (MAC) random access responses (RARs) corresponding to the random access preamble, wherein
    the transmitter is further configured to:
    set, in a case that a first MAC RAR of the one or more MAC RARs is transmitted in a new radio (NR) access technology cell, a timing advance command (TAC) field included in the first MAC RAR to have a first size and an uplink (UL) grant, including a frequency hopping flag, to have a second size, and
    set, in a case that a second MAC RAR of the one or more MAC RARs is transmitted in an NR-unlicensed (NR-U) cell, the TAC field included in the second MAC RAR to have a third size smaller than the first size and the UL grant, without the frequency hopping flag, to have a fourth size greater than the second size.

2. The base station apparatus according to claim 1, wherein
    in the NR-U cell, at least one of a physical uplink shared channel starting position (PSP) field, a channel access type (CAT) field, or a channel access priority class (CAPC) field is set for a random access response (RAR) grant corresponding to the UL grant.

3. A method comprising:

receiving a random access preamble;

transmitting one or more medium access control (MAC) random access responses (RARs) corresponding to the random access preamble;

setting, in a case that a first MAC RAR of the one or more MAC RARs is transmitted in a new radio (NR) access technology cell, a timing advance command (TAC) field included in the first MAC RAR to have a first size and an uplink (UL) grant, including a frequency hopping flag, to have a second size; and setting, in a case that a second MAC RAR of the one or more MAC RARs is transmitted in an NR-unlicensed (NR-U) cell, the TAC field included in the second MAC RAR to have a third size smaller than the first size and the UL grant, without the frequency hopping flag, to have a fourth size greater than the second size.

4. The method according to claim 3, wherein in the NR-U cell, at least one of a physical uplink shared channel starting position (PSP) field, a channel access type (CAT) field, or a channel access priority class (CAPC) field is set for a random access response (RAR) grant corresponding to the UL grant.

5. A terminal apparatus comprising:

a transmitter configured to transmit a random access preamble; and a receiver configured to receive one or more medium access control (MAC) random access responses (RARs) corresponding to the random access preamble, wherein the receiver is further configured to:

receive a first MAC RAR of the one or more MAC RARs with a first configuration in a new radio (NR) access technology cell, and receiver a second MAC RAR of the one or more MAC RARs with a second configuration in an NR-unlicensed (NR-U) cell, wherein;

the first configuration comprises a timing advance command (TAC) field having a first size, and an uplink (UL) grant, including a frequency hoppin flag, having a second size, and the second configuration comprises the TAC field having a third size smaller than the first size, and the UL grant, without the frequency hopping flag, having a fourth size greater than the second size.

* * * * *